US011968756B2

(12) United States Patent
Barnes et al.

(10) Patent No.: US 11,968,756 B2
(45) Date of Patent: Apr. 23, 2024

(54) COMMUNICATING WITH AND CONTROLLING LOAD CONTROL SYSTEMS

(71) Applicant: Lutron Technology Company LLC, Coopersburg, PA (US)

(72) Inventors: Bryan Robert Barnes, Landsdale, PA (US); Shilpa Sarode, Allentown, PA (US); Shenchi Tian, Easton, PA (US); Kenneth Priester, Austin, TX (US); Brad Michael Kreschollek, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 20 days.

(21) Appl. No.: 17/880,959

(22) Filed: Aug. 4, 2022

(65) Prior Publication Data
US 2022/0377858 A1  Nov. 24, 2022

Related U.S. Application Data

(63) Continuation of application No. 16/879,708, filed on May 20, 2020, now Pat. No. 11,445,584.
(Continued)

(51) Int. Cl.
*H05B 45/20* (2020.01)
*G06F 3/04847* (2022.01)
(Continued)

(52) U.S. Cl.
CPC ......... *H05B 45/20* (2020.01); *G06F 3/04847* (2013.01); *H05B 47/155* (2020.01); *H05B 47/19* (2020.01)

(58) Field of Classification Search
CPC ..... G06F 3/04847; H05B 45/20; H05B 47/19; H05B 47/155
See application file for complete search history.

(56) References Cited

U.S. PATENT DOCUMENTS 9,345,103 B1  5/2016  Letourneur
9,655,214 B1  5/2017  Sooch et al.
(Continued)

FOREIGN PATENT DOCUMENTS

CN  102057753 A  5/2011
CN  106713760 A  5/2017
(Continued)

OTHER PUBLICATIONS

""""Application Note Atmel AVR2060: BitCloud ZigBee Light Link Quick Start Guide Atmel 8-bit Microcontrollers Features @BULLET BitCloud? ZigBee?", Light Link package overview @BULLET Instructions for getting started with the package @BULLET Description of the Light Link demo application @BULLET Light, bri" , XP055187354,, Apr. 29, 2013.
(Continued)

*Primary Examiner* — Kurtis R Bahr
(74) *Attorney, Agent, or Firm* — Flaster Greenberg P.C.

(57) ABSTRACT

The network device may be configured to define or update a scene for controlling a zone in a certain area or location of a load control system. For example, the load control system may be installed in a residential home or building. At least one lighting control device that is configured to control a corresponding lighting load may be assigned to each of the one or more zones. The network device may be configured to display one or more graphical user interfaces that a user of the network device may interact with to define or update a scene. The network device may also be configured to display one or more graphical user interfaces that a user of the network device may interact with to define or update natural show functionality. After a scene and/or natural show have been configured, the may enabled or activated in response to a triggering event.

18 Claims, 26 Drawing Sheets

Related U.S. Application Data

(60) Provisional application No. 63/025,084, filed on May 14, 2020, provisional application No. 62/850,158, filed on May 20, 2019, provisional application No. 62/850,131, filed on May 20, 2019.

(51) Int. Cl.
    *H05B 47/155*     (2020.01)
    *H05B 47/19*     (2020.01)

(56) References Cited

U.S. PATENT DOCUMENTS

| | | |
|---|---|---|
| 9,900,957 B2 | 2/2018 | Van De Ven et al. |
| 9,980,346 B2 * | 5/2018 | Hidaka ................ H05B 47/11 |
| 10,140,732 B2 | 11/2018 | Maksymczuk et al. |
| 10,201,060 B2 * | 2/2019 | Hidaka ................ G06F 3/14 |
| 10,240,732 B1 | 3/2019 | Ganick et al. |
| 10,268,354 B2 * | 4/2019 | Kim ................ G06F 3/0482 |
| 10,356,883 B2 * | 7/2019 | Ueno ................ G06F 3/04847 |
| 10,448,486 B2 * | 10/2019 | Baek ................ H05B 47/10 |
| 2004/0124338 A1 * | 7/2004 | Cloutier ................ H05B 39/042 |
| | | 250/214 C |
| 2005/0116667 A1 | 6/2005 | Mueller et al. |
| 2005/0174473 A1 | 8/2005 | Morgan et al. |
| 2009/0244089 A1 | 10/2009 | Gadd et al. |
| 2011/0084614 A1 | 4/2011 | Sheldon et al. |
| 2011/0084901 A1 | 4/2011 | Diederiks |
| 2011/0248835 A1 | 10/2011 | Speegle et al. |
| 2011/0273107 A1 | 11/2011 | Hsia et al. |
| 2012/0320262 A1 | 12/2012 | Chung |
| 2013/0271004 A1 * | 10/2013 | Min ................ H05B 45/00 |
| | | 315/112 |
| 2014/0070706 A1 * | 3/2014 | Fushimi ................ H05B 47/10 |
| | | 315/131 |
| 2014/0070707 A1 * | 3/2014 | Nagazoe ................ H04B 10/116 |
| | | 315/151 |
| 2014/0132180 A1 * | 5/2014 | Ukai ................ H05B 45/20 |
| | | 315/292 |
| 2015/0189723 A1 | 7/2015 | Ogawa |
| 2015/0198938 A1 * | 7/2015 | Steele ................ B25J 9/1689 |
| | | 700/275 |
| 2015/0201480 A1 | 7/2015 | Ogawa |
| 2016/0026371 A1 | 1/2016 | Lu et al. |
| 2016/0132138 A1 | 5/2016 | Angermayer |
| 2016/0150616 A1 * | 5/2016 | Bell ................ H05B 47/175 |
| | | 315/294 |
| 2016/0151117 A1 | 6/2016 | Gibbs et al. |
| 2016/0357430 A1 | 12/2016 | Migos et al. |
| 2017/0228110 A1 | 8/2017 | Arora et al. |
| 2017/0235470 A1 | 8/2017 | Baluja et al. |
| 2017/0245340 A1 | 8/2017 | Chen et al. |
| 2018/0077770 A1 | 3/2018 | Sooch et al. |
| 2018/0160502 A1 | 6/2018 | Casey et al. |
| 2018/0235039 A1 | 8/2018 | Krajnc et al. |
| 2018/0314412 A1 * | 11/2018 | Nakauchi ............ G06F 3/04847 |
| 2018/0364665 A1 | 12/2018 | Clymer et al. |
| 2019/0014638 A1 | 1/2019 | Weaver et al. |
| 2019/0034043 A1 | 1/2019 | Zolotykh et al. |
| 2019/0086046 A1 | 3/2019 | Ganick et al. |
| 2019/0208599 A1 | 7/2019 | Parton et al. |
| 2019/0254142 A1 | 8/2019 | Petluri et al. |
| 2020/0026420 A1 | 1/2020 | Sicard |
| 2020/0092968 A1 | 3/2020 | Sun et al. |

FOREIGN PATENT DOCUMENTS

| | | |
|---|---|---|
| CN | 107926091 A | 4/2018 |
| CN | 108029179 A | 5/2018 |
| CN | 108260264 A | 7/2018 |
| EP | 3099143 A1 | 11/2016 |
| EP | 3099143 B1 | 3/2020 |
| KR | 20170099048 A | 8/2017 |
| WO | 2007033667 A1 | 3/2007 |
| WO | 2012131544 A1 | 10/2012 |
| WO | 2018052572 A1 | 3/2018 |

OTHER PUBLICATIONS

"Lutron Q-Control+ on the App Store (apple.com)", retrieved from the internet: https://apps.apple.com/us/app/lutron-q-control/id575728994, 3 pages.

Callahan, Kerri, et al., "Museum Lighting Symposium & Workshops", Retrieved from the Internet: URL:https://discovery.ucl.ac.uk/10048078//1/book-of-abstracts2.pdf; retrieved on Oct. 19, 2020, Sep. 12, 2017, pp. 67-69.

Deng-Feng, et al., "Design of intelligent lighting control system", 2011 IEEE International Conference on Cyber Technology in Automation, Control, and Intelligent Systems, 2011, doi: 10.1109/CYBER.2011.6011779., accessed Dec. 13, 2021) (Year: 2011), 2011, pp. 134-137.

Ren, Hui, et al., "Study on LED Color Mixing for Stage Lighting Based on Locus Fitting of Blackbody", IEEE 3rd International Conference on Cloud Computing and Internet of Things (CCIOT), 2018, accessed Dec. 12, 2021). Year: 2018), 2018, 5 pages.

* cited by examiner

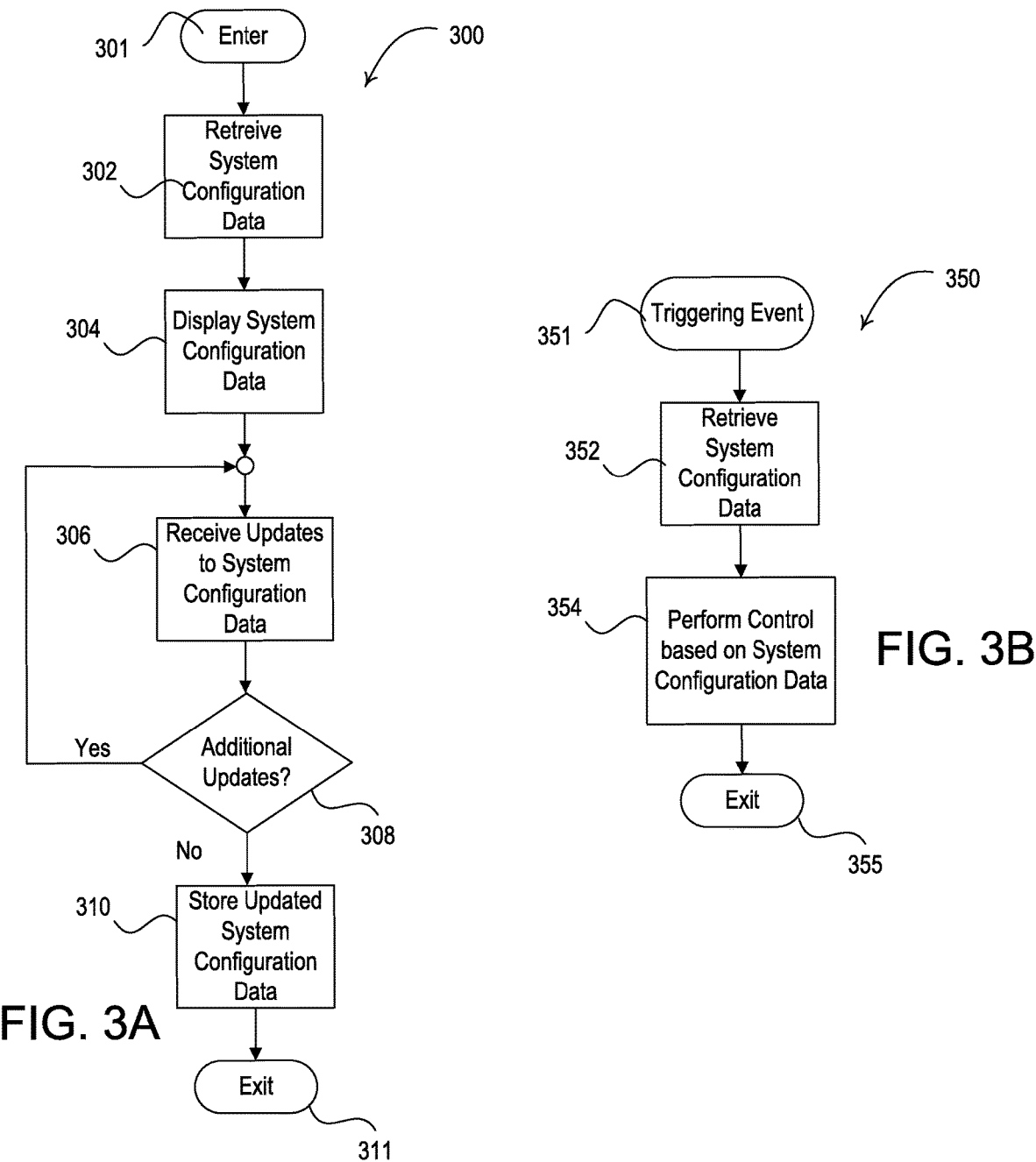

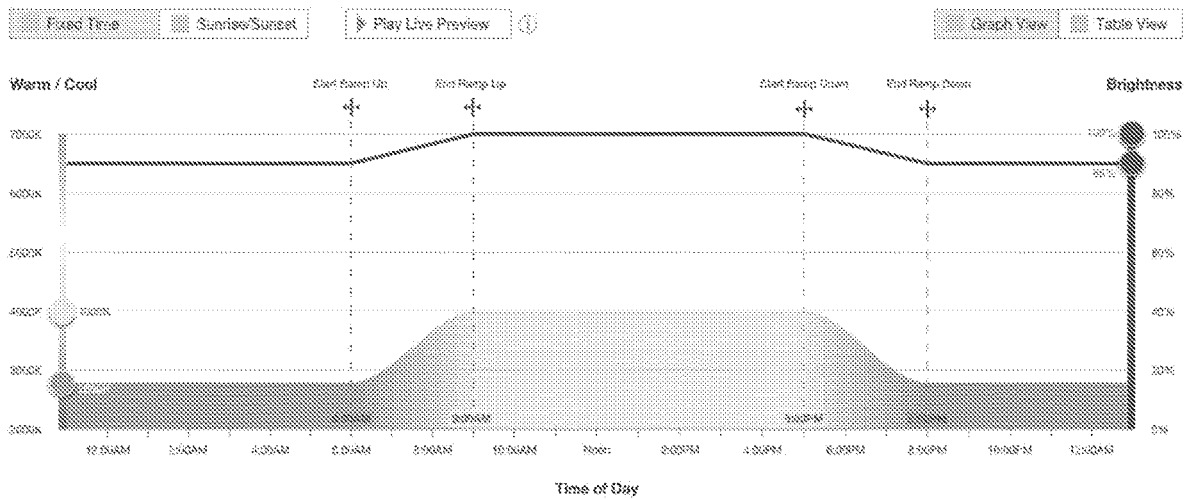
Fig. 5F

COMMUNICATING WITH AND CONTROLLING LOAD CONTROL SYSTEMS

CROSS REFERENCE

This application is a continuation of U.S. Non-Provisional Patent Application Ser. No. 16/879,708, filed May 20, 2020, which claims priority from U.S. Provisional Patent Application No. 62/850,131, filed May 20, 2019; U.S. Provisional Patent Application No. 62/850,158, filed May 20, 2019; and U.S. Provisional Patent Application No. 63/025,084, filed May 14, 2020 which are hereby incorporated by reference in their entireties.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment.

SUMMARY

It may be desirable to communicate with and control load control systems from a network device.

As on example, a network device may include a display screen, a communications circuit, and at least one processor. The network device may further include at least one tangible memory device communicatively coupled to the at least one processor. The at least one tangible memory device may have software instructions stored thereon that when executed by the at least one processor may direct the at least one processor to receive via the communications circuit from a communications network information communicated by a controller.

The controller may be configured to communicate with one or more load control device, such as a lighting control device. The lighting control device may be configured to control a lighting load that includes a plurality of light emitting diodes (LEDs), such as, for example, a red diode, a green diode, and a blue diode and may be configured to produce any of a plurality of different colors through the plurality of LEDs. The information communicated by the controller may include an indication of a color or lighting intensity that the lighting load is configured to presently produce. The software instructions, when executed by the at least one processor, may further direct the at least one processor to display on the display screen a graphical user interface.

The network device may be configured to define and/or update a scene for controlling one or more zones in a certain area or location of a load control system. For example, the load control system may be installed in a residential home or building. At least one lighting control device that is configured to control a corresponding lighting load may be assigned to each of the one or more zones. The network device may be configured to display one or more graphical user interfaces that a user of the network device may interact with to define and/or update the scene.

The graphical user interface may display various controls or control interfaces for defining and/or updated the scene. For example, a control interface may include an indication of a lighting intensity (e.g., via lighting intensity bar) for each of the one or more zones in the scene. In addition, the control interface may include a palette that identifies a color setting for controlling the lighting load(s) in a respective zone. For example, the palette may be configured to display colors at different color temperatures, or a full color gamut of colors. A user may define and/or update the scene by interacting with the graphical user interface. For example, the user may interact with the graphical user interface by selecting lighting intensity and/or a color setting using the palette or lighting intensity bar.

After receiving the definitions and/or updates to the scene, the network device may update the information received from the controller based on the user interactions to define/update the scene. The network device may then send the updated information back to the controller. Then, in response to receiving a triggering event configured to enable the scene (e.g., pressing a button at keypad that corresponds to the scene), the lighting control device/lighting loads assigned to a respective zone may be controlled according the enabled scene.

The graphical user interface may also, or alternatively, may display a graph. The graph may include one or more axes (e.g., a color temperature axis that indicates color temperatures, an intensity axis that indicates lighting intensity values, and/or a time axis that includes a period of time at which the lighting intensity and the color temperatures are controlled). For example, a horizontal axis of the graph may be used to represent time. The graph may also include one or more vertical axis that may be used to represent the configured settings at a particular point in time. For example, the graph may include a horizontal axis that may be used to represent the change in lighting intensity of the lighting control devices/lighting loads over time. The graph may also include another horizontal axis that may be used to represent the change in color (e.g., CCT) of the lighting control devices/lighting loads over time.

A user may interact with graph to indicate changes in the settings (e.g., lighting intensity, color, CCT, etc.) of the lighting control device/lighting loads assigned to a given zone over time (referred to herein as natural show). For example, the settings of the lighting control devices/lighting loads assigned to a given zone may be configured to change over time to emulate the local time of sunrise and/or sunset where the load control system is located. The graphical user interface may also receive a user interaction to preview the changes in settings of the lighting control device/lighting loads over time. And, after receiving the user interaction to preview the changes in settings of the lighting control device/lighting loads over time, the lighting control device/lighting loads assigned to a respective zone may be controlled over time (e.g., a relatively shorter period of time) according the setting presently indicated in the graph.

Again, after receiving the user interactions, the network device may update the information received from the controller based on the user interactions to changes in the settings (e.g., lighting intensity, color, CCT, etc.) of the lighting control device/lighting loads assigned to a given zone over time. The network device may then send the updated information back to the controller. And, in response to receiving a triggering event (e.g., an occupancy sensor detecting occupancy), the lighting control device/lighting loads assigned to a respective zone may be accordingly controlled over time.

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

FIGS. 3A and 3B are flowcharts depicting an example procedure for configuring and/or controlling a load control system.

DETAILED DESCRIPTION

Figure 1:
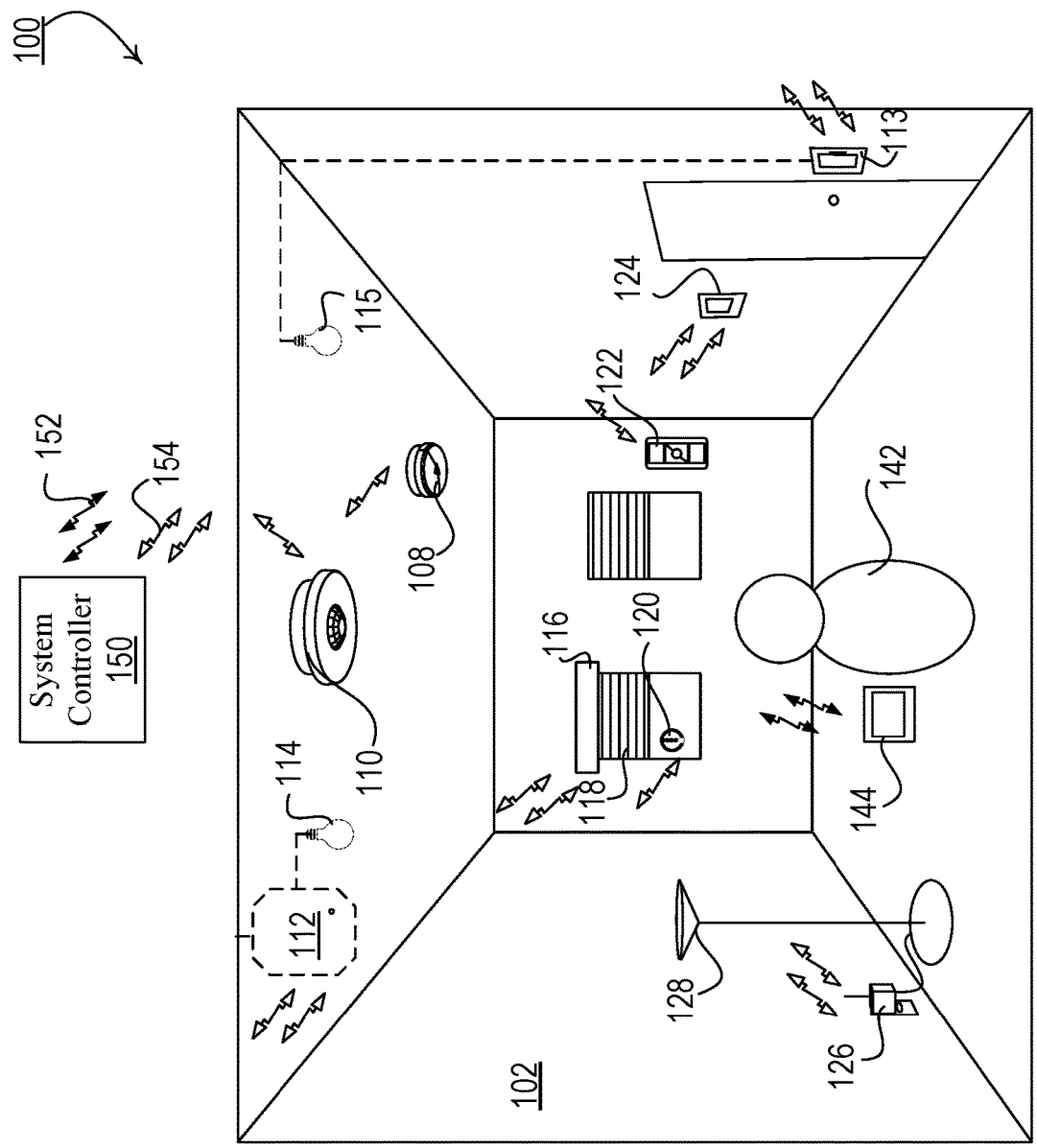
FIG. 1 is a system diagram that illustrates an example load control system that includes control-devices.

FIG. 1 shows a high-level diagram of an example load control system 100. Load control system 100 may include a system controller 150 and load control devices for controlling (e.g., directly and/or indirectly) one or more electrical loads in a user environment 102 (also referred to herein as a load control environment). Example user environments/load control environments 102 may include one or more rooms of a home, one or more floors of a building, one or more rooms of a hotel, etc. As an example, load control system 100 may enable the automated control of lighting systems, shades, and heating, ventilating, and air conditioning (HVAC) systems in the user environment, among other electrical loads.

The load control devices of load control system 100 may include a system controller 150, control-source devices (e.g., elements 108, 110, 120, and 122 discussed herein), and control-target devices (e.g., elements 112, 113, 116, 124, and 126 discussed herein) (control-source devices and control-target devices may be individually and/or collectively referred to herein as load control devices and/or control devices). The system controller 150, the control-source devices, and the control-target devices may be configured to communicate (transmit and/or receive) messages, such as digital messages (although other types of messages may be communicated), between one another using wireless signals 154 (e.g., radio-frequency (RF) signals), although wired communications may also be used. "Digital" messages will be used herein for discussion purposes only.

The control-source devices may include, for example, input devices that are configured to detect conditions within the user environment 102 (e.g., user inputs via switches, occupancy/vacancy conditions, changes in measured light intensities, and/or other input information) and in response to the detected conditions, transmit digital messages to control-target devices that are configured to control electrical loads in response to instructions or commands received in the digital messages. The control-target devices may include, for example, load control devices that are configured to receive digital messages from the control-source devices and/or the system controller 150 and to control respective electrical loads in response to the received digital messages. A single control device of the load control system 100 may operate as both a control-source device and a control-target device.

According to one example, the system controller 150 may be configured to receive the digital messages transmitted by the control-source devices, to interpret these messages based on system configuration data of the load control system, and to then transmit digital messages to the control-target devices for the control-target devices to then control respective electrical loads. In other words, the control-source devices and the control-target device may communicate via the system controller 150. According to another and/or additional example, the control-source devices may directly communicate with the control-target devices without the assistance of the system controller 150. The system controller may still monitor such communications. According to a further and/or additional example, the system controller 150 may originate and then communicate digital messages with control-source devices and/or control-target devices. Such communications by the system controller 150 may include programming/system configuration data (e.g., settings) for the control devices, such as configuring scene buttons on light switches. Communications from the system controller 150 may also include, for example, messages directed to control-target devices and that contain instructions or commands for the control-target devices to control respective electrical loads in response to the received messages. For example, the system controller 150 may communicate messages to change light levels, to change shade levels, to change HVAC settings, etc. These are examples and other examples are possible.

Communications between the system controller 150, the control-source devices, and the control-target devices may be via a wired and/or wireless communications network as indicated above. One example of a wireless communications network may be a wireless LAN where the system controller, control-source devices, and the control-target devices may communicate via a router, for example, that is local to the user environment 102. For example, such a network may be a standard Wi-Fi network. Another example of a wireless communications network may be a point-to-point communications network where the system controller, control-source devices, and the control-target devices communicate directly with one another using, for example, Bluetooth, Wi-Fi Direct, a proprietary communication channel, such as CLEAR CONNECT™, Thread, ZigBee, etc. to directly communicate. Other network configurations may be used such as the system controller acting as an access point and providing one or more wireless/wired based networks through which the system controller, the control-source devices, and the control-target devices may communicate.

For a control-target device to be responsive to messages from a control-source device, the control-source device may first need to be associated with the control-target device. As one example of an association procedure, a control-source device may be associated with a control-target device by a user 142 actuating a button on the control-source device and/or the control-target device. The actuation of the button on the control-source device and/or the control-target device may place the control-source device and/or the control-target device in an association mode for being associated with one another. In the association mode, the control-source device may transmit an association message(s) to the control-target device (directly or through the system controller). The association message from the control-source device may include a unique identifier of the control-source device.

The control-target device may locally store the unique identifier of the control-source, such that the control-target device may be capable of recognizing digital messages (e.g., subsequent digital messages) from the control-source device that may include load control instructions or commands. The control-target device may be configured to respond to the digital messages from the associated control-source device by controlling a corresponding electrical load according to the load control instructions received in the digital messages. This is merely one example of how control devices may communicate and be associated with one another and other examples are possible. According to another example, the system controller 150 may receive system configuration data (e.g., or subsequent updates to the system configuration data) from a user that specify which control-source devices should control which control-target devices. Thereafter, the system controller may communicate this system configuration data to the control-source devices and/or control-target devices.

As one example of a control-target device, load control system 100 may include one or more lighting control devices, such as the lighting control devices 112 and 113. The lighting control device 112 may be a dimmer, an electronic switch, a ballast, a light emitting diode (LED) driver(s), and/or the like. The lighting control device 112 may be configured to directly control an amount of power provided to a lighting load(s), such as lighting load 114. The lighting control device 112 may be configured to wirelessly receive digital messages via signals 154 (e.g., messages originating from a control-source device and/or the system controller 150), and to control the lighting load 114 in response to the received digital messages. One will recognize that lighting control device 112 and lighting load 114 may be integral and thus part of the same fixture or bulb, for example, or may be separate.

The lighting control device 113 may be a wall-mounted dimmer, a wall-mounted switch, or other keypad device for controlling a lighting load(s), such as lighting load 115. The lighting control device 113 may be adapted to be mounted in a standard electrical wall box. The lighting control device 113 may include one or more buttons for controlling the lighting load 115. The lighting control device 113 may include a toggle actuator. Actuations (e.g., successive actuations) of the toggle actuator may toggle (e.g., turn off and on) the lighting load 115. The lighting control device 113 may include an intensity adjustment actuator (e.g., a rocker switch or intensity adjustment buttons). Actuations of an upper portion or a lower portion of the intensity adjustment actuator may respectively increase or decrease the amount of power delivered to the lighting load 115 and thus increase or decrease the intensity of the receptive lighting load from a minimum intensity (e.g., approximately 1%) to a maximum intensity (e.g., approximately 100%). The lighting control device 113 may include a plurality (two or more) of visual indicators, e.g., light-emitting diodes (LEDs), which may be arranged in a linear array and that may illuminate to provide feedback of the intensity of the lighting load 115.

The lighting control device 113 may be configured to wirelessly receive digital messages via wireless signals 154 (e.g., messages originating from a control-source device and/or the system controller 150). The lighting control device 113 may be configured to control the lighting load 115 in response to the received digital messages.

As described herein, a lighting control device, such as the lighting control device 113 or 112 may control a lighting load (e.g., or a plurality of lighting loads), such as the lighting load 114 or 115, where the lighting load may include a plurality of multi-colored LEDs (light emitting diodes). In other words, the lighting load may include within a single package, for example, a number of differently colored emission LEDs and may be configured such that the chromaticity output of the LEDs is mixed to produce light having varying chromaticity coordinates (e.g., color points) within a color gamut formed by the various LEDs that make up the lighting load. As one example, a lighting load may include one or more red LEDs, one or more green LEDs, one or more blue LEDs, and one or more white, or substantially white LEDs (e.g., such as yellow and/or mint green LED(s)) (which may be collectively referred to herein as a RGBW lighting load). Although the RGBW lighting load is described herein with a combination of four LEDs of certain colors, other combinations of LEDs (e.g., more or less LEDs and/or different color LEDs) may be used.

The lighting control device may adjust various settings of the lighting load(s) to adjust the light emitted from the lighting load. For example, the lighting control device may adjust the lighting intensity (i.e., brightness), the color (e.g., CCT or full color), vibrancy, CRI, etc., which are further described herein. Further, the lighting control device may adjust the settings of lighting load(s) over time (referred to herein as natural show or natural lighting). For example, the lighting control devices may adjust the settings of the lighting load(s) over time to emulate a sunrise and/or sunset, which, as described herein, may be based on the local time of sunrise and/or sunset for the load control system/user environment.

A lighting control device and such a respective lighting load may be configured to produce white or near-white light of varying brightness/intensities within a range of correlated color temperatures (CCTs) ranging from "warm white" (e.g., roughly 2600 K-3700 K), to "neutral white" (e.g., 3700 K-5000 K) to "cool white" (e.g., 5000 K-8300 K), for example (i.e., produce light of varying chromaticity coordinates that lie along the black body locus or curve). As a further example, such a lighting control device and its respective lighting load may be further configured to produce any of a plurality of colors of varying brightness/intensities within the color gamut formed by the various LEDs that make up the lighting load.

According to a still further aspect, a lighting control device and its respective lighting load may be configured to one of three states or modes, including a non-vibrancy state/mode, an auto vibrancy state/mode (e.g., optimizing the CRI value towards or above a threshold CRI values, as described herein), and/or an adjustable vibrancy state/mode (e.g., the user may select the vibrancy level) (also referred to herein a vibrancy state/mode). The chromaticity coordinates of the mixed color output of the lighting load may be the same (or approximately the same) in the modes. However, the intensities of the various LEDs may be varied between the modes. In the vibrancy mode, the intensity of the white LED(s) for example, may be reduced (such as to 0%, for example) as compared with the non-vibrancy mode, with the intensities of the remaining red, green, and/or blue LEDs adjusted to maintain the same color output (or approximately the same) between the two modes. Similarly, non-vibrancy mode may increase the intensity of the white LED(s) (with the intensities of the remaining red, green, and/or blue LEDs adjusted to maintain the same color output (or approximately the same) as when in the vibrancy mode). In an example, vibrancy mode may include a pre-defined vibrancy level whereby there is increased vibrancy as compared to non-vibrancy mode. In another example, vibrancy mode may include an adjustable vibrancy state/mode where the vibrancy level may be adjustable by a user and provide the user with the ability to manually adjust vibrancy levels (e.g., adjustable vibrancy state/mode).

In general, vibrancy mode may increase the intensity of one or more wavelengths produced by the red, green, and/or blue LEDs, for example, thereby causing certain objects within a space to look more "vibrant." As referred to herein and according to an example where vibrancy mode may include a pre-defined vibrancy level, vibrancy mode may be referred to as a high vibrancy mode or a vibrancy "on" setting, and non-vibrancy mode may be referred to as a low vibrancy mode or a vibrancy "off" setting (e.g., which may be a "normal" setting).

"Vibrancy," as described herein, may be referred to as the ability to tune the individual colors that make light at a given color (e.g., full color or a CCT). When vibrancy is adjusted, the color of the light may remain unchanged. Adjusting vibrancy may, however, adjust the light reflected off of objects in the space. In addition, adjusting vibrancy may adjust spectral power distribution (SPD) of the light. For example, as vibrancy increases, an SPD curve of the emitted light (e.g., relative intensity vs wavelength) may become sharper and/or may result in individual colors on the objects to appear more vibrant when the light reflects off of them.

Again, according to one example, the difference between the modes may be the intensity setting of the white LED(s)/the amount the white LED(s) (e.g., or other LEDs) contribute to the mixed color output of the lighting load, with the white LED(s) contributing less in vibrancy mode as compared to non-vibrancy mode. Other examples are also possible. One example of a lighting control device and respective lighting load as described above is a luminaire or lamp as provided by Lutron Ketra. Another example of such a lighting control device and respective lighting load is described as illumination device 38 of U.S. Patent Application Publication Number 2018/0077770, the contents of which are hereby incorporated by reference in their entirety. One will recognize that other examples lighting control device and respective lighting loads are possible.

A light output of a lighting load may be measured by a color rendering index (CRI) value. The CRI value may be a measurement of the lighting load's ability to reveal the actual color of objects as compared to an ideal light source (e.g., natural light). A higher CRI value may be a desirable characteristic of a user. For example, a lighting load with a higher CRI value may provide light such that the objects within a space reflect light at a natural color. With respect to the lighting loads described herein, each of the respective LEDs that are comprised within a RGBW lighting load, for example, may be defined by a certain CRI value. In addition, an RGBW lighting load, for example, itself may be defined by a CRI value (e.g., a CRI value that indicates a summary or average CRI of each of the respective LEDs comprised within the lighting load). CRI values may be in the range of 0 to 100, inclusively. For example, the lowest possible CRI value may be 0 and the highest possible CRI value may be 100. In auto vibrancy state/mode as described herein, a control/configuration application as described herein may be used to configure a CRI value of one or more lighting loads. A CRI value greater than or equal to a threshold (e.g., a CRI value of 90) may be desirable and may be referred to herein as "optimal," "optimized," or "maximized." That said, other ranges (e.g., smaller and/or larger ranges) may also be considered "optimal," "optimized," or "maximized."

In certain instances, the CRI value of a lighting load may be increased to a value greater than or equal to a threshold CRI value. For example, the threshold CRI value may be 90. One will appreciate, however, that the threshold CRI value may be other values. Rather, the CRI threshold value may be a value which may be considered a desirable threshold that a system may attempt to achieve give the certain characteristics of the load control system and/or lighting control devices (e.g., quality of the LEDs used in a lighting load). As described herein, optimizing the CRI value towards or above the threshold CRI value may be referred to as optimizing the CRI value. This feature may be enabled through the auto vibrancy state/mode.

A user may configure or control certain values for the settings described herein (e.g., lighting intensity, color, CCT, vibrancy, etc.) for one or more lighting loads and save the settings to a defined in a scene. For example, as described herein, a user may configure or control certain values for the settings saved to a defined scene by interaction with one or more graphical user interfaces that may be displayed by a control/configuration application. The user may configure the scene to control one more lighting loads, for example, by assigning the scene to control a zone that the one more lighting loads are assigned to. The scene may also be associated with a button on a remote control device or keypad, and the scene may be enabled or activated when the button is pressed. When a scene is activated, one or more messages that include control instructions for controlling the lighting loads in accordance with the scene may be transmitted.

A user may also configure or control the values for the settings described herein (e.g., lighting intensity, color, CCT, vibrancy, etc.) to change over time, which is referred to herein as natural show or natural lighting functionality. For example, the settings of a lighting load may be configured to change over time and emulate sunrise and/or sunset. Again, a user may change or update the settings of a natural show or natural lighting functionality, for example, via a network device. For example, as described herein, a control/configuration application of the network device may display one or more graphical user interface, and the user may interact with the graphical user interface to make changes or updates the natural show settings. After being configured, natural show functionality may assigned to and/or enabled by a scene (e.g., by pressing a button that enables the scene). Also, or alternatively, natural show functionality may be enabled based on a schedule or in response to the detection of an event, such as an occupancy sensor detecting occupancy.

The load control system 100 may include one or more other control-target devices, such as a motorized window treatment 116 for directly controlling the covering material 118 (e.g., via an electrical motor); ceiling fans; a table top or plug-in load control device 126 for directly controlling a floor lamp 128, a desk lamp, and/or other electrical loads that may be plugged into the plug-in load control device 126; and/or a temperature control device 124 (e.g., thermostat) for directly controlling an HVAC system (not shown). The load control system 100 may also, or alternatively, include an audio control device (e.g., a speaker system) and/or a video control device (e.g., a device capable of streaming video content). Again, these devices may be configured to wirelessly receive digital messages via wireless signals 154 (e.g., messages originating from a control-source device and/or the system controller 150). These devices may be configured to control respective electrical loads in response to the received digital messages.

Control-target devices, in addition to being configured to wirelessly receive digital messages via wireless signals and to control respective electrical loads in response to the received digital messages, may also be configured to wirelessly transmit digital messages via wireless signals (e.g., to the system controller 150 and/or an associated control device(s)). A control-target device may communicate such messages to confirm receipt of messages and actions taken, to report status (e.g., light levels), etc. Again, control-target devices may also or alternatively communicate via wired communications.

With respect to control-source devices, the load control system 100 may include one or more remote-control devices 122, one or more occupancy sensors 110, one or more daylight sensors 108, and/or one or more window sensors 120. The control-source devices may wirelessly send or communicate digital messages via wireless signals, such as signals 154, to associated control-target devices (e.g., directly or via the system controller) for controlling an electrical load. The remote-control device 122 may send digital messages for controlling one or more control-target devices after actuation of one or more buttons on the remote-control device 122. One or more buttons may correspond to a preset scene for controlling the lighting load 115 or 112/114, for example. The occupancy sensor 110 may send digital messages to control-target devices in response to an occupancy and/or vacancy condition (e.g., movement or lack of movement) that is sensed within its observable area. The daylight sensor 108 may send digital messages to control-target devices in response to the detection of an amount of light within its observable area. The window sensor 120 may send digital messages to control-target devices in response to a measured level of light received from outside of the user environment 102. For example, the window sensor 120 may detect when sunlight is directly shining into the window sensor 120, is reflected onto the window sensor 120, and/or is blocked by external means, such as clouds or a building. The window sensor 120 may send digital messages indicating the measured light level. The load control system 100 may include one or more other control-source devices. Again, one will recognize that control-source devices may also or alternatively communicate via wired communications.

Turning again to the system controller 150, it may facilitate the communication of messages from control-source devices to associated control-target devices and/or monitor such messages as indicated above, thereby knowing when a control-source device detects an event and when a control-target device is changing the status/state of an electrical load. It may communicate programming/system configuration data to the control devices. The system controller 150 may also be the source of control messages to control-target devices, for example, instructing the devices to control corresponding electrical loads. As one example of the later, the system controller may run one or more time-clock operations that automatically communicates messages to control-target devices based on configured schedules (e.g., commands to lighting control device 113 to adjust lighting load 115, commands to lighting control device 112 to adjust lighting load 115, commands to motorized window treatment 116 for directly controlling the covering material 118, etc.) For description purposes only, shades will be used herein to describe functions and features related to motorized window treatments. Nonetheless, one will recognize that features and functions described herein are applicable to other types of window coverings such as drapes, curtains, blinds, etc. Other examples are possible.

According to a further aspect of load control system 100, the system controller 150 may be configured to communicate with one or more network devices 144 in use by a user(s) 142, for example. The network device 144 may include a personal computer (PC), a laptop, a tablet, a smart phone, or equivalent device. The system controller 150 and the network device 144 may communicate via a wired and/or wireless communications network. The communications network may be the same network used by the system controller and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible such as the system controller acting as an access point and providing one or more wireless/wired based networks through which the system controller and network device may communicate.

The load control system 100 of FIG. 1 may be configured such that the system controller 150 is only capable of communicating with a network device 144 when that device is local to the system controller 150, e.g., for the network device 144 and system controller 150 to directly communicate in a point-to-point fashion or through a local network specific to the user environment 102 (e.g., such as a network provided by a router that is local to the user environment). For example, a user of network device 144 may communicate with the system controller 150 to control the load control system 100 from remote locations, such as via the Internet or other public or private network. Similarly, third-party integrators may also communicate with the system controller 150, for example, in order to provide enhanced services to users of user environment 102. For example, a third-party integrator may provide other systems within user environment 102. It may be beneficial to integrate such systems with load control system 100. Accordingly, the network device 144 may be configured to allow the user 142 to configure or control the load control system 100.

As described herein, the system controller 150 may be configured to communicate with one or more network devices 144 in use by a user(s) 142. The network device 144 may include a personal computer (PC), a laptop, a tablet, a smart phone, or another electronic computing device (e.g., a cloud computing device). In addition, the network device 144 may be a device local to the load control system 100 (e.g., as illustrated in FIG. 1) or an external device (e.g., accessed via the cloud). The system controller 150 and the network device 144 may communicate via a wired and/or wireless communications network. The communications network may be the same network used by the system controller 150 and the control devices, or may be a different network (e.g., a wireless communications network using wireless signals 152). As one example, the system controller 150 and the network device 144 may communicate over a wireless LAN (e.g., that is local to the user environment 102). For example, such a network may be a standard Wi-Fi network provided by a router local to the user environment 102. As another example, the system controller 150 and the network device 144 may communicate directly with one-another using, for example, Bluetooth, Wi-Fi Direct, etc. Other examples are possible such as the system controller acting as an access point and providing one or more wireless/wired based networks through which the system controller and network device may communicate.

In general, the system controller 150 may be configured to allow a user 142 of the network device 144 to determine, for example, the system configuration data for the user environment 102 and load control system 100, such as rooms in the environment, which control devices are in which rooms (e.g., the location of the control devices within the user environment, such as which rooms), to determine the status and/or configuration of control devices (e.g., lighting intensity levels, color, CCT, vibrancy, HVAC levels, shade levels), to configure the system controller (e.g., to change time clock schedules), to issue commands to the system controller in order to control and/or configure the control devices (e.g., change light levels, change HVAC levels, change shade levels, change presets, etc.), etc. Other examples are possible as described herein.

The network device 144 may include a control/configuration application for generating and/or compiling the intended system configuration data for the user environment 102 and load control system 100 (e.g., as further described herein). The control/configuration application may be used to generate system configuration data, for example, via the user providing inputs and/or configuration information to the control/configuration application. After generating the system configuration data and/or updating the system configuration data, the network device 144, via the control/configuration application, may transmit the system configuration data (e.g., or any updates) to other devices in the load control system 100 (e.g., the system controller 150, remote-control device 122, control target devices, etc.). Then, in response to a triggering event (e.g., enabling a scene, enabling natural light, a sensor event, etc.), for example, one or more devices may perform control based on the system configuration data.

System configuration data may include information about the devices in a user environment or load control system. For example, system configuration data may include the location of the devices within the load control system or user environment (e.g., a text string that represent a device's location) and/or if the device is assigned to a certain zone. In addition, the system configuration data may define the scenes of the load control system, the respective setting for each of the defined scenes (e.g., lighting intensity levels, vibrancy, color, CCT, etc.), and/or the buttons that may be pressed to enable each of the defined scenes. The system configuration data may also include the natural show or natural lighting functionality (e.g., changes in lighting intensity, color, and/or CCT over time) defined for the load control system. The system configuration data may include additional information about the devices in the user environment or load control system, and the examples provided herein are not exhaustive. The system configuration may include any configuration information that may be used to configure or control a user environment or load control system (e.g., one or more of a unique identifiers of a device, a list of associated devices, a zone identifier, a scene identifier, etc.).

The load control system 100 of FIG. 1 may be configured such that the system controller 150 is capable of communicating with a network device 144 when that device is local to the system controller, in other words, for the two to directly communicate in a point-to-point fashion or through a local network specific to the user environment 102 (such as a network provided by a router that is local to the user environment). It may be advantageous to allow a user of network device 144 to communicate with the system controller 150 and to control the load control system 100 from remote locations, such as via the Internet or other public or private network. Similarly, it may be advantageous to allow third-party integrators to communicate with the system controller 150 in order to provide enhanced services to users of user environment 102. For example, a third-party integrator may provide other systems within user environment 102. It may be beneficial to integrate such systems with load control system 100.

Figure 2:
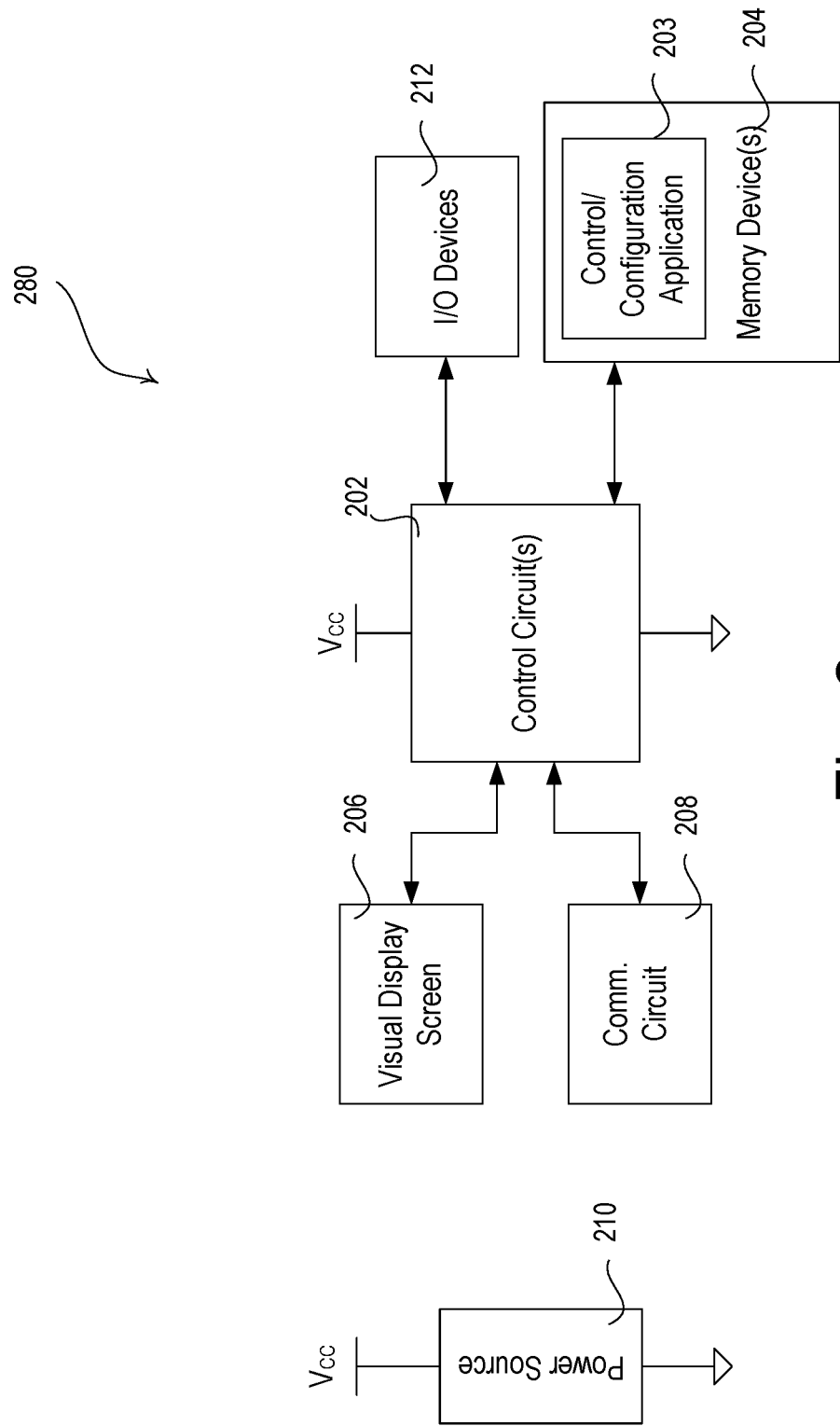
FIG. 2 is a block diagram of an example network device.

FIG. 2 shows an example block diagram of network device 280 (this diagram may also apply to the network devices 144 or a remote network device, for example). Network device 280 may include one or more general purpose processors, special purpose processors, conventional processors, digital signal processors (DSPs), microprocessors, microcontrollers, integrated circuits, programmable logic devices (PLD), application specific integrated circuits (ASICs), or the like and/or may further include other processing element(s) such as one or more graphic processors (hereinafter collectively referred to as control circuits(s) 202). Control circuit(s) 202 may control the functionality of the network device and may execute the control/configuration application 203, in addition to other software applications such an operating system(s), database management systems, etc., to provide features and functions as describe herein. The control circuit(s) 202 may also perform signal coding, data processing, power control, input/output processing, and any other functionality that enables the network device 280 to perform as described herein. The network device 280 may also include one or more memory 204 (including volatile and non-volatile memory) which may be non-removable memory and/or a removable memory.

Memory 204 may be communicatively coupled to the control circuit(s) 202. Non-removable memory 204 may include random-access memory (RAM), read-only memory (ROM), a hard disk(s), or any other type of non-removable memory storage. Removable memory 204 may include a subscriber identity module (SIM) card, a memory stick, a memory card, or any other type of removable memory. The one or more memory 204 may store the control/configuration application 203 and may also provide an execution space as the processor(s) execute the control/configuration application. Network device 280 may also include a visual display screen(s)/terminal(s) 206 that may be communicatively coupled to the control circuit(s) 202. Together with control circuit(s) 202, visual display screen(s) 206 may display information to the user via one or more GUI based interfaces/GUI based "window(s)" as described herein. The display screen(s) 206 and the control circuit(s) 202 may be in two-way communication, as the display screen 206 may include a touch sensitive visual screen component configured to receive information from a user and providing such information to the control circuit(s) 202

Network device 280 may also include one or more input/output (I/O) devices 212 (e.g., a keyboard, a touch sensitive pad, a mouse, a trackball, audio speaker, audio receiver, etc.) that may be communicatively coupled to the control circuit(s) 202. The I/O devices may allow the user to interact with the control/configuration application 203, for example. Network device 280 may further include one or more transceivers/communications circuits (collectively, communications circuit(s) 208) for communicating (transmitting and/or receiving) over wired and/or wireless communication networks, for example. The communications circuit(s) 208 may include an RF transceiver(s) or other circuit(s) configured to perform wireless communications via an antenna(s). Communications circuit(s) 208 may be in communication with control circuit(s) 202 for transmitting and/or receiving information. Each of the components within the network device 280 may be powered by a power source 210. The power source 210 may include an AC power supply and/or DC power supply, for example. The power source 210 may generate a supply voltage(s) Vcc for powering the components within the network device 280.

In addition to including GUI based software components, for example, that provide the graphical features and visual images described herein, the control/configuration application 203 may also include a logic engine(s) for providing features of the GUI and features of the application in general as described herein. The GUI based software components and/or logic engine may be one or more software based components that include instructions, for example, that are stored on and/or execute from one or more tangible memory devices/components of the network device as indicated above. Features of the control/configuration application may also and/or alternatively be provided by firmware and/or hardware in addition to/as an alternative to software based components. Again, network device 280 is an example and the control/configuration application may execute on other types of computing devices.

As indicted, network device 280 may be similar to the network device 144 (e.g., including an external network device accessed via a cloud), as described herein. Accordingly, the control/configuration application may communicate with the other devices of the user environment (e.g., the system controller, control-source devices, control-target devices etc.) via a network local to the user environment (such as a Wi-Fi network). Nonetheless, one will recognize that the control/configuration application 203/network device 280 may communicate with other devices using other communication systems and/or protocols, etc. In addition, the control/configuration application 203 is described herein as being a self-contained application that executes on the network device 280 and communicates messages with the system controller, for example. In other words, logic of the control/configuration application and generated graphics associated with the application are described herein as executing from the network device. Nonetheless, features and/or graphics of the control/configuration application may be implemented in other fashions, such as a web hosted application with the network device interfacing with the web hosted application using a local application (e.g., a web browser or other application) for providing features and functions as described herein. As one example, the system controller may function as the web host.

In general, while a user environment may include control devices that the control/configuration application/network device 280 may interact with, control, and/or configure via a system controller (e.g., the system controller 150), the user environment may also include other types of control devices that may be, for example, Wi-Fi enabled and/or internet of things enabled control devices for example (e.g., devices that are configured to communicate via wireless and/or wired based networks, such as HomeKit). For description purposes, such other control devices (e.g., control devices to which the control/configuration application and/or network device 280 does not communicate with via the system controller) may be referred to herein as Wi-Fi enabled and/or HomeKit enabled control devices. Nonetheless, one will recognize that the features described herein are not limited to Wi-Fi enabled and/or HomeKit enabled control devices. Examples of such other control devices may include lighting control devices/bulbs, thermostats, fans, etc.

Network device 280 and the Wi-Fi enabled control devices, for example, may be configured to directly communicate with each other without having to communicate through a system controller (e.g., if the network device is also HomeKit enabled), and/or may communicate via one or more cloud based servers, for example, again without communicating through the system controller. According to one aspect of the control/configuration application 203 described herein, assuming the network device 280 is configured to communicate with such Wi-Fi enabled control devices (e.g., via HomeKit), for example, the control/configuration application may be configured to also interact with, control, and/or configure these devices, in addition to control devices. In so doing, the control/configuration application may combine within the graphical interfaces described herein information obtained from such Wi-Fi enabled devices, for example, and information obtained on control devices that are controlled by the system controller.

The control/configuration application 203 may also provide interfaces that allow a user to control and/or configure both Wi-Fi enabled control devices, for example, and control devices that are controlled by the system controller. For ease of description, the control/configuration application 203 will be described herein as interacting with control devices of a load control system. Nonetheless, similar functionality as described herein may also apply to Wi-Fi enabled devices that may not be controlled via the system controller and to which the network device may directly and/or indirectly communicate. One will also recognize that the control/configuration application described herein may alternatively control Wi-Fi enabled devices, for example, with which the network device 280 is configured to directly and/or indirectly control/interact with. Again, one will further recognize that while control/configuration application 203 is described herein in the context of a load control system and communication systems, the features and functions of the control/configuration application are applicable to other types of control devices, load control systems, and communication systems including for example, Wi-Fi enabled and/or HomeKit enabled systems As one example, the network device 280 may display to a user via a visual display screen 206 an icon associated with the control/configuration application 203. The network device 280 may detect the selection of the icon by the user (e.g., such as detecting the using touching the icon) and in response, may start (e.g., which may also be referred to herein as launching, running, executing, activating and/or invoking) the control/configuration application 203. The control/configuration application may be started in other ways, including the network device being configured to automatically start the application upon being reset and/or powered on. In response to being started or launched, the control/configuration application (in addition to performing security/authentication procedures, for example) may communicate one or more messages to the system controller, for example, to obtain/request/query for various information, such as status/state and/or configuration information of the load control system, and use this information to initially generate and display to the user via the display screen of the network device 280 a graphical user interface. Again, at starting, for example, the control/configuration application may also communicate with Wi-Fi enabled devices, for example, the network devices have been configured to communicate with. Thereafter, the control/configuration application may continue to request and/or receive various information from the system controller at various times depending on what information the control/configuration application may need to display to the user and/or is being generated by the system controller. Again, the control/configuration application 203 may also communicate with Wi-Fi enabled devices in a similar fashion.

Upon receiving information requests from the control/configuration application 203 (such as requests for status and configuration information), the system controller may respond by communicating with control devices and/or a database(s), for example, to determine and provide the requested information and respond to the control/configuration application with one or more response messages. In addition to determining status and configuration of the load control system, for example, the control/configuration application 203 may also allow a user to communicate messages to the system controller to modify, edit, or change the configuration and/or state of the load control system as further described herein. In addition, the system controller may also asynchronously provide status and configuration information to the control/configuration application (e.g., provide an indication of status/state changes of control devices without the control/configuration application querying for such changes). The control/configuration application may use this information to update various graphical user interfaces displayed to the user via the network device 280. Again, Wi-Fi enabled devices and the control/configuration application and/or network device may interact in similar fashions.

Before turning to the various graphical user interfaces, the control/configuration application 203 may provide to a user, a description of example types of information the control/configuration application may request/receive and/or configure, for example, to generate interfaces is discussed. For example, as described herein, the control/configuration application may request/obtain this information from another device (e.g. system controller and/or one more control source devices). Also, or alternatively, the information may be maintained or stored locally (e.g., stored at the memory device(s) 204). In addition to receiving this information, the control/configuration application may also alter such information at the system controller, as described herein.

The control/configuration application may request/obtain information related to the configuration and current state/status of a load control system from another device in the load control system, such as the system controller and/or one or more control source devices (e.g., the remote-control device 122). Also, or alternatively, the network device 280 may itself store or maintain the configuration and current state/status information (e.g. or a subset of the configuration and current stat/status information), and the control/configuration application 203 may request/obtain this information from the memory device(s) 204. Such information may include, for example, the specific control devices that are part of the load control system including an identifier that indicates the type of the control device The specific control device types may include, for example, one or more lighting control devices (also referred to herein also as lighting devices) that each directly controls one or more respective electrical lighting loads/lights, one or more temperature control devices (such as and hereinafter also referred to as a thermostat device(s)) that directly control respective HVAC systems, one or more ceiling fan devices (also referred to herein as fan devices) that each directly controls one or more respective fans (e.g., on, off, fan speed), one or more audio control devices (e.g., a speaker system), and one or more window shade devices that each directly controls positions or levels of one or more respective shades (One will recognize that while shade devices and shades are discussed herein as an example of motorized window treatments and window covering, other types of motorized window treatments and window coverings are possible such as drapes, curtains, blinds, etc.).

The control source devices may include one or more keypads, such as wall-mounted keypads, tabletop keypads, and/or remote-control/handheld keypads and devices (e.g., remote-control device 122). As an example, a given keypad may include one or more actuators such as buttons (although other types of actuators are possible), and may be configured to control one or more control devices/electrical loads (e.g., lighting control devices/lighting load(s), HVAC system(s), shade(s), fan(s), and/or speaker(s), etc.). A keypad may include different types of actuators such as on/off actuators, raise lower actuators for lights or shades, fan speed actuators, scene actuators, natural show actuators etc. For example, a scene actuator may set one or more control devices/electrical loads controlled by the keypad to a pre-set configuration (e.g., a scene, as described herein). Similarly, a natural show actuator may set one or more control devices/electrical loads controlled by the keypad to a pre-set configuration that may change over time (e.g., a nature show or natural lighting configuration configured to simulate a natural lighting functionality, as described herein).

The configuration and current state/status information may also include a location indicator for each control device that may indicate a location of the device within the user environment and/or the location of the electrical loads the device controls. This indicator may be in the form of a location name (e.g., a text string) and/or an indicator that may be translated into a location name (e.g., a text string), although other mechanisms may be used. For example, assuming the user environment is a home, possible locations may include standard locations like "kitchen," "living room," "family room," "dining room," "master bedroom," "bedroom," "master bathroom," "bathroom," "basement," "front porch," "office," "lobby," "conference room," etc. Locations may also include sub-locations in a room like "basement—sitting area," "basement—game area," basement—work area," basement—storage area," etc. Locations may also include user defined/customized locations like: "Mary's bedroom," "John's bedroom," etc. The location of a control device may be programmed into the load control system (and stored in database, for example) by a user when installing the system within the user environment. One will recognize these are examples.

For lighting control devices, the configuration and current state/status information may also include a type indicator that may indicate a type of a lighting load(s) (also referred to herein as a light(s)) controlled by the control device. A type of a lighting load may include, for example, the function/purpose of the lighting load within its defined location and/or indicate/suggest a specific location of the lighting load within its defined location (e.g., ceiling light vs floor lamp). A type indicator may be in the form of a name/function (e.g., a text string) and/or an indicator that may be translated into a name/function (e.g., a text string), although other mechanism may be used. As an example, assuming the user environment is a home, standard types may include ceiling or overhead light, chandelier, pendant(s), table lamp(s), floor lamp(s), sconce(s), sink light(s) (e.g., for a kitchen or bathroom), island light(s) (e.g., for a kitchen), closet light(s), accent lights, downlights, desk area lights, etc. Types may also include user defined/customized types. The type of lighting load may be programmed into load control system (and stored in a database, for example) by a user when installing the system within the user environment. One will recognize these are examples.

Types may also apply to other control devices such as fans, shades, and keypads. Again, the type indicator may provide an indication of a specific function and or location within the device's defined location. Other example types may include "left shade," "right shade," "center shade," "wall keypad," "tabletop keypad," etc.

As described herein, the current state/status information may also include a current status/state and/or configuration of one or more of the control devices. For example, for a lighting control device the status information may include whether the respective lighting load(s) are in an on or off state, and if in the on state whether it is a dimmed state and possibly further the dimming level, color setting, vibrancy setting, etc. The control/configuration application may allow the user to modify scenes and to create new scenes via the network device. For an occupancy sensor, the status information may include, for example, whether the sensor has detected an occupancy event/condition and/or is in an occupancy state, has detected a continued occupancy event/condition and/or is in a continued occupancy state, and/or has detected a vacancy condition and/or is in a vacancy state. Again, these are examples and other information is possible.

As another example, a device in the load control system, such as the system controller and/or one or more control source devices, may maintain information related to one or more pre-programmed scenes that may be actuated by a user from an application, such as the control/configuration application 203 or a control source device, such as the remote-control device 122. A scene may include, for example, certain settings for one or more lights, shades, etc. The device may maintain respective scene configuration information in a database. The control/configuration application may request/obtain information related to these pre-programmed scenes and as further described below, thereafter allow the user, via the network device, to a select a given scene, resulting in the control/configuration application instructing the another device (e.g., the system controller and/or one or more control source devices) to configure control devices according to the selected scene (e.g., set one more light levels, fan speeds, shade levels, etc.). As also described below, the control/configuration application may allow a user to modify the pre-programmed scenes maintained and to create and store new scenes that may subsequently be selected by the user. After the scene are created and stored, the scenes may be assigned. For example, a scene may be assigned to one or more zones in the load control system, and enabled by, for example, pressing a certain button at a remote control device.

As a still further example, various time clock schedules may be maintained where a schedule may be, for example, a certain setting for one or more control devices (e.g., lights, shades, etc.) that the system controller or one or more control-source devices automatically configure based on the schedule. For example, the system controller may maintain respective time clock schedules in a database and the status of these schedules, such as whether a given schedule is active, inactive, or disabled. The control/configuration application may obtain control information related to these time clock schedules and as further described below, thereafter allow the user via the network device to modify these schedules and to create new schedules.

A load control system may be configured and/or controlled according to one or more defined scenes. Also, or alternatively, the load control system may be further divided into one or more areas or locations (e.g., depending on the size of the load control system or user environment), and each of the areas or locations within the load control system may be configured and/or control according to one or more scenes. The scenes may be activated, for example, in response to a button press at a control source device (e.g., remote control device 122), via a graphical user interface on a network device (e.g., the network devices 144, 280), and/or based on a time clock, as described herein. Also, or alternatively, a load control system may be configured and/or controlled according to natural show or natural lighting configuration, which as described herein, may be activated in response to a button press at a control source device, via a graphical user interface at a network device, and/or based on a time clock etc. As described herein, a natural show or natural lighting configuration may be defined separately from a scene, or assigned to a scene (e.g., such that activating a scene enables a natural show or natural light configuration). Further, a control/configuration application (e.g., the control/configuration application 203) may display one or more graphical user interface to allow a user to define the scenes and/or configure the natural show or natural lighting settings.

As described herein, the devices in a load control system may be grouped or organized together based on their respective location within the user environment. For example, the devices in a load control system may be grouped and/or organized based on their respective location in the user environment (e.g. the devices in a single room may be organized or grouped together). After the devices are grouped or organized based on their location in the user environment, the devices may also be assigned to a certain zone. For example, the lighting devices in a certain location of a user environment may be assigned to a zone based on their respective function (e.g., the lighting control devices that are intended to emit light a certain surface, such as desk, may be grouped or organized together in a "Desk Area" zone).

Grouping or organizing the devices in a load control system based on their location and then assigning them to a zone (e.g., based on their function) may allow a user to configure or control the devices within a load control system more efficiently. For example, as the number of device in the load control system increases, the settings that may be configured by the user may also increase. And without grouping or organizing the device into a more manageable subset of devices, the user may fail to accurately and efficiently control the increased number of devices in the load control system. Moreover, the capabilities and, as a result, the configurable settings of each of the devices may differ, further increasing the complexity of configuring or controlling the load control system. If, however, the devices are grouped by their respective location and then assigned to a zone (e.g., based on their respective function), the user may configure the devices in the load control system by zone, which may improve the accuracy and efficiency of configuring and controlling the load control system.

After the devices in a load control system are organized and grouped by location and subsequently assigned to a zone, a user may collectively configure or control the devices that are assigned to a given zone. Further, since the devices that are assigned to a given zone based on their respective function, the settings for devices in that zone (e.g., lighting intensity and/or color) may be configured to be the same, which may improve the accuracy and efficiency of configuring and controlling the load control system.

FIGS. 3A and 3B are flowcharts that illustrate example procedures for configuring or controlling a load control system. Referring first to FIG. 3A, there is shown an example procedure 300 for displaying and updating system configuration data for a load control system. The procedure 300 may be performed by a control/configuration application, such as the control/configuration application 203, and may enter at 301. For example, the procedure 300 may enter in response to an indication from a user to update the system configuration data (e.g., configuration and current state/status information) for a load control system (e.g., via a network devices, such as the network devices 144, 280). The procedure 300 may be performed after the devices in a load control system have been grouped or organized by their respective location in a user environment and subsequently assigned to zones. Also, or alternatively, the procedure 300 may be performed prior to the devices in a load control system being grouped or organized by their respective location in a user environment and/or assigned to a zone, which may be stored and/or maintained in the system configuration data.

At 302, the control/configuration application may retrieve the system configuration data for the load control system. For example, the system configuration data may indicate or otherwise describe the devices that are configured in the load control system. The system configuration data may include a unique identifier of the locations or areas of the user environment/load control system that the devices are organized or grouped by. The system configuration data may also include a unique identifier of the zones within each of the locations or areas that the devices are assigned to, and/or one or more defined scenes for controlling the devices assigned to the zones. The system configuration data may be retrieved from a single device (e.g., a system controller, such as the system controller 150), or portions of the system configuration data may be retrieved from multiple devices (e.g., a system controller, network device, one or more control source devices, and/or one or more control target devices). The system configuration data may also be obtained from devices external to the load control system, such as from cloud based system or other load control systems to which a given load control system is integrated with.

After retrieving the system configuration data, the control/configuration application may display a representation of the system configuration data (e.g., or a portion of the system configuration data) at 304. For example, the control/configuration application may display a representation of a defined scene for controlling one or more zones in an area of user environment or load control system via a graphical user interface. In addition, one or more lighting control device configured to control a corresponding lighting load may be assigned to each of the one or more zones. The graphical user interface may display various controls or control interfaces based on the lighting control device/lighting loads assigned to a given zone. For example, the graphical user interface may display a lighting intensity (e.g., via lighting intensity bar) for each of the one or more zones in the defined scene and/or a palette that identifies a color setting for controlling each of the one or more zones in the scene. The palette may be configured to display colors at different color temperatures at which the lighting control devices/lighting loads are capable of being controlled to, or a full color gamut of colors at which the lighting control devices/lighting load are capable of being controlled to. Also, or alternatively, the control/configuration application may display a representation of the system configuration data in the form of a graph. The graph may include one or more axes (e.g., a color temperature axis that indicates color temperatures, an intensity axis that indicates lighting intensity values, and/or a time axis that includes a period of time at which the lighting intensity and the color temperatures are controlled), which may indicate changes in settings (e.g., lighting intensity, color, CCT, etc.) of the lighting control device/lighting loads assigned to a given zone over time (referred to herein as natural show).

At 306, the control/configuration application may receive updates or changes to the system configuration data, for example, from a user. As described herein, changes to the system configuration data may include changes or updates to the settings (e.g., lighting intensity, color, CCT, vibrancy, etc.) for a defined scene; changes or updates to a natural show, etc. Accordingly, the control/configuration application may receive changes or updates to the system configuration data via the displayed lighting intensity and/or palette. FIGS. 4A to 4G and FIGS. 5A to 5N illustrate example graphical user interfaces that may be displayed by the control/configuration application to represent the system configuration data and/or receive updates to the system configuration data.

At 308, control/configuration application may determine whether there are additional updates to the system configuration data. If the control/configuration application determines that there are additional updates, the control/configuration application may receive the additional updates. If, however, the control/configuration application determines that there are no additional updates, the control/configuration may store or send (e.g., store the updated configuration data locally or send the configuration data to another device, such as a system controller) the updated system configuration data at 310 and the procedure 300 may exit at 311. For example, the control/configuration application may determine that there are no additional updates when the control/configuration application receives an indication from a user that there are not additional updates to the system configuration data (e.g., selecting a "Save" or "Finished" button, such as the "Save to Scene" button 438 described herein with respect to FIG. 4B).

Referring now to FIG. 3B, there is shown an example procedure 350 for controlling a load control system based on a system configuration data, which, as described herein, may be defined or updated using the procedure 300. The procedure 350 may be performed by a single device. For example, the procedure 350 may be performed by a system controller, a lighting control device, a network device, or another control device to perform control using the system configuration data stored thereon. Also, or alternatively, the procedure 350 may be performed by multiple devices (e.g., a portion of the procedure 350 may be performed by a first load control device and another portion of the procedure 350 may be performed by a second load control device). For example, the system controller may retrieve the system configuration data (e.g., either locally or from another device) and perform control based on the system configuration data (e.g., by transmitting one or more message that include control instructions to perform control based to one or more lighting control devices based on the system configuration data).

As illustrated in FIG. 3B, the procedure 350 may be performed in response to the detection of a triggering event at 351. A triggering event may be an event that causes the devices in a load control system to be controlled according to the system configuration data. For example, as described herein, a triggering event may be caused by a user actuation for activating a scene (e.g. by pressing a button that corresponds to a scene at a remote control device); a scheduled event (e.g., based on a time clock); and/or a sensor event (e.g., an occupancy sensor detecting occupancy). Accordingly, the system configuration data may be retrieved at 352. As described herein, the system configuration data may be stored at a system controller and/or across one or more other devices (e.g., remote-devices, network devices, lighting control devices, other control devices, etc.). Therefore, the system configuration data may be retrieved from a system controller and/or from one or other devices in the load control system. After retrieving the system configuration data, control may be performed based on the system configuration data at 354. For example, control may be performed by transmitting one or more messages that include control instructions to the load control device based on the system configuration data. In another example, control may be performed at the load control device by controlling the electrical load thereon. The procedure 350 may exit at 355.

Turning now to FIGS. 4A-4G and FIGS. 5A-5N, they illustrate example control/configuration applications that may be executed at least in part on a network device, such as the control/configuration application 203 of the network device 280, for configuring or controlling a load control system. For example, FIGS. 4A-4G and FIGS. 5A-5N may illustrate graphical user interfaces that may be displayed by the control/configuration application to display and/or update the system configuration data for a load control system. Again, the network device may be similar to the network devices 144, 280 as described herein and may be a personal computer (PC), a laptop, a tablet, a smart phone, or equivalent device, for example, although it may also be another type of computing device. The control/configuration application may be a graphical user interface (GUI) based application that may provide a GUI based interface/GUI based "window(s)" to a user via the network device and may allow a user of the network device to interact with, control, and/or configure control devices within a user environment (e.g., user environment 102) or load control system (e.g. the load control system 100). For description purposes only, the load control system 100 of user environment 102 and the communication systems described with respect to FIG. 1 will be used herein as an example load control system and communication system to describe the control/configuration application. Nonetheless, the features and functions of the control/configuration application described herein are applicable to other types of control devices, load control systems, and communication systems. As an example, the user environment 102 may be a residence or home and the user of the network device may be a resident of the home. Nonetheless, the example control/configuration application may also be applicable to other types of user environments, such as a building, hotel, etc. and the user of the network device may be a system administrator.

Referring now to FIGS. 4A to 4G, there is shown example graphical user interfaces that may be displayed by the control/configuration application. As described herein, a user may interact with the graphical user interfaces to configure or control a load control system. For example, the graphical user interfaces may provide for the configuration or control of one or more lighting control devices in the load control system, for example, by defining one or more scenes. As described herein, a scene may include certain settings for one or more lights, shades, etc. And when a scene is activated (e.g., via button press of a remote-control device or keypad) one or more messages that include control instructions may be transmitted to control the respective devices in the load control system in accordance with the scene. Also, or alternatively, the graphical user interfaces may provide for the configuration or control of one or more lighting control devices in the load control system by defining a natural show or natural lighting configuration. As further described herein, a natural show or natural lighting configuration may allow a user to configure or control the one or more lighting control devices over time.

Figure 4A:
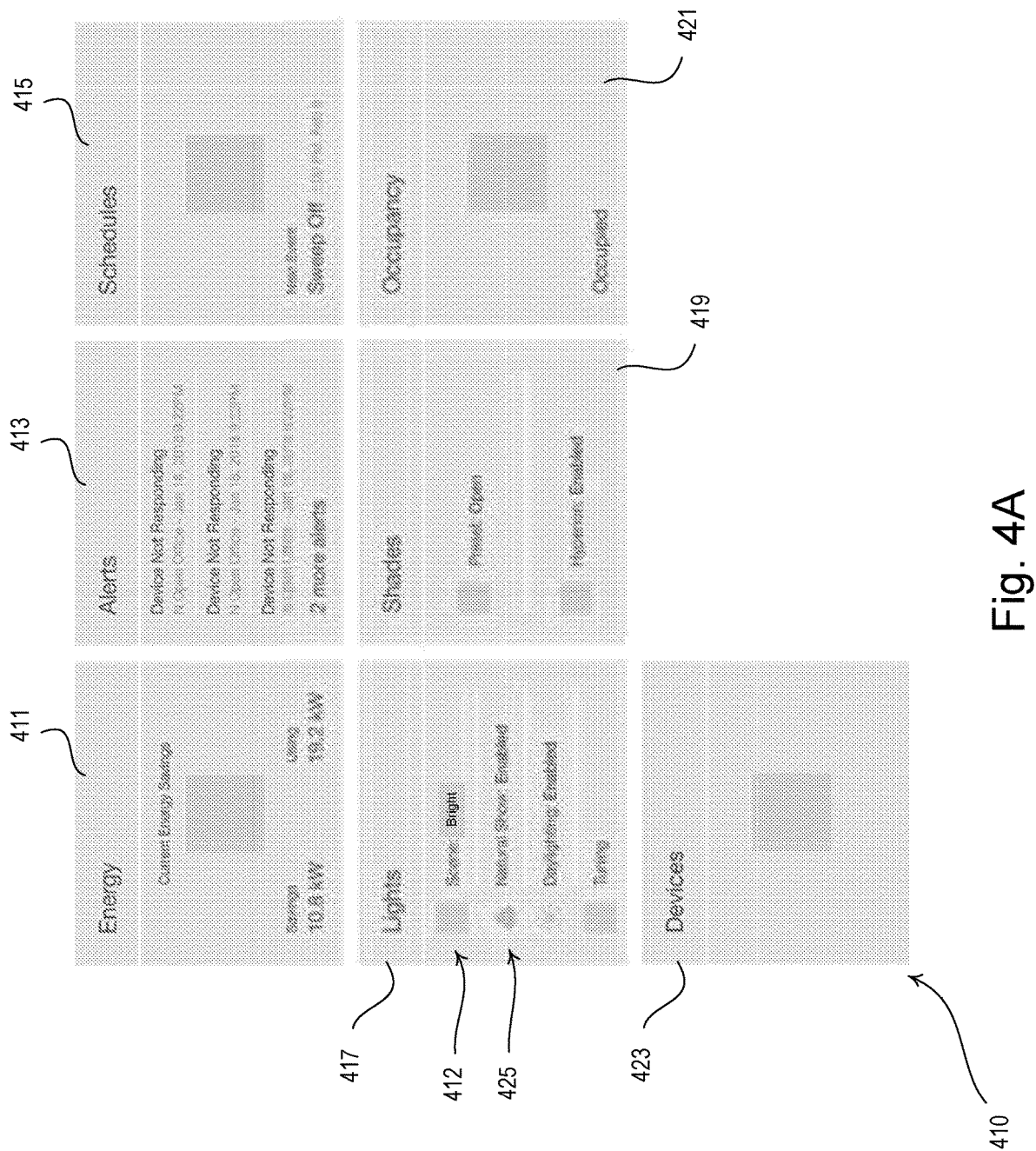
FIGS. 4A-4G show example graphical user interfaces of an application that may allow a user to determine scene information and to control a load control system and/or one or more load control devices.

Referring now to FIG. 4A, there is shown a graphical user interface 410 that may be displayed by the control/configuration application. The graphical user interface 410 may be displayed to a user via the network device 280, for example. The graphical user interface 410 may be displayed by the control/configuration application after the devices in a load control system have been grouped or organized by their respective location in the user environment and subsequently assigned to a zone (e.g., based on their function). For example, the system configuration data may be generated and stored during a commissioning procedure such that control devices may be associated with one another and/or one or more zones. Scenes may be defined and/or predefined during the commissioning procedure and stored in the system configuration data, such that the control devices and/or settings for the scenes may be displayed on the graphical user interface 410 using the control/configuration application. Also, or alternatively, the graphical user interface 410 (e.g., or a similar graphical user interface) may be displayed by the control/configuration application before the devices in a load control system have been grouped or organized by their respective location and/or assigned to a zone. For example, the graphical user interface 410 may be displayed during a design process when the load control system is being designed. Accordingly, although FIG. 4A illustrates one type of example graphical user interface that may be displayed by the control/configuration application, other types of graphical user interfaces may also, or alternatively, be displayed.

The graphical user interface 410 may include a number of tiles 411, 413, 415, 417, 419, 421, 423. Each of tiles 411, 413, 415, 417, 419, 421, 423 may convey information to the user and/or allow for user-selection for providing additional information and/or configuration. Each of the tiles 411, 413, 415, 417, 419, 421, 423 may provide information about devices in a preselected area or room, for example, within a floor of a building. An energy tile 411 may indicate an amount of energy usage and/or savings. An alerts tile 413 may provide alerts about devices in the system. A schedules tile 415 may provide information about scheduled events to the user and/or allow a user to schedule events in the system. For example, after selection of the schedules tile 415, the user may configure lighting schedules for controlling lighting control devices in the system. A lights tile 417 may provide information about current lighting configurations in the system and/or allow a user to configure control of lighting control devices and/or lighting loads within the system. A shades tile 419 may provide information about current shade configurations in the system and/or allow a user to configure control of shades within the system. An occupancy tile 421 may provide information about current occupancy conditions in the system and/or allow a user to configure control of devices within the system in response to occupancy and/or vacancy events/conditions. A devices tile 423 may allow a user to manage and perform maintenance of devices.

A scene indicator 412 may be displayed in the lights tile 417. The scene indicator 412 may be an indication of the current scene set for one or more lighting control devices of the preselected area (e.g., the "Bright" scene as shown in FIG. 4A). The scene indicator 412 may be selectable or configurable, and/or may allow the user to select or define the scene(s) for one or more lighting control devices (e.g., the one or more lighting control devices in the preselected area). After selecting the scene indictor 412, the control/ configuration application may display a graphical user interface that provides a user with the ability to configure the settings (e.g., static settings) for one or more scenes. As an example, after selecting the scene indicator 412, the control/configuration application may display the graphical user interface 410a to configure the static settings for one or more scenes, as described herein with respect to FIGS. 4B to 4G.

A natural show indicator 425 may be displayed in the lights tile 417. The natural show indicator 425 may provide an indication that a natural show setting has been enabled or disabled for one or more lighting control devices in the preselected area. As described herein, a natural show (or natural lighting) feature may allow a user to configure or control the one or more lighting control devices over time (e.g., as compared to the static configurations that may be configured described herein, with respect to FIGS. 12B to 12G). For example, a natural show may be assigned to a scene and/or enabled when the scene is activated (e.g., via a button press at a remote control device or keypad, via a time clock schedule etc.). The natural show indicator 425 may be selectable or configurable, and/or may allow the user to select or define the natural show settings for one or more lighting control devices (e.g., the one or more lighting control devices in the preselected area or zone). A natural show setting may include a time clock based configuration of one or more lighting control devices where the control devices may be automatically controlled to change their lighting intensity values/brightness and/or color output over a defined period of time. After selecting the natural show indictor 425, the control/configuration application may display a graphical user interface that provides a user with the ability to configure the natural show settings. As an example, after selecting the natural show indictor 425 the control/configuration application may display the graphical user interface 410b to configure the natural show settings, as described herein with respect to FIGS. 5A to 5F. As another example, after selecting the natural show indictor 425 the control/configuration application may display the graphical user interface 410c to configure the natural show settings, as described herein with respect to FIGS. 5G to 5N. Further, although the natural show indicator 425 is provided on the graphical user interface 410c for configuring and/or controlling the natural show, other graphical user interfaces may also be provided for configuring and/or controlling the natural show.

Figure 4B:
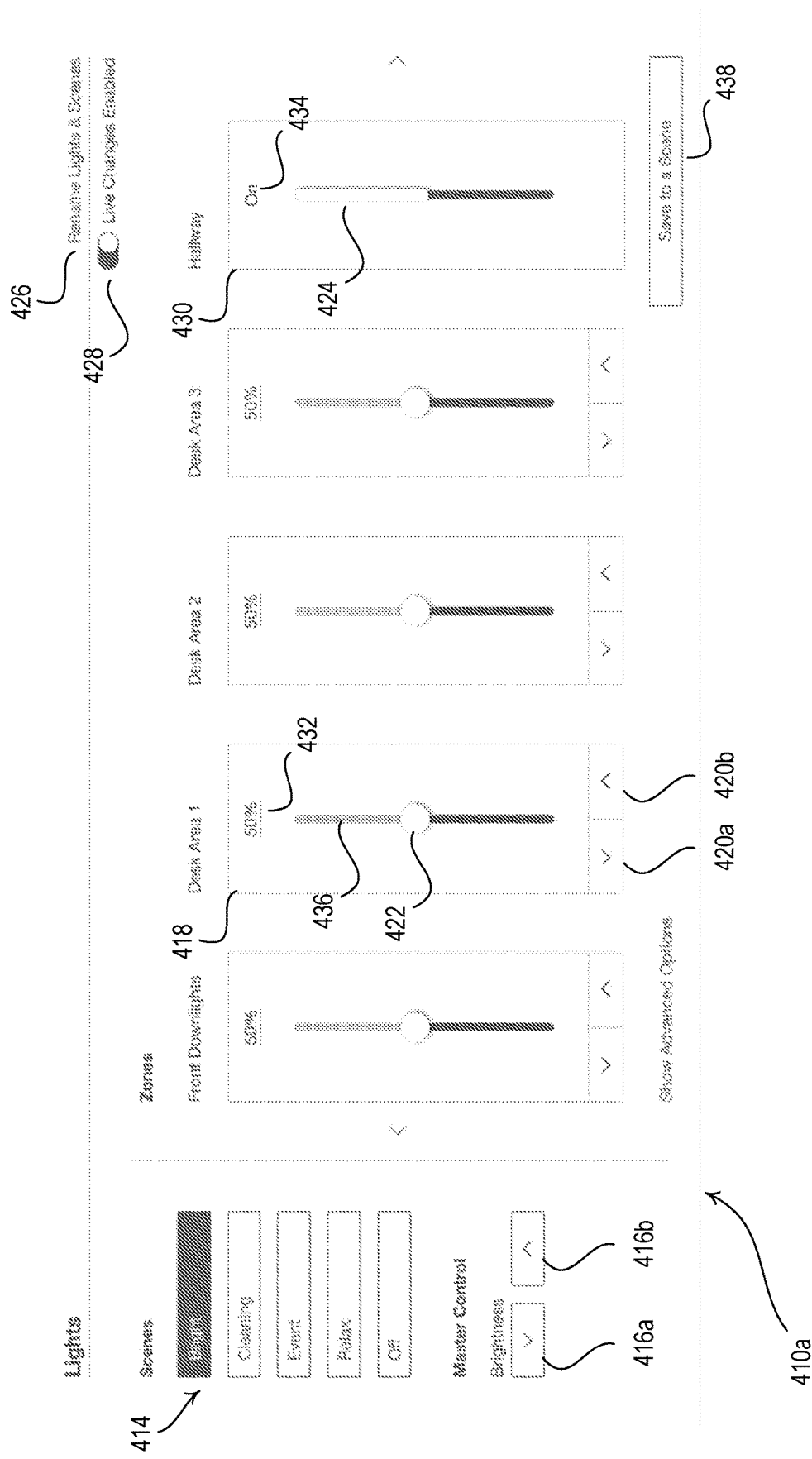

As described herein, the devices in a load control system may be grouped or organized by their respective location in a user environment and subsequently assigned to a zone (e.g., based on their function). Turning now for FIG. 4B, there is shown an example of the graphical user interface 410a that may be displayed by the control/configuration application to control the lighting intensity defined for scenes (e.g., after selection of the scene indicator 412). The graphical user interface 410a may be provided for configuring scenes in response to the scene indicator 412 (shown in FIG. 4A), for example. As described herein, a scene may control one or more zones in a given location or area of a user environment. Thus, the control/configuration application may be configured to display the graphical user interface 410a (e.g., or another similar graphical user interface) such that a user is provided with the ability to configure or control devices assigned to each zone based on their respective functionality and/or capabilities. For example, as illustrated in FIG. 4B and as further described herein, the graphical user interface 410a may display different types of controls based on the functionality and/or capabilities of the devices assigned to each of the zones (e.g., the devices in the "Desk Area 1" zone are capable of adjusting their lighting intensity and thus control interface 418 is display, whereas the devices in the "Hallway zone" are capable of toggling between an on and off state and thus the control interface 430 is displayed). The graphical user interface 410a may include scene icons 414. The scene icons 414 may indicate the scenes that are defined, e.g., for a particular area of the load control system. For example, referring to FIG. 4B, the defined scenes may include: "Bright," "Cleaning," "Event," "Relax," and "Off." Further, as described herein, each of these scenes may correspond to a respective button, for example, of a keypad that is located in given location or area of a user environment.

As described herein, the scenes defined for the load control system (e.g., or a certain area in the load control system) may be stored and/or maintained at a single device (e.g., a system controller) or across multiple devices (e.g., the system controller, and/or, the network device, one or more control source devices, and/or one or more control target devices). When a scene is selected, one or more messages that include control instructions to control the loads as defined by the scene may be transmitted. In addition, the scenes defined for the area of the load control system may be selected via the graphical user interface 410a. The scenes (e.g., and their respective configurations) may be communicated to a system controller. Each of the scenes may be separately configurable and/or programmable via the graphical user interface 410a. Further, the graphical user interface may indicate the scene that is presently being configured/programmed and/or is currently active may be indicated. For example, referring to FIG. 4B, the "Bright" scene may be the scene that is presently being configured/activated (e.g. as indicated by the "Bright" scene icon being highlighted).

After configuration, a scene may be activated via a graphical user interface, such as the graphical user interface 410a (e.g., or a different graphical user interface), or a control device, such as the remote-control device 122 and/or keypad. For example, as described herein, the control device may include one or more buttons, each of which may correspond to a configured scene. The scene may then be activated by actuating (e.g., pressing) the button that corresponds to that scene. Upon activation, the configurations defined for the scene may be retrieved. For example, the configurations may be stored and retrieved from the control device, and/or a system controller, such as the system controller 150, or the load control device(s)/lighting control device(s) themselves. Also, or alternatively, the configurations for the scene, or portions thereof, may be stored and retrieved from multiple devices. For example, part of the configuration for a scene may be stored and retrieved from the system controller, and another part of the configuration for the scene may be stored and retrieved from the control device and/or the load control device(s)/lighting control device(s) themselves. After the configuration for the scene has been retrieved, one or more messages including control instructions may be transmitted to control one or more load control devices based on the configuration of the scene.

The load control devices configured for being controlled in a given scene may be organized or grouped into one or more zones. For example, the load control devices may be organized or grouped into a given zone based on their location, function, etc. Referring to FIG. 4B, for example, the "Bright" scene may include lighting control devices that are organized or grouped in a "Front Downlight" zone, a "Desk Area" 1 zone, a "Desk Area 2" zone, a "Desk Area 3" zone, and a "Hallway" zone. Each of the zones may be separately controllable via a respective control interface. For example, the "Desk Area 1" zone may be controlled by the control interface 418 and the "Hallway" zone may be controlled by control interface 430.

The control interface of a respective zone may vary based on the load control device and/or lighting loads associated with the zone. For example, referring to FIG. 4B, the load control device(s) associated with the "Desk Area 1" zone may be a dimmer. Accordingly, control interface 418 may be configured to include one or more control interfaces to enable the user to control the dimmer. For example, as illustrated in FIG. 4B, the control interface may include an indicator 432, control line 436, and/or actuators 422, 420a, 420b. The indicator 432 may indicate the configured lighting intensity for the "Desk Area 1" zone (e.g., 50% as shown in FIG. 4B). As described herein, the actuator 422 may be actuated along the control line 436 to control the lighting intensity of the "Desk Area 1" zone. Similarly, actuator 420a may be actuated to decrease the lighting intensity of the "Desk Area 1" zone and actuator 420b may be actuated to increase the lighting intensity of "Desk Area 1" zone. Each of actuators 420a and 420b may be configured to increase/decrease the intensity by a set amount, such as 1%.

As another example, the load control device(s) associated with the "Hallway" zone may be an electrical switch. Accordingly, the graphical user interface 410 may include control interface 430 to control the lighting intensity of the "Hallway" zone. Control interface 430 may include an indicator 434 to indicate the state of the Hallway zone and an actuator 424 to control the state on the "Hallway" zone. For example, referring to FIG. 4B, the "Hallway" zone may be set to On or Off.

The lighting intensities of the respective zones in a scene may be uniformly controlled. Accordingly, the graphical user interface 410a may include Master Control actuators 416a, 416b. The Master Control actuators 416a, 416b may be used to uniformly increase and/or decrease the lighting intensities of each of the zones, each with respect to its current position. Referring now to FIG. 4B, Master Control actuator 416a may be actuated to uniformly decrease the lighting intensity (i.e., brightness) of each of the zones (e.g., by 1%) and Master Control actuator 416b may be actuated to uniformly increase the lighting intensity of each of the zones (e.g., by 1%). In other words, the actuators 416a, 416b may respectively increase and decrease the lighting intensity of each of the zones by a relative amount (e.g., respectively increase or decrease the lighting intensity of each of the zones by 1%). When the lighting intensity is defined using the Master Control actuators 416a, 416b, the lighting intensity value for each of the zones in the area displayed on the graphical user interface 410a may be updated to reflect the change in lighting intensity in response to the Master Control actuators 416a, 416b.

Figure 4C:
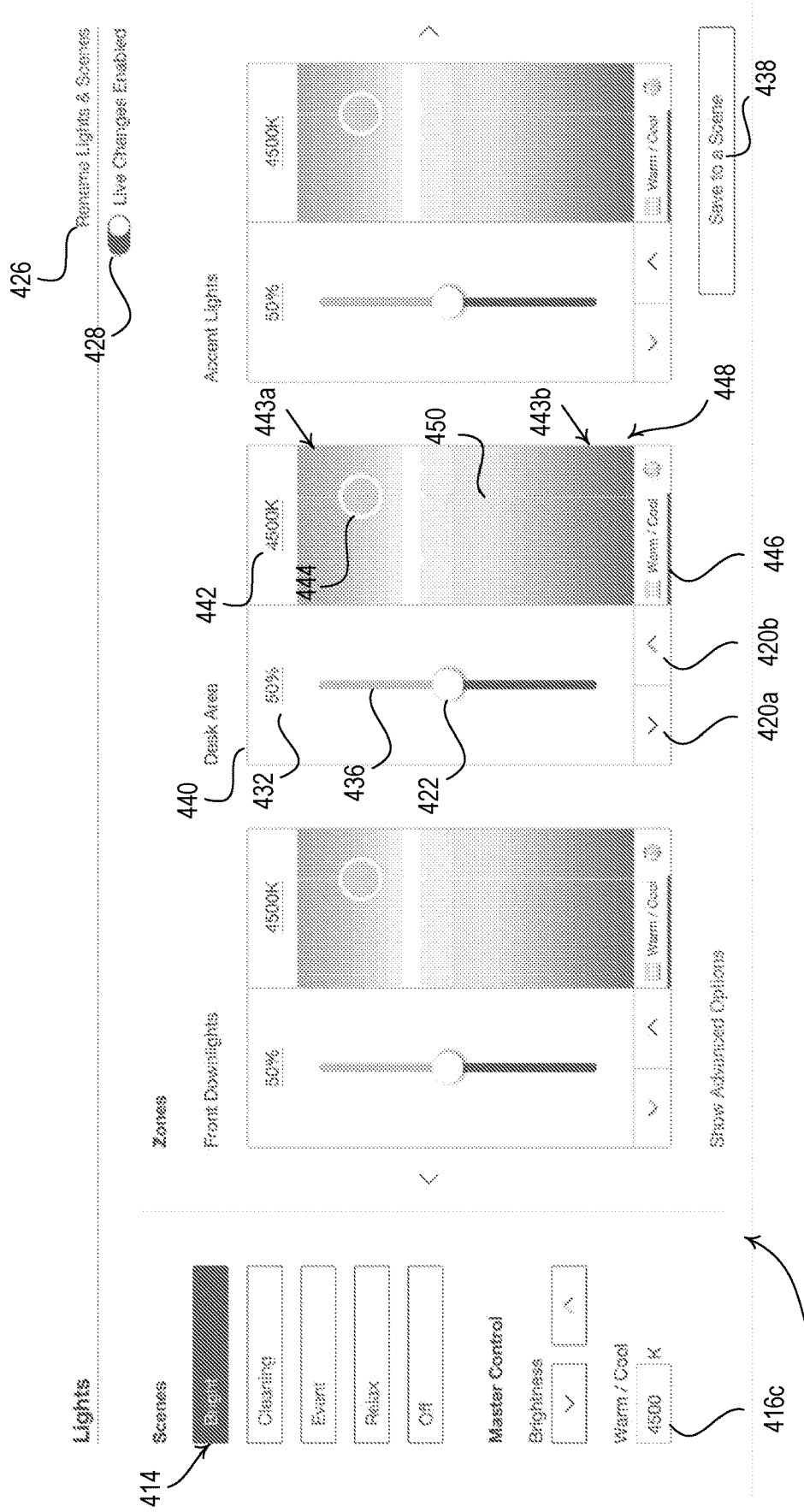
Figure 4D:
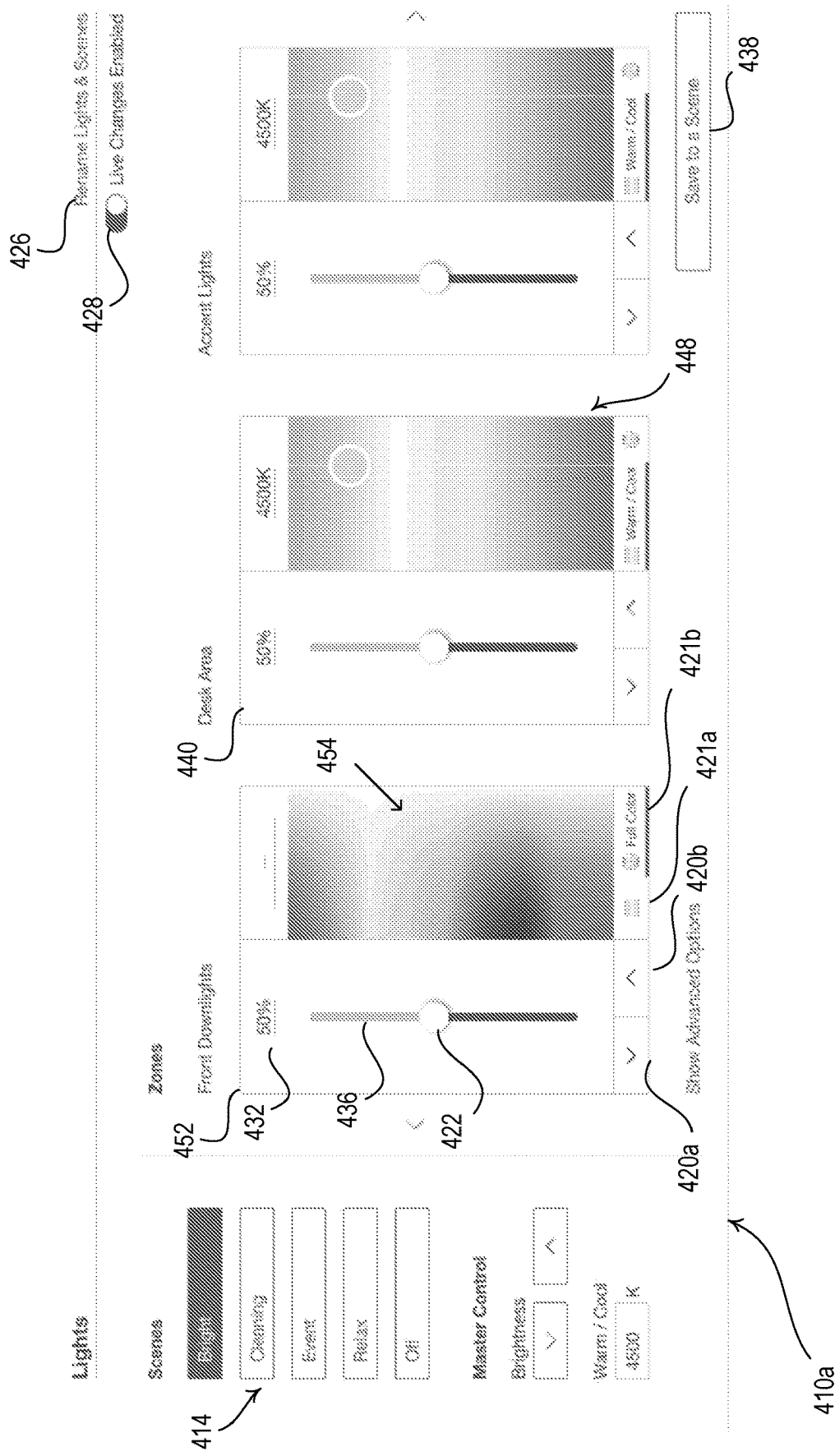

Two or more zones may similarly be associated with one another for common color and/or intensity control. For example, as shown in FIG. 4D, the "Desk Area" zone, and the "Accent Lights" zone may be associated with one another for common control. Each zone may be controlled by the Master Control actuators 416a, 416b, or through control of one of the zones (e.g., using the control interface of one zone affects the settings of the other zone). The graphical user interface 410a may include an indicator, such as a lock symbol or other indicator, to indicate each of the zones being collectively controlled.

The control/configuration application may be configured to allow the user to rename a scene and/or the corresponding zones. For example, as illustrated in FIG. 4B, the graphical user interface 410a may include a rename light and scenes button 426. The rename light and scenes button 426 may be actuated to adjust the name of the zones and/or scenes defined for the area of the load control system. The graphical user interface 410a may include a save scene button 438, which, when actuated, may save the configuration of and/or changes to a respective scene.

The control/configuration application may be configured to provide the user real-time feedback of the settings being configured. For example, the graphical user interface 410a displayed by the control/configuration application may include a "Live Changes Enabled" actuator 428. When the Live Changes Enabled actuator 428 is enabled (e.g., as show in FIG. 4B), the lighting controls that are defined by the user via the graphical user interface 410a may be present at the respective lighting control devices in the load control system. For example, control instructions that indicate the defined lighting intensities may be transmitted to the respecting lighting control devices, and the lighting control devices may transition to indicate the lighting intensities. In response, the user may be provided with live and real-time feedback of the defined lighting intensities. When the "Live Changes Enabled" actuator 428 is disabled, the lighting controls may be defined by the user via the graphical user interface 410a and may be saved for being implemented in the defined zones in the area when the defined scene is triggered (e.g., via occupancy event/condition, actuation of a button, a scheduling event, etc.). Further, as described herein with respect to FIGS. 5A to 5N, the control/configuration application may also be configured to provide the user with real-time feedback of other settings that are being configured (e.g., natural show)

A scene may define the intensity and/or correlated color temperature of a respective zone, and the control/configuration application may provide the user with the ability to configure the intensity and/or correlated color temperature defined by the scene (e.g., to a user selected color point along the black body curve). Turning now to FIG. 4C, the graphical user interface 410a may be displayed by the control/configuration application to control the warm or cool color temperature defined by a zone (e.g., because the lighting control devices and/or lighting load assigned to the zones are capable of color functionality and/or color control, as described herein). As shown in in FIG. 4C, when a respective scene further defines a color temperature, the scene indicators 414 may be highlighted with the color temperature defined for the scene (not shown). The graphical user interface 410a may also include a Master Color Control box 416c. The Master Color Control box 416c may be used by the user to uniformly control the color temperature defined for each of the zones in a scene. For example, referring to FIG. 4C, the color temperature defined for each of the zones in the Bright scene may be set to 4500 K. When the color temperature is defined using the Master Color Control box 416c the color temperature value for each of the zones in the area displayed on the graphical user interface 410a may be updated to reflect the value in the Master Color Control box 416c. When the color temperature is set to different colors for one or more of the zones for the area, the Master Color Control box 416c may be set to a default or null value. A value may be entered into the Master Color Control box 416c to automatically conform the color temperatures in each of the zones.

The graphical user interface 410a may include a control interface 440 to control the lighting intensity and color temperature defined for a zone (e.g., the "Desk Area" zone as shown in FIG. 4C), for example, upon detecting that the user has selected the warm/cool actuator 446. The control interface 440 may include an indicator 442, a palette 448, an actuator 444, and/or a control line 450. The palette 448 may show a range of colors ranging from cool colors 443a at the top of the palette 448 to warm colors 443b at the bottom of the palette 448. As described herein, these colors may correspond to colors that lie along the black body curve. For example, the palette 448 may show colors along a range of correlated color temperatures (CCTs) ranging from "warm white" (e.g., roughly 2600 K-3700 K) at 443b, to "neutral white" (e.g., 3700 K-5000 K) to "cool white" (e.g., 5000 K-8300 K) at 443a. As one example, the range CCTs may be from 1400K to 7000K, although other examples are possible.

Superimposed over the palette 448 may be an actuator 444. The actuator 444 may be movable/slide-able (e.g., here vertically movable) along the control line 450 to select different CCTs along the black body curve. Accordingly, actuator 444 may allow a user to configure the lighting control device(s) such that the lighting load(s) produces colored light at a color point along the black body curve. Assuming the lighting load(s) is producing light at a color point along the black body curve at a time prior to actuator 444 being selected by the user, the control/configuration application may display actuator 444 at a relative point along control line 450/palette 448 as shown in FIG. 4C to indicate the color being produced by the lighting load(s). Similarly, indicator 442 may also display the corresponding color. Alternatively, if the lighting load(s) is not configured to produce light at a color point along the black body curve (or is out of range of palette 448) at a time prior to actuator 444 being selected by a user, the control/configuration application may not display actuator 444. The actuator 244 may only appear once the user interacts with palette 448. And, as described herein, if the "Live Changes Enabled" actuator is enabled, the lighting loads may adjust their respective color in real time as the actuator 444 is moved across the control line 450.

The control interface 440 may include similar indicators and/or controls for controlling the intensity of the lighting control devices as illustrated in the control interface 418 shown in FIG. 4B. For example, the control interface 440 may include an indicator 432, control line 436, and/or actuators 422, 420a, 420b. The control interface 440 may allow the user to control the intensity and color temperature of lighting control devices in the defined zone.

A scene may provide for full color control of a respective zone, and the control/configuration application may provide the user with the ability to configure the full color settings defined by the scene. Turning now to FIG. 4D, the graphical user interface 410a may be displayed by the control/configuration application to control the full color defined by a zone for the respective scene. The graphical user interface 410a may include a control interface 452 to control the lighting intensity and full color for a zone (e.g., the Front Downlights zone as shown in FIG. 4D). The control interface 452 may include control line 436 and actuators 422, 420a, 420b to control the lighting intensity of the "Front Downlight" zone. The control interface 452 may include a palette 454 showing a plurality of colors that lie within the color gamut formed by the various RGBW LEDs, for example, that make up the one or more lighting loads in the defined zone.

The one or more lighting loads in the defined zone may be controlled to provide full color and/or the warm/cool colors on the black body curve. The control interface 452 may include a warm/cool color tab 421a and full color tab 421a.

Selection of the warm/cool color tab 421a may display a palette in the control interface 452 that is similar to the palette 448 shown in the control interface 440 for the "Desk Area" zone to allow the user to define warm/cool color temperatures for the lighting control devices in the "Front Downlights" zone. Selection of the full color tab 421b, however, may display the palette 454 that provides colors available for full color control.

Similar to selecting a certain CCT, a user may select a location within the color palette 454 to define a color for the corresponding zone. As illustrated in FIG. 4D, the color palette 454 may include a plurality of colors that lie within the color gamut formed by the various RGBW LEDs, for example, that make up the lighting load(s) such that different color bands are displayed from top to bottom (e.g., red, yellow, green, teal, blue, purple, etc.). The color palette 454 may be displayed such that a user may select the x-y chromaticity coordinates corresponding to a given color. The color palette 454 may include white colors on the far-right side of the color palette 454, though the white colors may be located in other areas of the color palette 454.

Figure 4E:
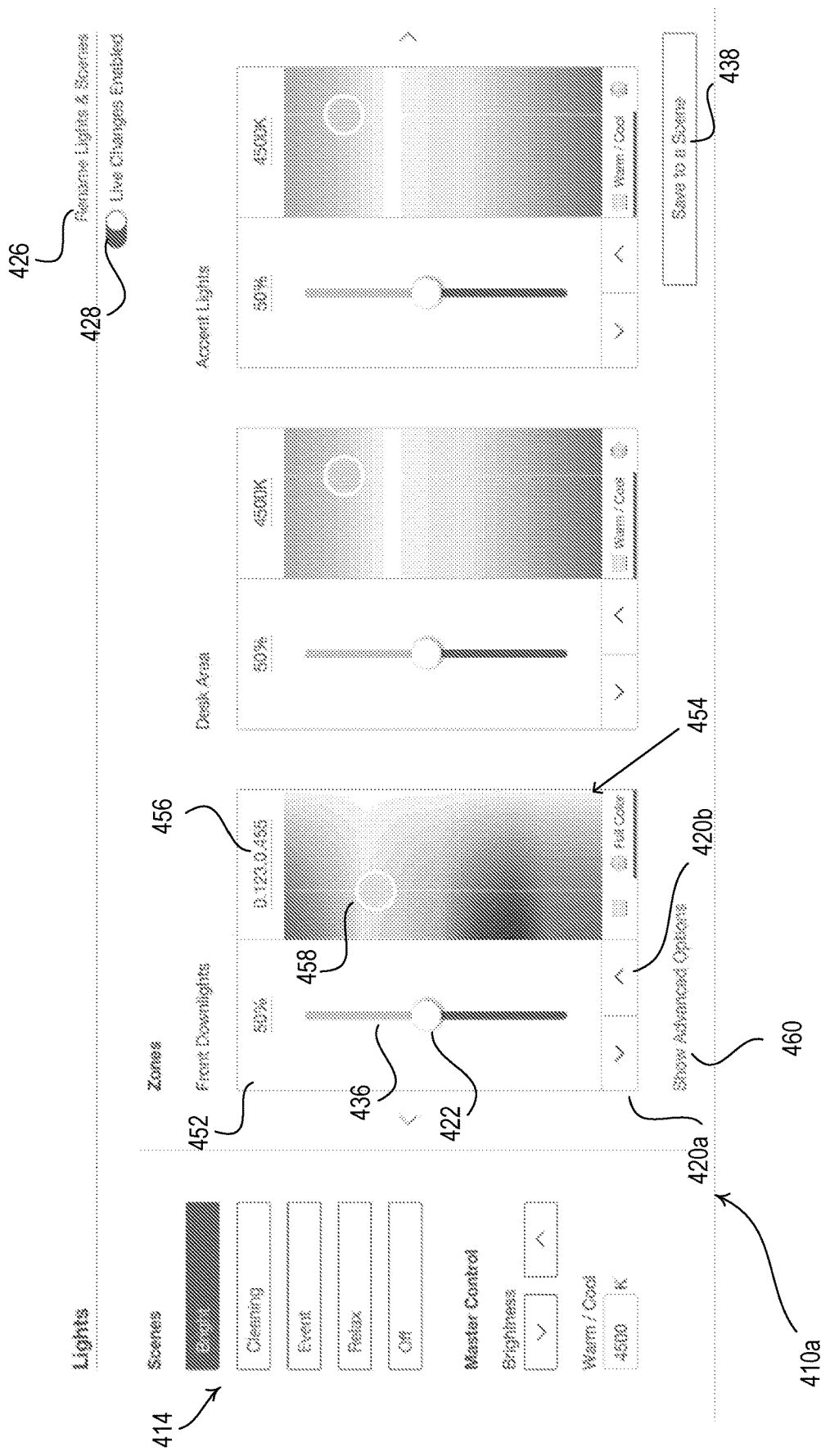

Turning now to FIG. 4E, the control interface may identify a user selection on the color palette 454. Superimposed over the palette 454 may be an actuator 458 that identifies a user selection within the color palette 454. The actuator 458 may be movable/slide-able (e.g., up, down, left, right, etc.) by the user to any of a plurality of locations/colors within palette 454. The graphical user interface 410a may display together with actuator 458 two perpendicular control lines that intersect at the center of the actuator 458. These control lines and the intersection point may move with the actuator 458 as it is moved by a user within palette 454, or as the user selects another location within the palette 454 independently. These control lines may assist the use in moving actuator 458 either horizontally or vertically or diagonally, etc. Accordingly, actuator 458 may allow a user to configure the zone such that the zone produces colored light at a color point that lies within the color gamut formed by the various RGBW LEDs, e.g., that make up the one or more lighting loads of the defined zone.

The color gamut formed by the various RGBW LEDs that make up the lighting load may be referenced using an x-y chromaticity coordinate system. Accordingly, the control interface 452 may include a coordinate indicator 456. The coordinate indicator 456 may illustrate the x-y chromaticity coordinates of the selected color. For example, referring to FIG. 4E, the color selected for the Front Downlights zone may be indicated by the x-y chromaticity coordinates [0.123, 0.455].

Upon the full color tab 421b being actuated by a user from control interface 452, or prior to the color being defined for the zone, the control/configuration application may initially display control interface 452 without actuator 458 and without the control lines, as shown in FIG. 4D. Upon the user performing a selection within the palette 454, the graphical user interface 410a may display actuator 458 and the control lines at a relative point within palette 454 to indicate the color being defined and/or produced by the one or more lighting loads within the zone.

The control/configuration application may provide a user with the ability to configure advanced options for a scene (e.g., timing options, such as fade and/or delay times, and vibrancy). Accordingly, graphical user interface 410a displayed by the control/configuration application may receive an indication from the user to allow for the configuration of advanced options. For example, as illustrated in FIG. 4E, the graphical user interface 410a may include an icon such as a "Show Advanced Options" button 460, which, when actuated by the user may cause the graphical user interface 410a to display advanced options for control of a scene.

Figure 4F:
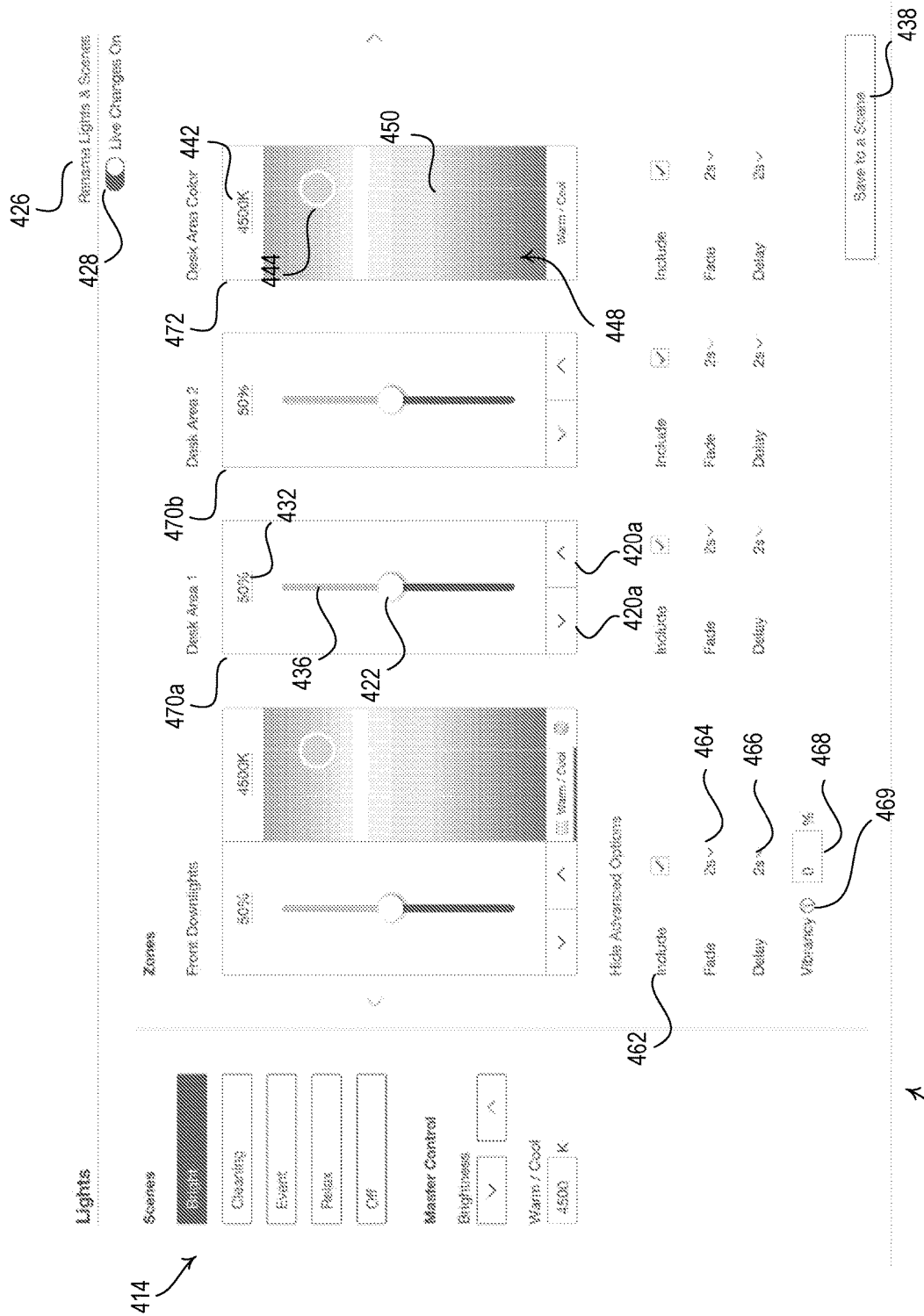

FIG. 4F shows an example of the graphical user interface 410a displaying advanced options for control of a scene. As described herein, control/configuration application may display the graphical user interface 410a in response to receiving a user indication to configure advanced options (e.g., actuating or selecting the "Show Advanced Options" button 460). Further, as shown in FIG. 4F, the graphical user interface 410a may include one or more interfaces to configure the advances options, such as: an Include box 462, Fade time box 464, Delay time box 466, and/or Vibrancy selector 468 for each of the respective zones in the area. When the Include box 462 is selected (e.g., as shown in FIG. 4F), the respective zone may be included in the scene. For example, referring to FIG. 4F, the Front Downlight and Desk Area zone may be included in the Bright scene, and when the Bright scene is activated the lighting control device(s) and/or lighting load(s) assigned to the Front Downlight and Desk Area zones may be controlled to the settings defined in the Bright scene. When the zone is included in the scene and the user selects the "Save to Scene" button 438, the lighting intensity and/or color temperature settings that are defined in the graphical user interface 410a may be generated and stored for controlling the zone in response to the scene being triggered. If, however, a zone is not included in a scene (e.g., because an indicator, such as the Include box 462, is not selected), the lighting control device(s) and/or lighting load(s) assigned to the zone may remain at their current settings. Although not shown in FIG. 4F, the function described with respect to the Include box 462 may also be applied to certain settings defined in the zone. For example, the graphical user interface 410a may also include an indicator for each of the individual settings (e.g., lighting intensity, color) defined for a given zone. When an indicator for a respective setting is "included," the lighting control device(s) and/or lighting load(s) assigned to the zone may be controlled to defined value of that setting. Similarly, when an indicator for a respective setting is not "included," the lighting control device(s) and/or lighting load(s) assigned to the zone may remain unchanged when the scene is activated.

Fade time box 464 may be used by the user to select the fade time of a zone when the selected scene is implemented. The fade time may be the period of time over which a respective zone is to transition to the lighting intensity and/or color temperature and/or color defined by a scene. For example, referring to FIG. 4F, the Front Downlights zone may transition, at the time the Bright scene is implemented, from a current lighting intensity to a 50% lighting intensity and from a current color temperature/color to a color temperature of 4500K over a period of 2 seconds. Similarly, the Delay time box 466 may be used by the user to select the delay time of a zone when the selected scene is implemented. The delay time may include the period of time during which a respective zone delays the transition indicated by the scene. For example, referring to FIG. 4F, at the time the Bright scene is implemented the Front Downlights zone may delay the transition to a 50% lighting intensity and a color temperature of 4500K for 2 seconds. The delay may be implemented prior to the fade time. Accordingly, upon a user implementing the Bright scene, the Front Downlights may wait 2 seconds before transitioning from a current intensity and color temperature/color to a 50% lighting intensity and a color temperature of 4500K over a 2 second period of time.

The control/configuration application may further provide the user with the ability configure the vibrancy settings defined by a scene for a respective zone. For example, the control/configuration application may display a graphical user interface 410a that includes a "Vibrancy" selector 468, which may be used by the user to select and/or configure the vibrancy for a particular zone within a scene. As indicated above, the vibrancy may not change (or substantially change) the color point/chromaticity coordinates of the color being produced by the lighting load. The vibrancy may, however, alter the contribution of each of the RGBW LEDs, for example, in generating the colored light, which may include reducing the intensity/contribution of the white LED(s) for example, thereby making certain objects in a space appear more vibrant.

The vibrancy may adjust the wavelength of the light emitted by the zone, which may affect the color of the light (e.g., the reflected light) on objects within the zone. Increases and/or decreases in vibrancy may increase/decrease saturation of the color of objects in the area without changing the color of the light when the user looks at the light (e.g., the color of the emitted light). The Vibrancy selector 468 may allow the user to select a relative level of vibrancy (e.g., between zero and one-hundred percent) for increasing/decreasing the vibrancy of the one or more lighting loads for a defined zone. Changing the relative level of vibrancy may include decreasing or increasing the intensity of one or more white LEDs that make up the one or more lighting loads for a defined zone, thereby increasing or decreasing vibrancy, respectively. Changing vibrancy in this manner may also include changing the intensities of other LEDs (e.g., red, green, and/or blue LEDs) of the loads in the zone to maintain the same color output of the lighting loads (e.g., to maintain the same (or approximately the same) chromaticity coordinates of the mixed color output of the lighting loads in the zone). Vibrancy selector 468 may be referred to as an adjustable vibrancy mode.

Figure 4G:
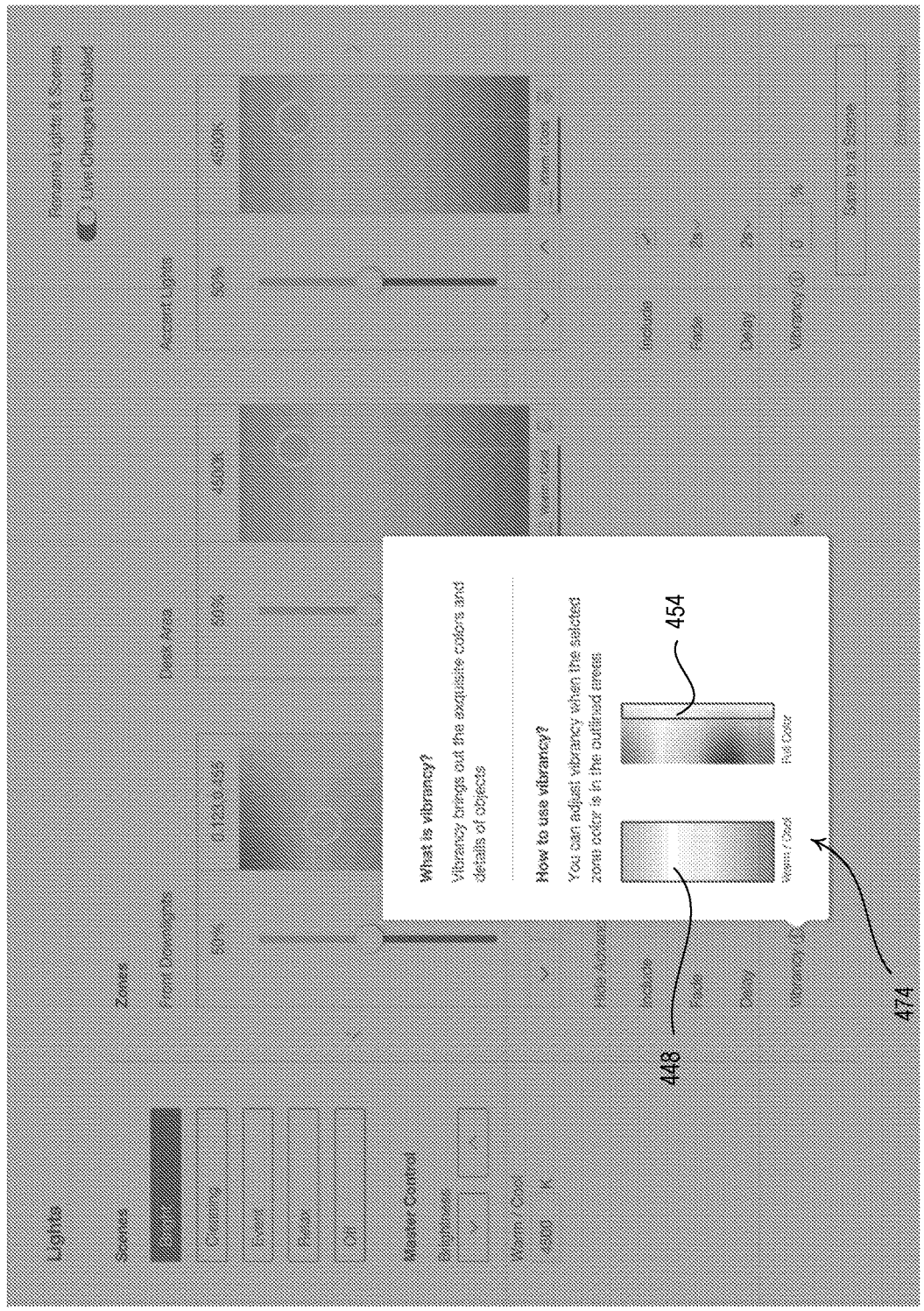

The control/configuration application may provide the user with information about how vibrancy may affect objects within the load control system. For example, the control/configuration application may be configured to display an information button 469, which may be selected by a user. In response to selecting the information button 469, the control/configuration application may display information about the effects of vibrancy and how the vibrancy may be selected for a zone by the user. For example, FIG. 4G illustrates an example display 474 that may be shown if the user selects the information button 469.

The vibrancy may be changed for each of the zones that are configured for control along the black body curve. The vibrancy may be enabled for zones that are defined for control using the warm/cool color temperature palette. The vibrancy may be controlled for lighting control devices in a zone that are being controlled along the black body curve, as the lighting control devices may be using a number of colored LEDs to generate the color temperatures that are generated along the black body curve, while also allowing variation in the use of different LEDs to increase the color being reflected to saturate the colors in the area (e.g., by reducing the intensities of the white LEDs). For zones that are being controlled using full color, the vibrancy control may be limited to colors that are within a predefined range of the colors. For example, referring to the color palette 454 shown in FIGS. 4D and 4E, the vibrancy control may be limited to a predefined set of colors on the right side of the palette 454 indicated in FIG. 4G. The predefined colors may be the 10% or 20% of colors on the right side of the palette.

Vibrancy control may be disabled when the user selects colors in the palette that are outside of this predefined set of colors, as it may not be possible to render these colors in multiple ways using, for example, different intensities of RGB and white LEDs. One will recognize that the ability to control or not control vibrancy for colors on the right of the palette may be based on the number of different color LEDs that comprise a lighting load(s).

Referring again to FIG. 4F, the graphical user interface 410*a* may control the lighting intensity of different zones of lighting control devices separately, while controlling the color temperature of the different zones in uniform. For example, the graphical user interface 410*a* may include control interfaces 470*a*, 470*b* to control the lighting intensities of two or more zones (e.g., Desk Area 1 and Desk Area 2) separately and control interface 472 to control the color temperature of the two or more zones in uniform. The control interfaces 470*a*, 470*b* may each include an indicator 432, a control line 436, and actuators 422, 420*a*, 420*b* to separately control the lighting intensity of their respective zones or lighting control devices. Similarly, the control interface 472 may include an indicator 442, a palette 448, an actuator 444, and/or a control line 450 to uniformly control the color temperature of the zones. Though control interface 472 includes a warm/cool color palette 448 for setting a color temperature along the black body curve, full color control may similarly be implemented.

Figure 5A:
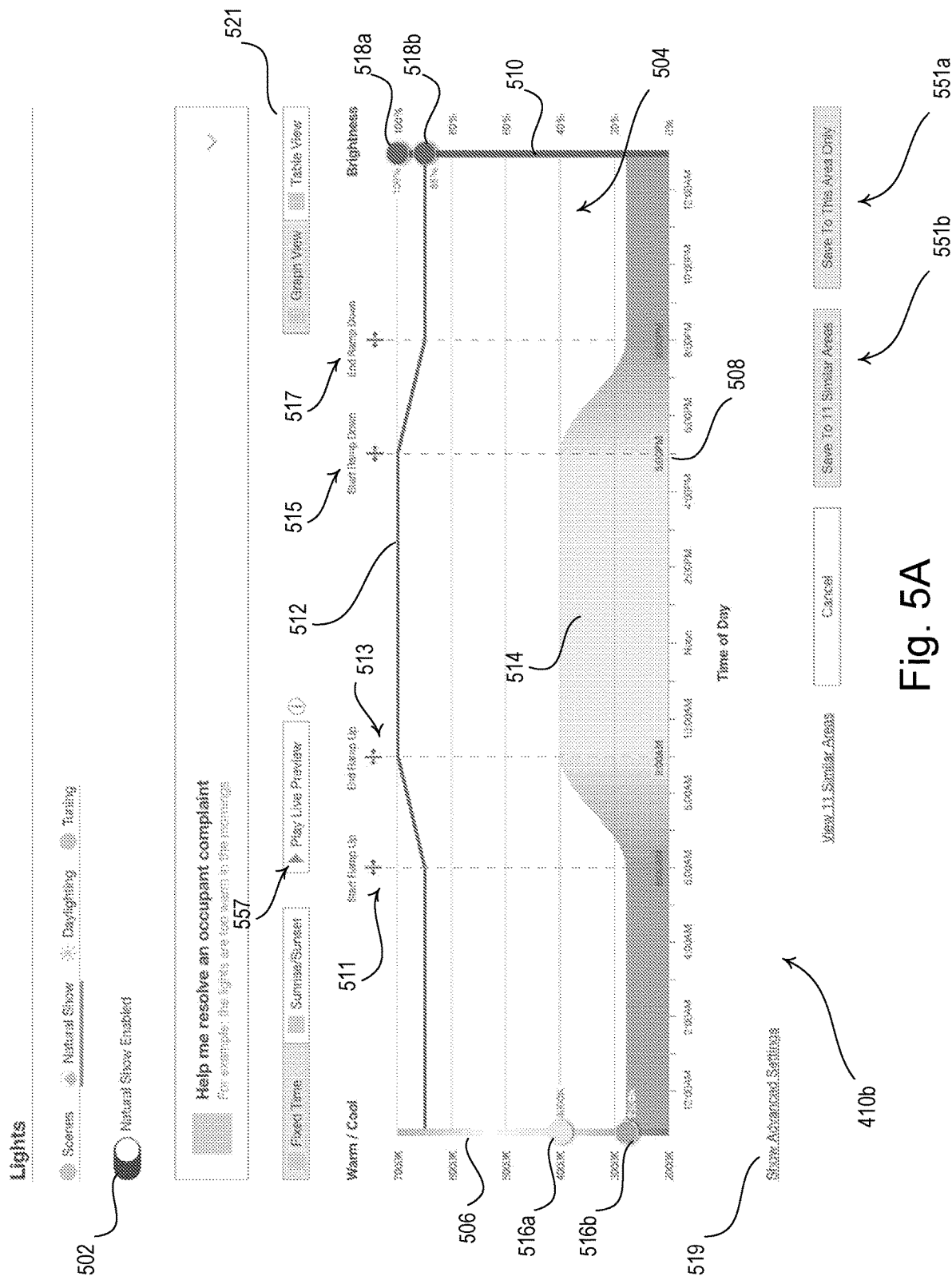
FIGS. 5A-5N show example graphical user interfaces of an application that may allow a user to determine information on and to control a load control system and/or control devices.
Figure 5B:
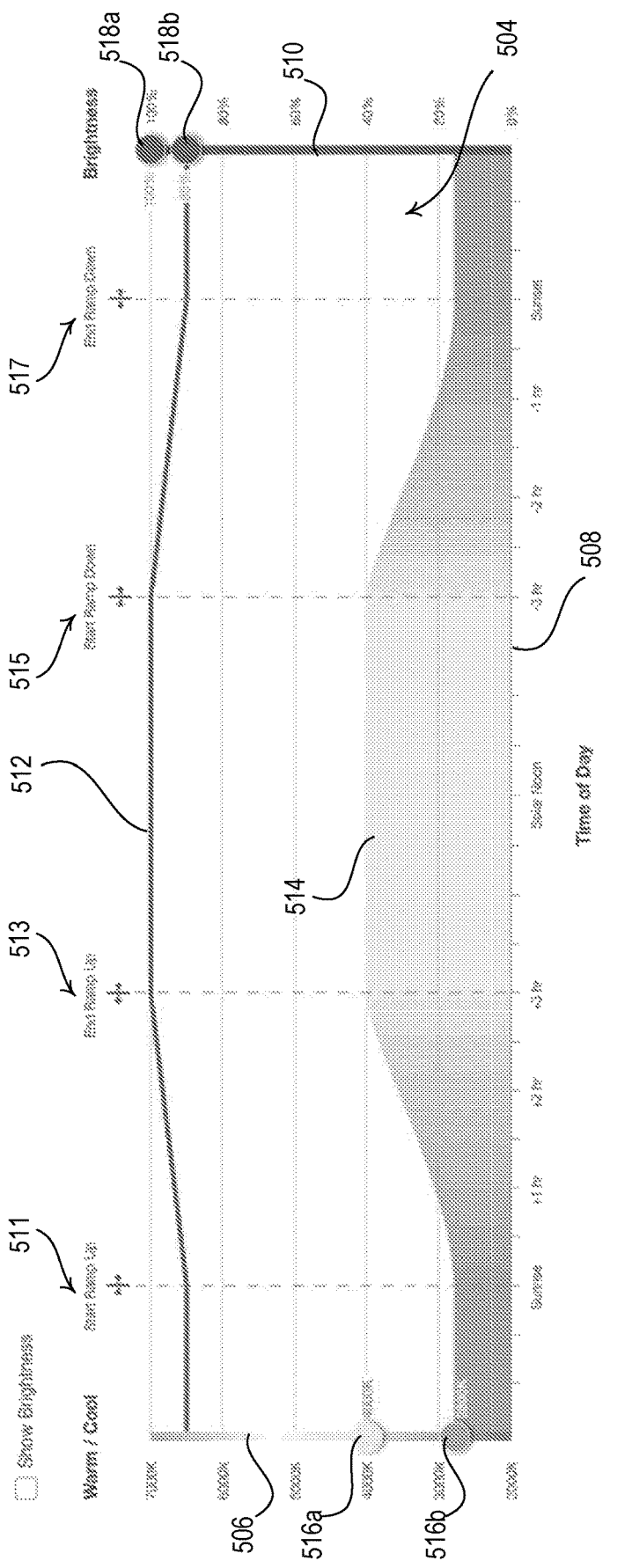

As described herein, the control/configuration application may provide a user with the ability to configure or control the lighting control devices in a zone over time. For example, the control/configuration application may display one or more graphical user interfaces that enable the user to change the color and/or lighting intensities of the lighting control devices. Further, when the lighting devices are configured to change in color and/or lighting intensity over time, the lighting devices may simulate a natural lighting functionality, which may be referred to herein as natural light and/or natural show. As described herein, natural lighting functionality may include controlling one or more lighting control devices/lighting loads to emulate a sunrise and a sunset, and may further include emulating natural light/sunlight between sunrise and sunset. As described herein, natural lighting or natural show may be enabled or disabled based on: a schedule (e.g., a time clock); an event (e.g., by an occupancy event triggered by an occupancy sensor); and/or by assigning and enabling natural show to a scene (e.g., assigning natural show to a scene that is enabled in response to pressing a button at a remote control device). FIGS. 5A to 5N illustrate example graphical user interfaces that may be displayed by the control/configuration application to configure or control natural show.

Referring now to FIG. 5A, there is shown another example graphical user interface 410*b* that may be displayed by the control/configuration application to a user via a network device. For example, the user may use the graphical user interface 410*b* to enable and/or control natural lighting functionality (also referred to herein as a natural show) for one or more lighting control devices (e.g., after selection of the natural show indicator 425 on the lights tile 417 shown in FIG. 4A or another graphical user interface). The natural lighting functionality may change the color temperature and/or lighting intensity of one or more lighting control devices in a preselected area to simulate a change in color temperature/lighting intensity of natural lighting over the course of a period of time (e.g., a day, a portion of a day, etc.). The network device may communicate with the lighting control devices, for example, via a system controller as described herein. For example, the natural lighting functionality may be defined at the network device and stored at the system controller and/or a control device and/or the lighting control devices for being implemented in the lighting control devices in a given location or area in the user environment and assigned to a certain zone(s). Further, the natural lighting functionality may be assigned to a scene and/or may be activated, for example, by pressing a button on a control device. Natural lighting functionality may include emulating sunrise, sunset, and natural light/sunlight there between. Upon displaying interface 410*b*, the control/configuration application may display a default configuration/previously defined configuration (either defined by the load control system or previously defined by a user, for example), and may further allow the user to modify the configuration.

As shown in FIG. 4A, graphical user interface 410*b* may display an enable button 502 and/or a graph 504. The natural lighting functionality may be enabled for the given location or area/zone when the enable button 502 is activated, and the natural lighting functionality may be disabled when the enable button 502 is deactivated. The graph 504 may include one or more x axes and/or y axes. For example, the graph 504 may include a color temperature axis 506, an intensity axis 510, and/or a time axis 508.

The color temperature axis 506 may represent a color temperature (CCT) to which one or more lighting control devices (e.g., one or more LED lights) within a zone (e.g., a room within a building) may be configured/controller. The color temperature axis 506 may be range of numbers of color temperatures along the black body curve. For example, the color temperature axis 506 may range from 2000K to 7000K, or another range. Cooler color temperatures may be indicated with a cooler color (e.g., shades of blue to indicate cooler color temperatures). Warmer color temperatures may be indicated with a warmer color (e.g., yellow, orange, or red to indicate warmer color temperatures). The color temperature axis 506 may be located as a y-axis on the left-hand side of the graph, though the color temperature axis 506 may be located on other portions of the graph (e.g., the right-hand side of the graph).

The intensity axis 510 may represent a lighting intensity to which one or more lighting control devices within the zone may be configured/controlled. The intensity axis 510 may range from, for example, 0% to 100%. The intensity axis 510 may be located as a y-axis on the right-hand side of the graph, though the intensity axis 510 may be located on other portions of the graph (e.g., the left-hand side of the graph).

The time axis 508 may display a time of day in a number of predefined or user-defined increments. The length of the time axis 508 may represent the length of a day, or a portion of the day. For example, the time axis 508 may begin at midnight and end at midnight of the next day. In another example, the time axis 508 may represent a period of time over which the lighting control devices may be turned on, or the period of time that the natural lighting functionality may be enabled, such as a period of time between 6 AM and 6 PM.

The graph 504 may include an area 514 that displays a function of the color temperature of the lighting control devices/lighting loads at a given time of day. The area 514 may correlate with the color temperature axis 506. The area 514 may track the color temperature set for the lighting control devices at the corresponding times of day when the scene is configured. The colors of the area 514 may change as the color temperature value corresponding to the color temperature axis 506 changes to indicate the relative color temperature values under the area 514. In other words, from left to right, the colors of the area 514 change from orange to yellow to orange, matching the vertical height of the area relative to the y-axis values.

The graph 504 may include an indicator that displays a function of the lighting intensity value of the lighting control devices at a given time of day. For example, the indicator that displays the lighting intensity value at a given time of day may be a bar, such as the bar 512. The bar 512 may correlate with the right axis 510. The bar 512 may track the intensity value for the lighting control devices at the corresponding times of day when the scene is configured. Providing a separate bar 512 for indicating the color temperature separately from the area 514 indicating the color temperature at a given time of day, along with the separate corresponding color temperature axis 506 and the intensity axis 510, may allow for easily identifying and implementing changes in intensity apart from the changes in color temperature for the natural lighting functionality.

Though the color temperature is illustrated in the area 514 and the lighting intensity value is illustrated with the bar 512, the color temperature and the lighting intensity value may be indicated in the same indicator in the graph. For example, the bar 512 may track the lighting intensity values at the given time of day, while the bar itself may reflect/include a defined/different color temperature for each respective time of day (e.g., warmer colors on color temperature axis 506 to reflect corresponding warm temperatures and cooler colors on the color temperature axis 506 to reflect corresponding cool color temperatures). The graph 504 may include one or more high-end or low-end controls. The high-end and/or low-end controls (e.g., buttons, boxes, etc.) may be located on, for example, the color temperature axis 506, and/or the intensity axis 510. For example, as shown in FIG. 5A, there may be a high-end color temperature button 516a and a low-end color temperature button 516b on the color temperature axis 506. The high-end color temperature button 516a and the low-end color temperature button 516b may allow the user to control/change/reconfigure the color temperature settings for the natural lighting functionality. For example, the high-end color temperature button 516a may represent a maximum (e.g., cooler) color temperature at which the lighting control devices may be set over a period of time measured in the time axis 508 (e.g., a day). The low-end color temperature button 516b may represent a minimum (e.g., warmer) color temperature that the lighting control devices be set over the period of time measured in the time axis 508 (e.g., a day). For example, the minimum color temperature may be 2800K and the maximum color temperature may be 4000K. The area 514 may have a minimum height of the minimum color temperature and a maximum height of the maximum color temperature. The user may move the high-end color temperature button 516a and the low-end color temperature button 516b along the color temperature axis 506 to modify the maximum color temperature and minimum color temperature, respectively, of the lighting control devices over the period of time measured in the time axis 508 (e.g., a day).

As shown in FIG. 5A, there may be a high-end intensity control, such as the high-end button 518a and a low-end intensity control, such as the low-end intensity button 518b on the intensity axis 510. The high-end intensity button 518a and the low-end intensity button 518b may allow the user to set/change/reconfigure the lighting intensity values of the lighting control devices over the period of time measured in the time axis 508 (e.g., a day). For example, the high-end intensity button 518a may represent a maximum lighting intensity value and the low-end intensity button 518b may represent a minimum lighting intensity value that the lighting control devices may be set over the period of time measured in the time axis 508 (e.g., a day). As shown in FIG. 5A, the minimum lighting intensity value may be 85% and the maximum lighting intensity value may be 100%. The bar 512 may have a minimum height of the minimum lighting intensity value and a maximum height of the maximum lighting intensity value. The user may move button 518a and button 518b along the intensity axis 510 to modify the maximum lighting intensity value and minimum lighting intensity value, respectively, of lighting control devices over the period of time measured in the time axis 508 (e.g., a day).

One or more thresholds or triggers may be set on the time axis 508 for a starting time and/or an ending time at which changes may be made to the intensity and/or color temperature. For example, the color temperature of natural light provided in a space by the lighting control devices may start ramping up earlier in the day (e.g., toward a cooler color temperature/higher intensity—i.e., the configured high end values, such as to emulate sunrise for example) and may start ramping down later in the day (e.g., toward a warmer color temperature/lower intensity—i.e., the configured low end values, such as to emulate sunset for example). The thresholds may be indicated on the graph 504 by dotted vertical lines. For example, as shown in FIG. 4A, the graph 504 may include a "Start Ramp Up" threshold 511, an "End Ramp Up" threshold 513, a "Start Ramp Down" threshold 515, and an "End Ramp Down" threshold 517. Before the Start Ramp Up threshold and after the End Ramp Down threshold the color temperature and intensity may stay constant at the configured low end values. Between the End Ramp Up threshold and the Start Ramp Down threshold the color temperature and intensity may stay constant at the configured high end values.

Between the time of day indicated by the "Start Ramp Up" threshold 511 and the time of day indicated by the "End Ramp Up" threshold 511, the color temperature of the lighting control devices may increase from the minimum color temperature until the maximum color temperature is met. Between the time of day indicated by the "Start Ramp Up" threshold 511 and the time of day indicated by the "End Ramp Up" threshold 511, the lighting intensity value of the lighting control devices may increase from the minimum lighting intensity value level until the maximum lighting intensity value level is met. For example, the "Start Ramp Up" threshold 511 may be set to 6:00 AM and the "End Ramp Up" threshold 513 may be set to 9:00 AM. From the time period between the "Start Ramp Up" threshold 511 and the "End Ramp Up" threshold 511, the color temperature of the lighting control devices may increase from 2800K to 4000K and the lighting intensity value may increase from 85% to 100%.

Similarly, between the time of day indicated by the "Start Ramp Down" threshold 515 and the time of day indicated by the "End Ramp Down" threshold 517, the color temperature and/or the lighting intensity value of the lighting control devices may decrease from the maximum color temperature/lighting intensity value until the minimum color temperature/lighting intensity value are met. For example, the "Start Ramp Down" threshold 515 may be set to 5:00 PM and the "End Ramp Down" threshold 517 may be set to 8:00 PM. Between the time of day indicated by the "Start Ramp Down" threshold 515 and the time of day indicated by the "End Ramp Down" threshold 517, the color temperature of the lighting control devices may decrease from 4000K to 2800K and the lighting intensity value may decrease from 100% to 85%. The color temperature/lighting intensity value of the lighting control devices may change linearly, stepwise, according to a sigmoid function (e.g., as shown in FIG. 5A), etc. The time periods over which the color temperature/lighting intensity value of the lighting control devices increases or decreases may be automatically set, or may be user-selected.

The graph 504 may be displayed with a default configuration for the natural show that may be modified by the user. The default configuration may be user defined or otherwise pre-stored. The thresholds and time periods over which the color temperature/lighting intensity value of the lighting control devices increases or decreases may default to emulate a sunrise/sunset times at the location of the lighting control devices, and may be modified by the user. The lighting control devices may have a default minimum/maximum color temperature and/or a default minimum/maximum lighting intensity value. The default color temperature settings and/or lighting intensity value may depend on the types of lighting control devices implemented in the predefined zone or area. Again, the default values may be modified through interface 410b.

After the color temperature, lighting intensity, thresholds, and/or time period(s) have been set, the user may save the settings by selecting a save button 551a, 551b. Save button 551a may save the current settings to the predefined area for which the settings have been selected. Save button 551b may save the settings to areas that have been defined in the load control system with a similar area type and/or similar lighting control devices (e.g., area identifiers and/or device identifiers). The settings may be sent to a system controller for automatically controlling the lighting control devices in the area/areas according to the settings, while the natural lighting functionality is enabled. The natural lighting functionality may be overridden by other events (e.g., actuation of buttons for lighting control, occupancy/vacancy events, scheduled events, etc.), but may return to the stored settings for the natural lighting functionality after a period of time. When the control of the natural lighting functionality is implemented/configured the current time may be referenced for setting the color temperature and/or lighting intensity value for the current time. The natural lighting functionality may then continue from that time.

As shown in FIG. 5A, the time period may be set to a fixed time period (e.g., a ramp up period set over 6-9 AM, and ramp down period over 5 to 8 PM), which may be selected by the user. To set the fixed time period, the user may select the "Fixed Time" button. The user may change the fixed time period over which the natural lighting functionality may be implemented for the area.

The user may set the time axis 508 according to a sunrise/sunset time by selecting the "Sunrise/Sunset" button 555. As shown in FIG. 5B, the selection of the "Sunrise/sunset" button 555 may cause the ramp up thresholds 511, 513 and/or the ramp down thresholds 515, 517 to be automatically set to emulate sunrise/sunset times, respectively. The sunrise/sunset times may be automatically set to/change with the sunrise/sunset for a defined location, time of year, etc. For example, the sunrise/sunset times may be automatically set to/change with the local time for sunrise/sunset where the load control system is located. The user may adjust the thresholds 511, 513, 515, 1317 relative to sunrise and sunset. The time axis 508 may include a predefined amount of time before and/or after the sunrise sunset for the location. The color temperatures and/or lighting intensity value may also be set based on the location, time of year, etc.

Referring again to FIG. 5A, the graphical user interface 410b may include a "Play Live Preview" button 557. The "Play Live Preview" button 557 may cause the graph 504 and/or the lighting control devices in the given area (or one or more zones of the area) to preview the color changes and/or lighting intensity changes as reflected by the graph over a shorter period of time (e.g., seconds, minutes, etc.). The preview may play from the left side of the graph to the right to indicate the changes in color and/or lighting intensity to the user, such that the user may make changes to the current settings. For example, after viewing the preview, the user may change or update the current settings, as describe herein. An indicator (e.g., a vertical line) may move along graph 504 from left to right as the preview plays to show a user the current setting.

Figure 5C:
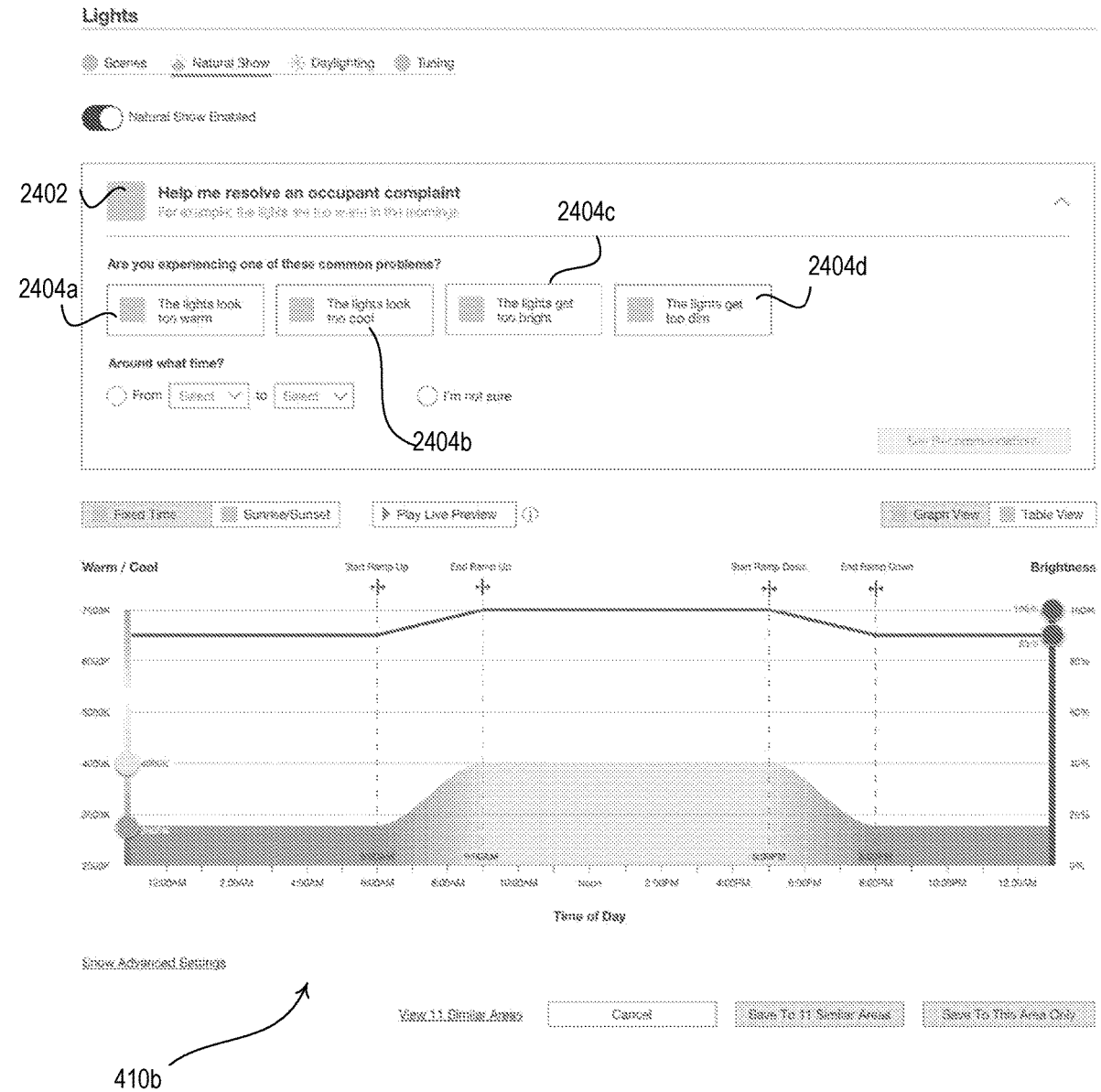

Referring now to FIG. 5C, there is shown another example of the graphical user interface 410b that may be displayed by the control/configuration application to a user via network device. The graphical user interface 410b may allow the user to perform troubleshooting for one or more lighting control devices. For example, as shown in FIG. 5C, the graphical user interface 410b may include a help button 2402. The user may click the help button 2402 if there is a problem with the color temperature and/or the lighting intensity of the lighting control devices. Clicking the help button 2402 may cause the graphical user interface 410b to display one or more buttons corresponding to common problems that the user may experience. For example, as shown in FIG. 5C, there may be a button 2404a indicating that the color temperature of the lighting control devices/lighting loads is too warm/low, a button 2404b indicating that the color temperature of the lighting control devices/lighting loads is too cool/high, a button 2404c indicating that the lighting intensity of the lighting control devices/lighting loads is too high/bright, and a button 2404d indicating that the lighting intensity of the lighting control devices/lighting loads is too low/dim. The user may select the button that most closely corresponds to the problem that the lighting control devices/lighting loads are experiencing. The buttons 2404a-2404d may be predetermined as more common problems related to the color temperature and/or lighting intensity value of lighting loads.

Figure 5D:
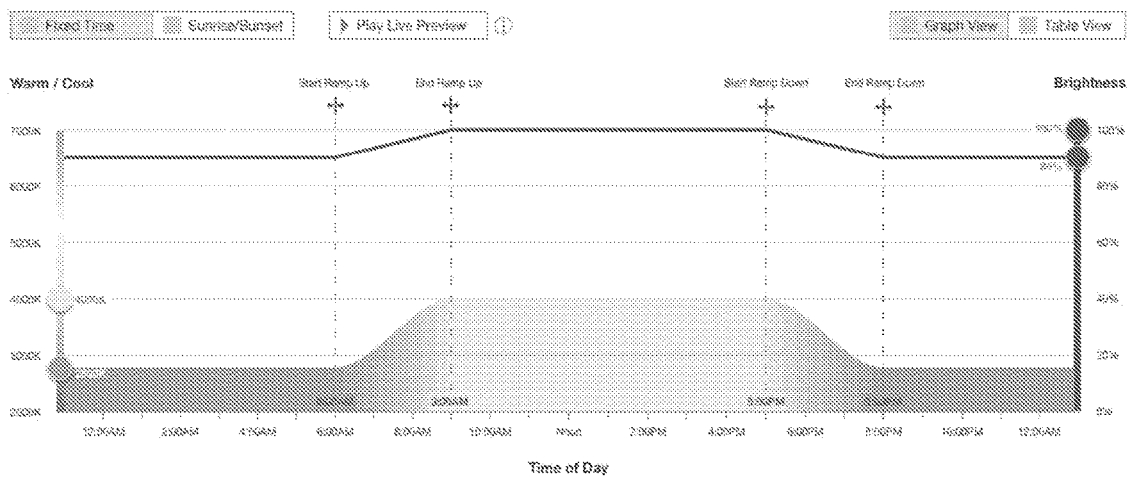

FIG. 5D displays an example of the graphical user interface 410b after the user has selected a button corresponding to a problem with the lighting control devices. For example, as shown in FIG. 5D, the color temperature of the lighting control devices may be too low/warm (e.g., the lighting control devices/lighting loads look warmer than desired). The user may select the button 2404a indicating that the color temperature of the lighting control devices is too low. The user may indicate a time period over which the problem exists. The user may enter a start time in box 2502a and an end time in box 2502b. For example, as shown in FIG. 5D, the user may enter 4:00 PM for the start time and 6:00 PM for the end time. After selecting the button 2404a and entering the start time and the end time into the boxes 2502a, 2502b, the user may select a "See Recommendations" button. The time period and the problems indicated may allow the system to reference the control settings for the time period to identify the lighting control problem indicated.

Figure 5E:
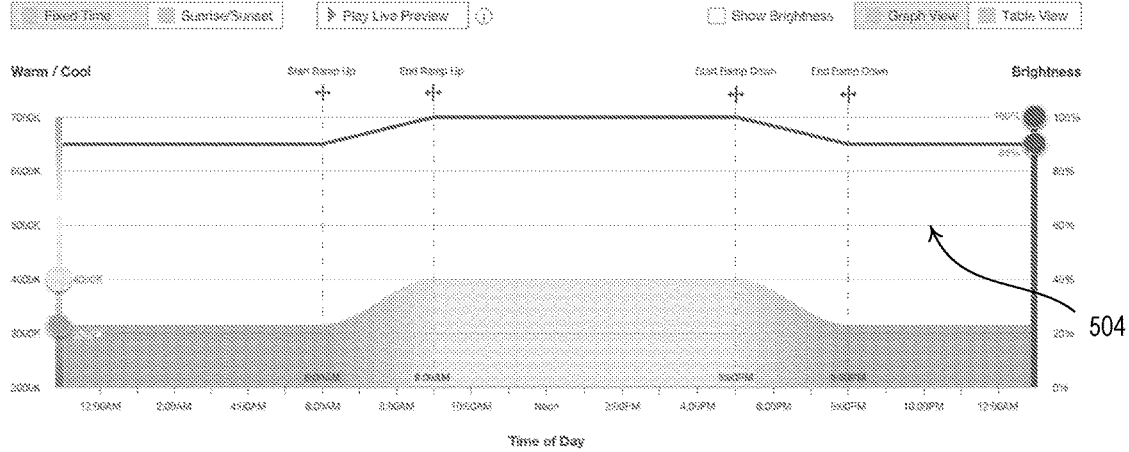

FIG. 5E displays an example of the graphical user interface 410b after the user has selected the "See Recommendations" button. The graphical user interface 410b may display a recommendation for resolving the problem with the lighting control devices/lighting loads. The recommendation may be determined using an algorithm. For example, as shown in FIG. 5E, if the user has selected the button

2404a indicating that the color temperature of the lighting control devices/lighting loads is too low, the recommendation may be to increase the minimum color temperature of the lighting control devices. For example, the recommendation may be to increase the minimum color temperature of the lighting control devices a predefined amount (e.g., amount may be based on prior setting, a percentage, etc.). The recommendation shown in FIG. 5E is to increase the minimum color temperature for the lighting control device from 2800K to 3200K. The current minimum color temperature may be displayed in box 2602a and the recommended minimum color temperature may be displayed in box 2602b. Box 2602a and box 2602b may instead display the current and recommended maximum color temperature or minimum/maximum lighting intensity depending on the problem selected by the user.

The graphical user interface 410b may display graph 504. As shown in FIG. 5E, the graphical user interface 410b may display a "Preview on Graph" button 2604a and/or a "Play Live Preview" button 2604b. If the user selects the "Preview on Graph" button 2604a, graph 504 may be modified to display what would happen if the recommendation were applied. The user may toggle the "Preview on Graph" button 2604a to show/toggle between the current settings relative to the recommendation to visually see and understand the recommended change. If the user selects the "Play Live Preview" button 2604b, the lighting control devices in the respective area/zone may, over a relatively short period of time (e.g., predefined number of seconds, minutes, etc.), modify their lighting intensity and/or color temperature as they would over the course of a day if the recommendation were applied. For example, the period of time over which the lighting control devices in the respective area/zone modify their respective lighting intensity and/or color temperature as they would over the course of the day may be a predefined period of time. The period of time may also, or alternatively, be static or relative (e.g., based on a percentage of the day). Further, after viewing the preview (e.g., either via the graph by selecting the "Preview on Graph" button 2604 or at the lighting control devices by selecting the "Play Live Preview" button 2604b), the user may update or change the lighting intensity and/or color temperature settings as described herein. The graph 504 may also, or alternatively, display the color temperature settings and/or lighting intensity settings from left to right on the graph 504 over the same period of time as the preview is played. The preview may also, or alternatively, cause the relative change in color temperature settings, or the change in recommended lighting intensity settings, to be shown on the lighting control devices/lighting loads and/or in the graph each time the network device receives an update or change. This may show the relative change being recommended to the user.

Referring again to 5A, the graphical user interface 410b may include a "Show Advanced Settings" button 519. FIG. 5F shows an example of the graphical user interface 410b if the user selects the "Show Advanced Settings" button 519. If the user selects the "Show Advanced Settings" button 519, graphical user interface 410b may display one or more settings. For example, the settings may include a "Zones" setting. The "Zones" setting may allow the user to enable and/or disable the settings for the natural show (e.g., natural lighting functionality) in one or more zones of a given location or area. As shown in FIG. 4F, the zones may be labeled as "Downlights," "Wall Washers," "Pendants," and "Accent Lights." Each zone may have an associated button/tile in graphical user interface 410b, such as the button/tile 2606 associated with the Downlight zone. The user may select a zone in order to enable the natural show for that zone, or deselect a zone to disable the natural show for that zone. The buttons/tiles associated with the zone may include "Identify" options. The user may select "Identify" for a zone in order to identify the lighting control devices within that zone (e.g., actuation of the button may cause the lighting control devices within that zone to provide a visual indicator, such as blink).

The settings may include a "Show Triggers" setting. The "Show Triggers" setting may allow the user to select one or more triggers that will enable or disable the natural show for the one or more zones that are enabled for the natural show. Each trigger may have a type, details, and an associated action. There may be one or more types (e.g., categories) of triggers. For example, as shown in FIG. 4F, there may be scheduled event triggers, occupancy event triggers, and entry keypad triggers. A scheduled event trigger may be a specific time at which the natural show becomes enabled or disabled. The scheduled event trigger may apply to one or more days of the week. For example, as shown in FIG. 4E, the natural show may become enabled at 6:00 AM on weekdays, and may become disabled at 6:00 PM on weekdays. Also, or alternatively, the natural show may be enabled relative the sunrise/sunset where the user environment or load control system is located, as described herein. The location and/or the sunrise/sunset times for the location may be stored in the system configuration data when the system is being configured. When the natural show is disabled, the lighting control devices may turn off, return to a default color temperature/lighting intensity, and/or the like when the scene is configured. An occupancy event trigger may be a determination as to whether the zone in which the lighting control devices are located is occupied. For example, if the zone is occupied, the natural show may be enabled, and if the zone is unoccupied, the natural show may be disabled. Upon being activated as a result of occupancy, the natural show settings that are played may be based on the current time. Further, the natural show settings may remain enabled while the zone is occupied (e.g. natural show may become disabled when the zone is not occupied). An entry keypad trigger may occur when a key on a pad is pressed. For example, if a button is pressed on a keypad, the natural show may be enabled for a zone associated with that keypad. Each of the trigger settings may be configurable via graphical user interface 410b, or via another interface (not shown). In addition, as described herein, natural show may be assigned a certain scene, and natural show may be enabled when the scene is activated (e.g., by a button press at a remote control device or keypad). Similarly, when natural show may be assigned a certain scene and currently enabled, natural show may become disabled when the scene is deactivated (e.g., by a subsequent button press at the remote control device or keypad).

Figure 5G:
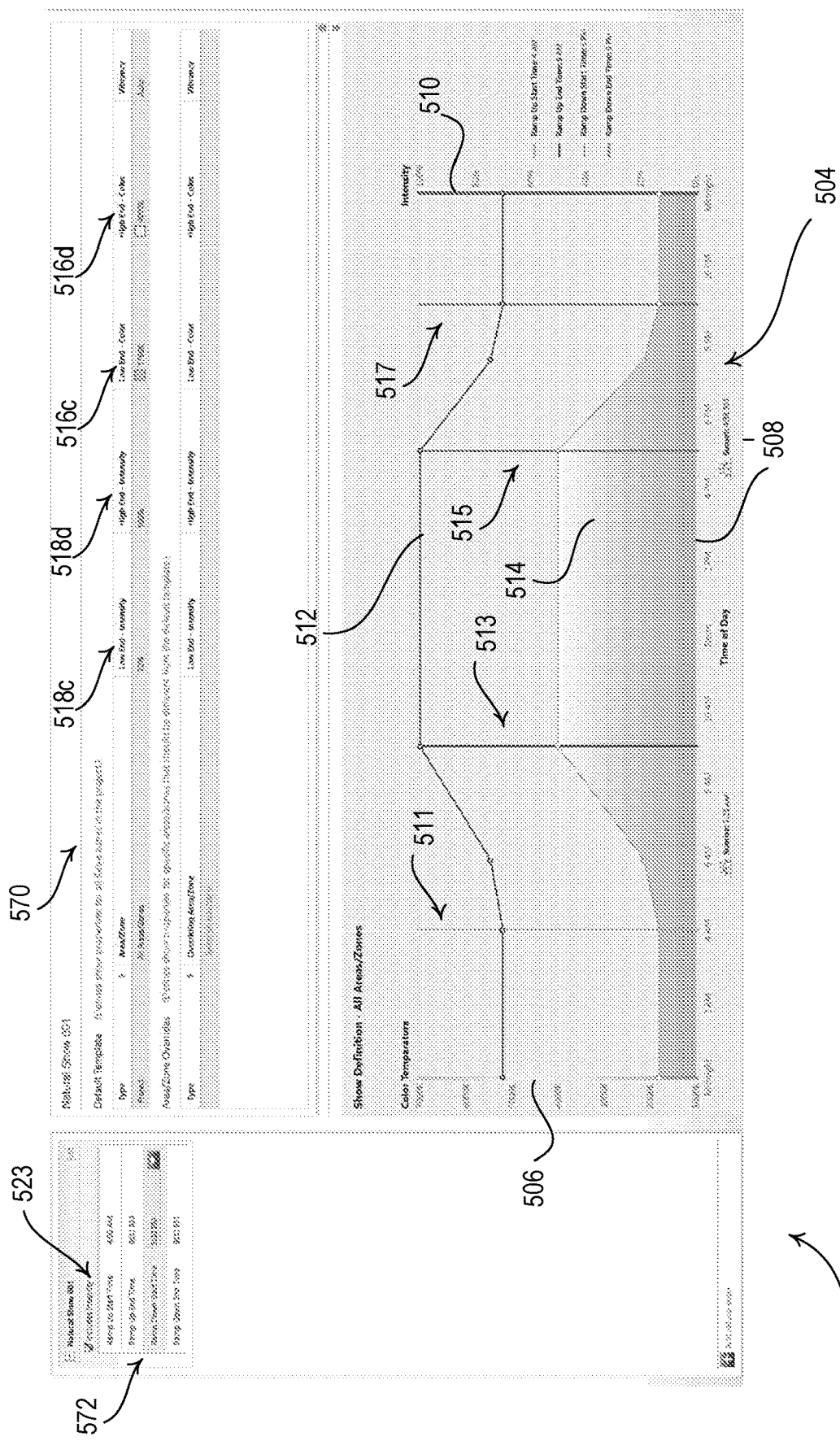
Figure 5H:
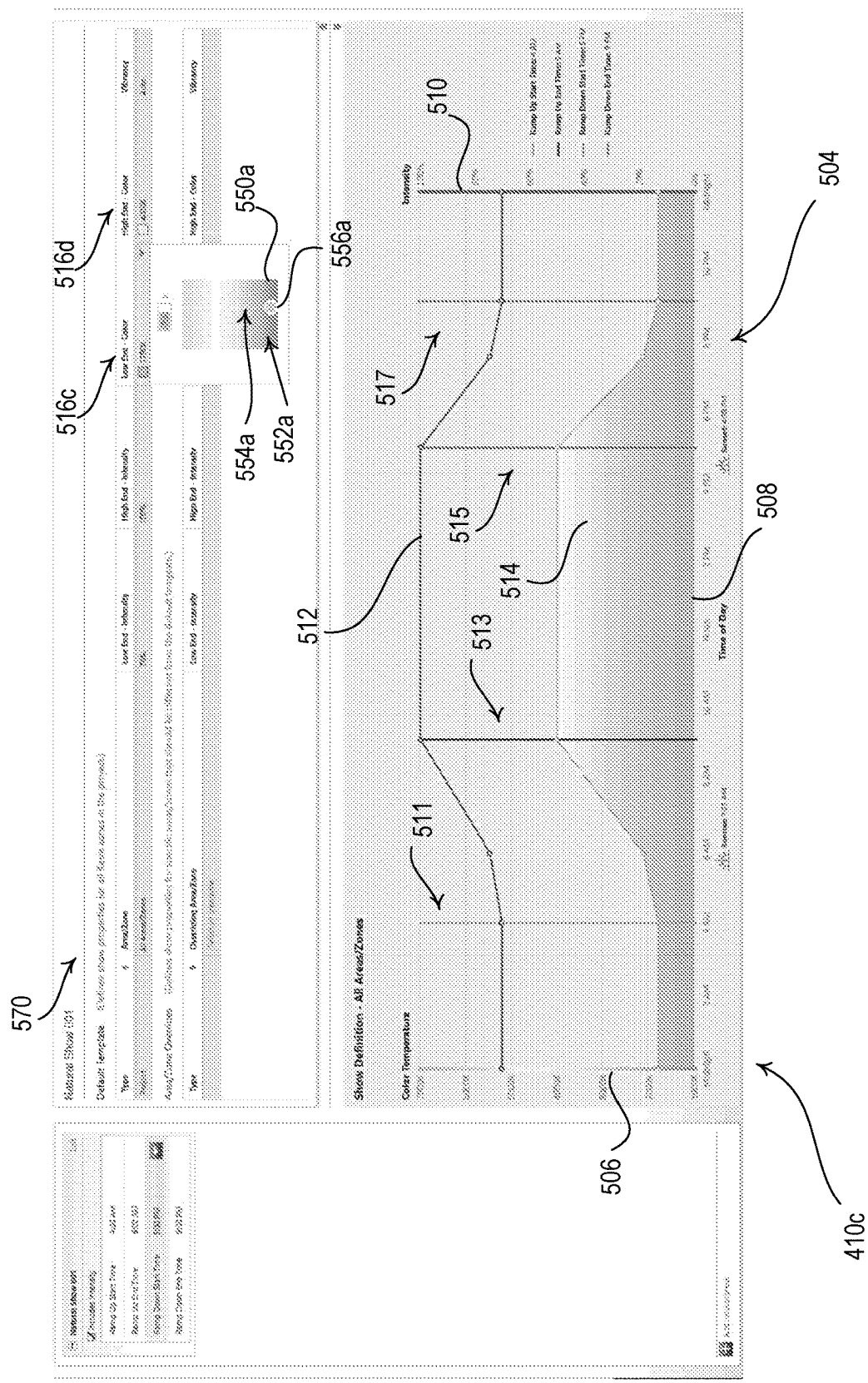
Figure 5J:
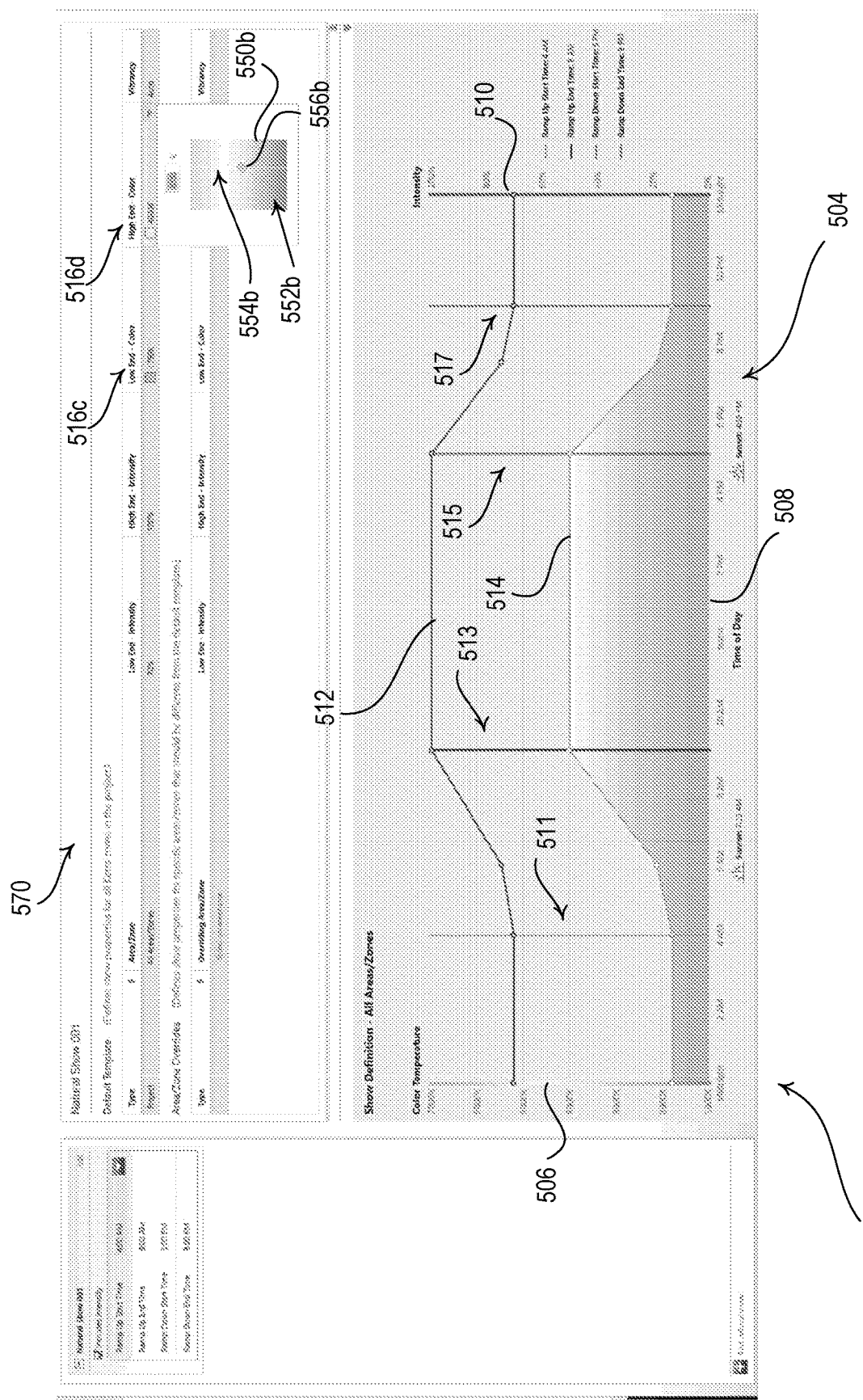
Figure 5K:
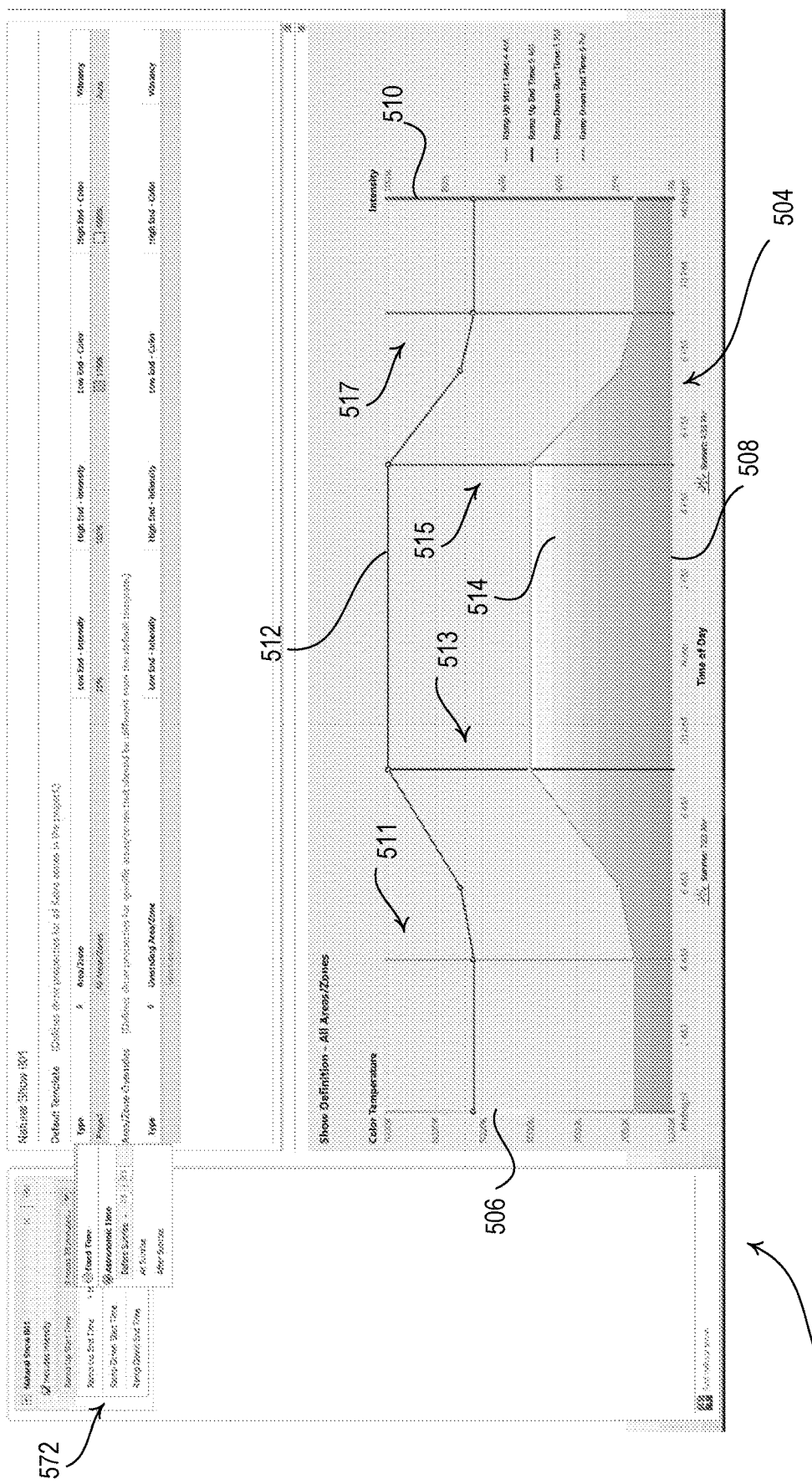
Figure 5L:
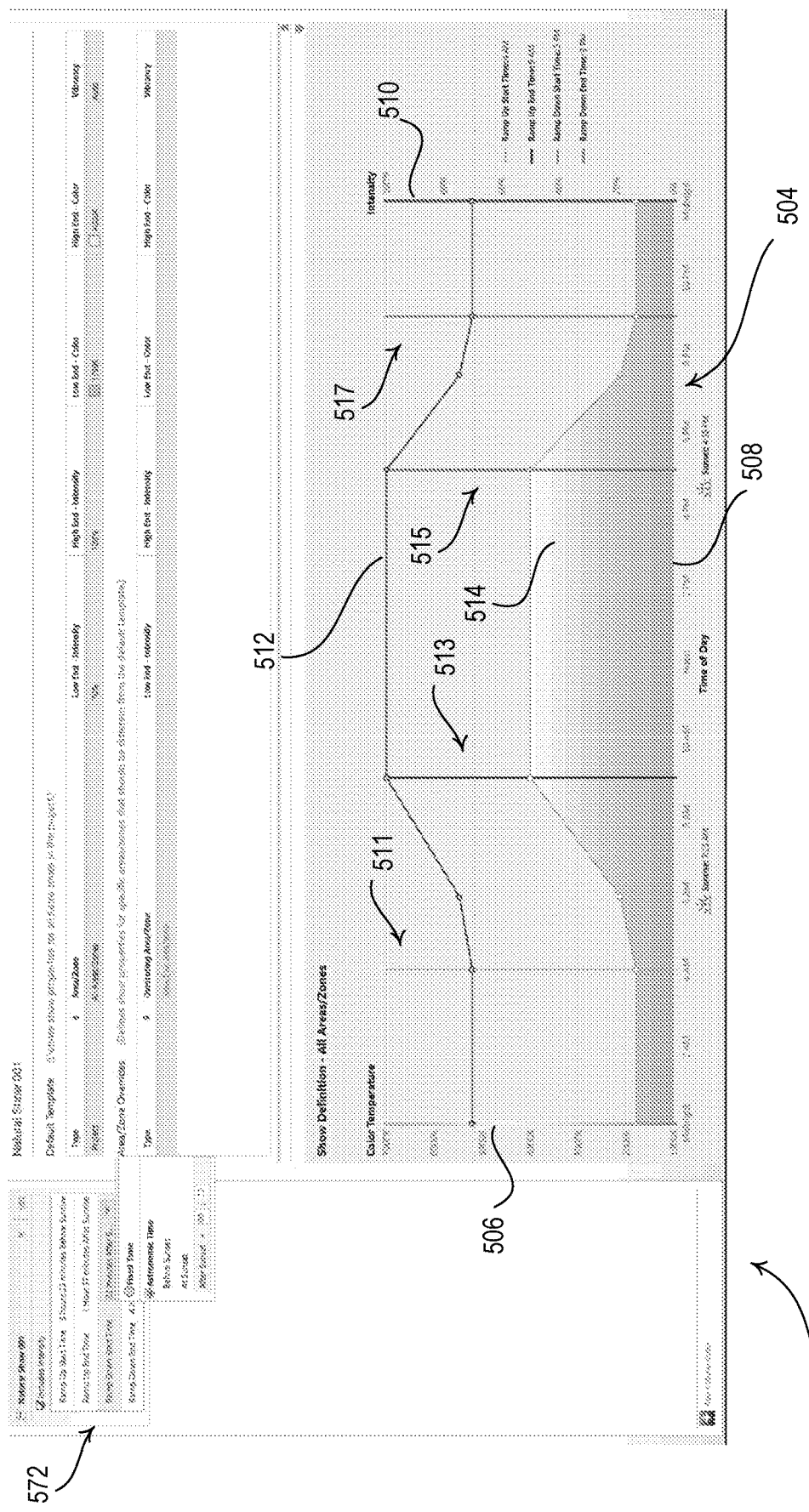

Referring again to FIG. 5A, the graphical user interface 410b may include a "Table View" button 521. FIG. 5N displays an example of the graphical user interface 410b that may be displayed if the user selects the "Table View" button 521. The graphical user interface 410b may display information from graph 504 in the form of a table 2700. For example, the table 2700 may display a list of times, in addition to a color temperature and lighting intensity of the lighting control devices at each time. The user may be able to select different increments of time to be displayed in the table 2700. As shown in FIG. 5N, the user may select whether to view the time in increments of 1 hour, 30 minutes, or 15 minutes. If the user selects a given increment of time, the table 2700 may update to reflect that increment of time. The user may be able to modify the color temperature and/or lighting intensity of the lighting control devices for a given increment of time. For example, as shown in FIG. 5G, the lighting control devices may be set to a color temperature of 3800K and a lighting intensity value of 53% for a half hour beginning at 9:30 AM. The user may, for example, modify the lighting intensity of the lighting control devices such that they have a lighting intensity value of 58% for the half hour beginning at 9:30 AM.

Referring now to FIG. 5G, there is shown another example graphical user interface 410c that may be displayed by the control/configuration application to a user via a network device. The graphical user interface 410c may be similar to the graphical user interface 410b shown in FIG. 5A. For example, the user may use the graphical user interface 410c to enable and/or control natural lighting functionality (also referred to herein as a natural show) for one or more lighting control devices within a given area/zone (e.g., after selection of the natural show indicator 425 on the lights tile 417 shown in FIG. 4A or another graphical user interface). Also, as illustrated in FIGS. 5G to 5M, the natural show or natural light functionality described herein may be assigned to a scene and activated, for example, by actuating a button on a control device, and/or by any of the triggers described herein with respect to FIG. 5F. As shown in FIG. 5G, graphical user interface 410c may display a graph 504 for displaying the natural show. The graph 504 may include one or more x axes and/or y axes. For example, the graph 504 may include a color temperature axis 506, an intensity axis 510, and/or a time axis 508, as similarly shown in FIG. 5A.

The graph 504 may include an area 514 that displays a function of the color temperature of the lighting control devices at a given time of day. The area 514 may track the color temperature set for the lighting control devices at the corresponding times of day. The graph 504 may include an indicator that displays a function of the lighting intensity value of the lighting control devices at a given time of day (e.g., the bar 512). The bar 512 may correlate with the right axis 510. The bar 512 may track the lighting intensity value for the lighting control devices at the corresponding times of day.

As shown in FIG. 5G, the lighting intensity and color temperature may be controlled in the graphical user interface 410c using a separate control interface 570. The control interface 570 may include a low-end color temperature controls, such as the low-end color temperature box 516c, and a high-end color temperature control, such as the high-end color temperature box 516d, which may function similarly to the low-end color temperature button 516b and the high-end color temperature button 516a, respectively, that are shown in FIG. 5A. For example, the low-end color temperature box 516c may represent a minimum color temperature at which the lighting control devices may be set over a period of time measured in the time axis 508 (e.g., a day). The high-end color temperature box 516d may represent a maximum color temperature that the lighting control devices be set over the period of time measured in the time axis 508 (e.g., a day). The settings selected in the high-end color temperature box 516d and the low-end color temperature box 516c may be reflected in the graph 504, as described herein.

The user may actuate the low-end color temperature box 516c to select the low-end color temperature setting. As shown in FIG. 5H, the actuation of the low-end color temperature box 516c may cause the control interface 570 to display an indicator that displays the range of color temperature values available for setting the low-end color temperature for the natural show, such as the color temperature bar 550a. The color temperature bar 550a may include a palette 552a for indicating the range of color temperature values available for setting the low-end color temperature for the natural show. The palette 552a may show a range of colors ranging from cool colors at the top of the palette 552a to warm colors at the bottom of the palette 552a. As described herein, these colors may correspond to colors that lie along the black body curve. The color temperature bar 550a may include an actuator 556a and/or a control line 554a. The actuator 556a may be superimposed over the palette 552a. The actuator 556a may be movable/slide-able (e.g., here vertically movable) along the control line 554a to select different CCTs along the black body curve. The low-end color temperature box 516c may include a text box that allows the user to input the color temperature value and/or that reflects the color temperature value selected by the user with the actuator 556a.

The user may actuate the high-end color temperature box 516d to select the high-end color temperature setting. As shown in FIG. 5J, the actuation of the high-end color temperature box 516d may cause the control interface 570 to display an indicator that displays the range of color temperature values available for setting the high-end color temperature for the natural show, such as color temperature bar 550b. The color temperature bar 550b may include a palette 552b for indicating the range of color temperature values available for setting the high-end color temperature for the natural show. The palette 552b may show a range of colors ranging from cool colors at the top of the palette 552b to warm colors at the bottom of the palette 552b. The color temperature bar 550b may include an actuator 556b and/or a control line 554b. The actuator 556b may be superimposed over the palette 552b. The actuator 556b may be movable/slide-able (e.g., here vertically movable) along the control line 554b to select different CCTs along the black body curve. The high-end color temperature box 516d may include a text box that allows the user to input the color temperature value and/or that reflects the color temperature value selected by the user with the actuator 556b. As described herein, the high-end color temperature box 516d and the low-end color temperature box 516c may correspond to the respective high-end and low-end color temperature values of the lighting control devices over the period of time measured in the time axis 508 when the scene is activated.

Referring again to FIG. 5G, the control interface 570 may include low-end intensity controls, such as the low-end intensity box 518c, and high-end intensity controls, such as a high-end intensity box 518d. The low-end intensity box 518c and the high-end intensity box 518d may allow the user to set the lighting intensity value of the lighting control devices over the period of time measured in the time axis 508 (e.g., a day). For example, the low-end intensity box 518c may represent a minimum lighting intensity and the high-end intensity box 518d may represent a maximum lighting intensity that the lighting control devices may be set over the period of time measured in the time axis 508 (e.g., a day). The bar 512 may have a minimum height of the minimum lighting intensity and a maximum height of the maximum lighting intensity. The user may actuate the low-end intensity box 518c and/or the high-end intensity box 518d to modify the minimum lighting intensity and maximum lighting intensity, respectively, of lighting control devices over the period of time measured in the time axis 508 (e.g., a day).

The graphical user interface 410c may include a threshold control interface 572 for controlling the "Start Ramp Up" threshold 511, the "End Ramp Up" threshold 513, the "Start Ramp Down" threshold 515, and/or the "End Ramp Down" threshold 517. As described herein, the time periods over which the color temperature/lighting intensity of the lighting control devices increases or decreases may be automatically set, or may be user-selected. The time periods over which the color temperature/lighting intensity of the lighting control devices increases or decreases may default to emulate sunrise/sunset times at the location of the lighting control devices, and/or may be modified by the user. As shown in FIG. 5K, the threshold control interface 572 may allow the user to select a fixed time or an astronomic time for each threshold (e.g., the "Start Ramp Up" threshold 511, the "End Ramp Up" threshold 511, the "Start Ramp Down" threshold 515 and/or the "End Ramp Down" threshold 517). To set the fixed time period for a threshold, the user may select a "Fixed Time" button for a corresponding threshold and set a fixed time. To set the astronomic time for a threshold, the user may select an "Astronomic Time" button for a corresponding threshold and choose a time relative to sunrise or sunset. For example, as shown in FIG. 5K, for the "Start Ramp Up" threshold 511 or the "End Ramp Up" threshold 511 the user may set the threshold a period of time before sunrise, at sunrise, or a period of time after sunrise. As shown in FIG. 5L, for the "Start Ramp Down" threshold 515 or the "End Ramp Down" threshold 517 the user may set the threshold a period of time before sunset, at sunset, or a period of time after sunset. The control/configuration application or system controller for example at the time the show is actuated may automatically identify the time for sunrise and sunset and apply the thresholds relative to sunrise or sunset as defined using the threshold control interface 572. The sunrise/sunset times may be automatically set to/change with the sunrise/sunset for a defined location, time of year, etc. Similarly, the "Start Ramp Up" threshold 511, the "End Ramp Up" threshold 513, the "Start Ramp Down" threshold 515 and/or the "End Ramp Down" threshold 517 may also be automatically set to/changed with the sunrise/sunset for a defined location, time of year, etc.

The graphical user interface 410c may include an indicator, such as the Includes Intensity box 523. If, for example, the Includes Intensity box 523 is checked, the lighting intensity of the lighting control devices/lighting loads may change over time according to the natural show (e.g., as illustrated in FIG. 5G). If, however, the Includes Intensity box 523 is not checked, the lighting intensity of the lighting control devices/lighting loads may not change according to the natural show. However, the color temperature of the lighting control devices/lighting loads may change over time according to the natural show.

Figure 5M:
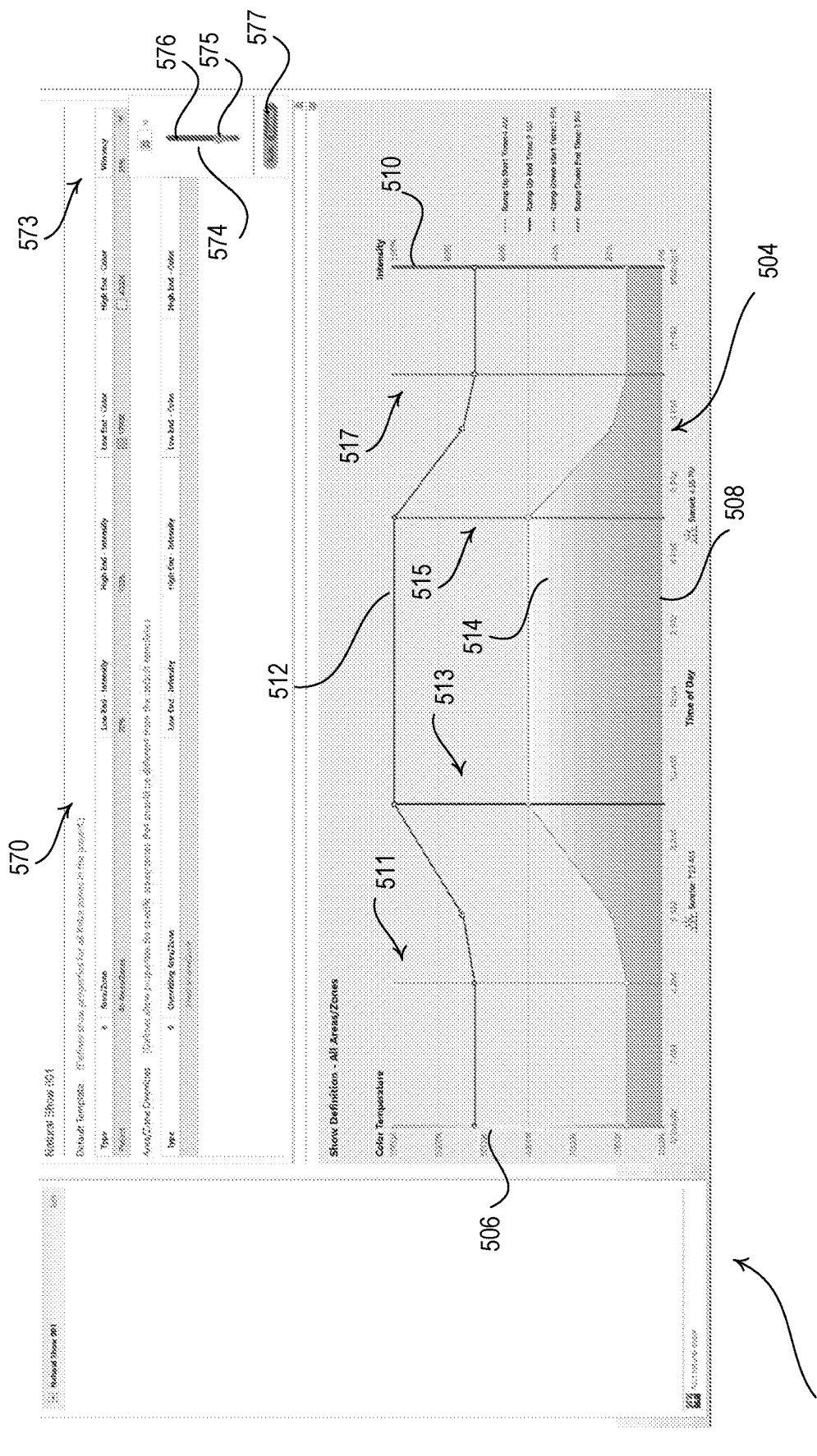
Figure 5N:

Referring to FIG. 5M, the control interface 570 may include a vibrancy box 573 to select the vibrancy settings for the natural show. As shown in FIG. 5M, the actuation of the vibrancy box 573 may cause the control interface 570 to display an "Auto/Manual" actuator 577. If, for example, the "Auto/Manual" actuator 577 is set to "Manual," as illustrated in FIG. 5M, the lighting devices in the zone may be configured to the adjustable vibrancy state/mode and the vibrancy box 573 may include an indicator that displays the range of adjustable vibrancy values, such as a vibrancy bar 574. For example, the vibrancy bar 574 may include an actuator 575 and/or a control line 576. The actuator 556a may be superimposed over the control line 576. The actuator 575 may be movable/slide-able (e.g., here vertically movable) along the control line 576 to select different vibrancy values along the control line 576. The vibrancy box 573 may include a text box that allows the user to input the vibrancy value and/or that reflects the vibrancy value selected by the user with the actuator 575. As described herein, when the vibrancy is set to "Manual" (as shown), the user may adjust the vibrancy settings (e.g., the intensity/contribution of the white LED(s)), and when the Vibrancy is set to "Auto" the CRI value of the emitted light may be optimized towards or above a threshold CRI value.

Increasing/decreasing vibrancy using the vibrancy bar 574 when in the adjustable vibrancy state/mode may increase/decrease the apparent saturation of the color of objects in the space without changing (or substantially without changing) the color point of the lighting control devices. Moving the actuator 575 upwards along the vibrancy bar 574 may increase the vibrancy of the lighting control devices for a selected color/CCT as the color changes over time. As the vibrancy of a lighting control devices is increased, the contribution of the white, or substantially white, LED(s) (e.g., yellow and/or mint green LED) of the lighting loads may decrease (e.g., given a certain color point and/or CCT), while increasing one or more of the RGB LEDs to maintain the color point while increasing saturation. Similarly, moving the actuator 575 downwards along the vibrancy bar 574 may decrease the vibrancy of the lighting control devices. In addition, as the vibrancy of the lighting control devices is decreased, the contribution of the white, or substantially white, LED(s) of the lighting control devices may increase (e.g., given a certain CCT) and correspondingly decreasing the intensity of one or more of the RGB LEDs. The configured vibrancy may then be applied to the lighting loads over the time axis 508 based on the configured intensity and/or color of the natural show. For example, referring again to FIG. 5M, the lighting loads may be set to a vibrancy of 23% based on the configured color or intensity over the day.

Although not shown in FIG. 5M, the "Auto/Manual" actuator 577 may be set to "Auto." When the "Auto/Manual" actuator 577 is set to "Auto," the lighting control devices may be configured to the auto vibrancy state/mode and the control/configuration application may automatically configure the CRI value of the lighting control devices based on the selected color. The control/configuration application may automatically configure the CRI value of the lighting control devices such that the CRI values of the light emitted in the zone is optimized (e.g., optimizing the CRI value towards or above a threshold CRI value based on the desired color). For example, the control applicant may adjust the CRI value of the zone such the CRI value of the emitted light is optimized towards or above a threshold CRI value. In certain instances (e.g., for certain color point or CCT) the CRI value may be unable to be a value that is greater than or equal to the CRI threshold value. In those instances, the "Auto/Manual" actuator 577 being set to "Auto," may cause the lighting loads to increase the CRI value towards (e.g., as close as possible to) the CRI threshold value.

In certain scenarios, increasing the CRI value to be greater than or equal to the CRI threshold value (e.g., setting "Auto/Manual" actuator 577 to "Auto") may automatically change the vibrancy. As a result, when the "Auto/Manual" actuator 577 is set to "Auto" the vibrancy of the lighting loads in a zone may automatically increase and/or decrease, in other words the vibrancy of the lighting loads may be automatically determined and/or may not be configurable by the user. For example, the control line 576 and vibrancy bar 574 may be disabled (e.g. grayed out and/or non-configurable) when the "Auto/Manual" actuator 577 is set to "Auto,"

and may be enabled (as shown in FIG. 5M) when the "Auto/Manual" actuator 577 to "Manual."

Figure 6:
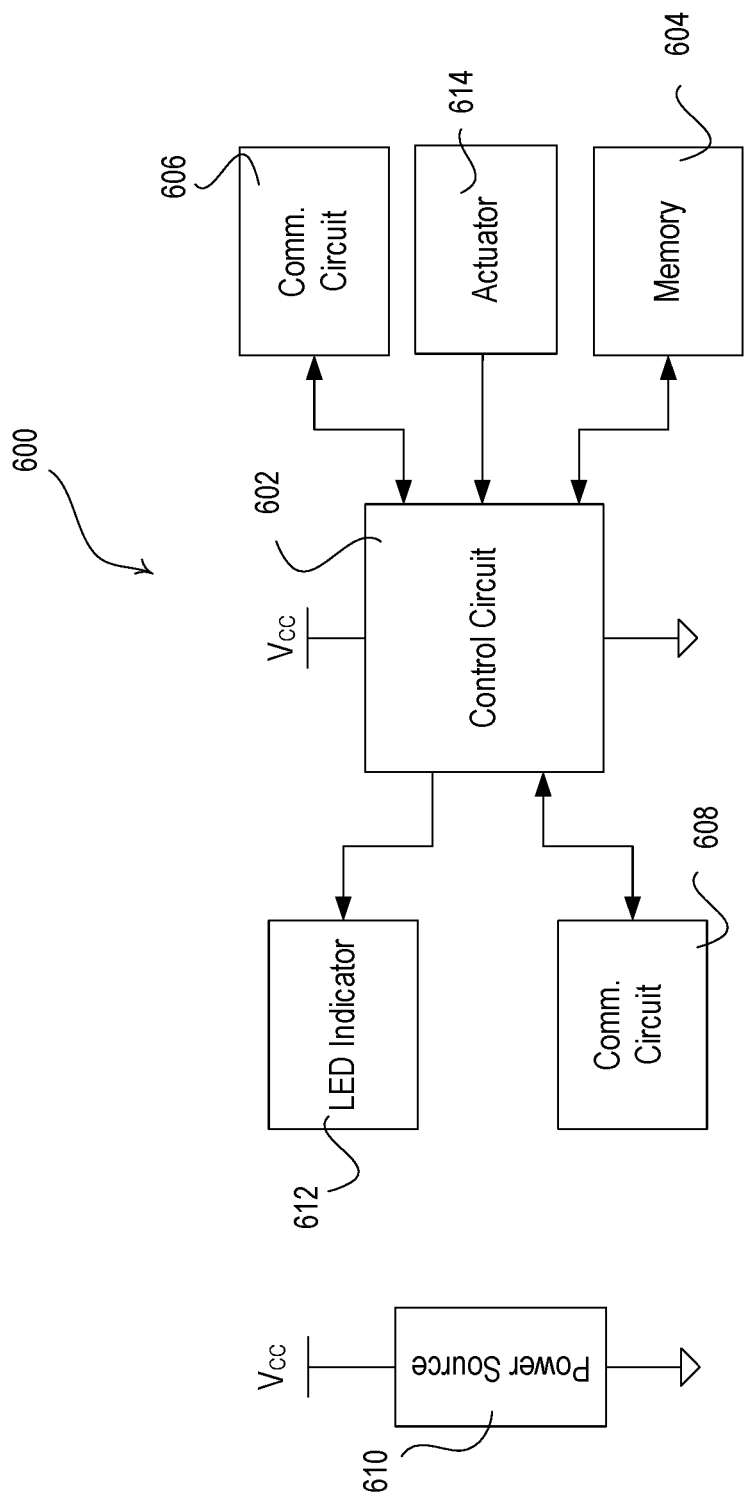
FIG. 6 is a block diagram of an example system controller.

FIG. 6 is a block diagram illustrating another example system controller 600 (such as system controller 150 described herein). The system controller 600 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 602). The control circuit 602 may be configured to execute one or more software-based applications that include instructions that when executed by the control circuit may configure the control circuit to perform signal coding, data processing, power control, input/output processing, or any other function, process, and/or operation for example that enables the system controller 600 to perform as described herein. One will recognize that functions, features, processes, and/or operations described herein of the system controller 600 may also and/or alternatively be provided by firmware and/or hardware in addition to and/or as an alternative to software-based instructions. The control circuit 602 may store information in and/or retrieve information from the memory 604, including configuration information/configuration information file(s), backup file(s), creation times, and signature(s) as described herein. Memory 604 may also store software-based instructions for execution by the control circuit 602 and may also provide an execution space as the control circuit executes instructions. Memory 604 may be implemented as an external integrated circuit (IC) or as an internal circuit of the control circuit 602. Memory 604 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. One will appreciate that the memory used to store configuration information file(s), and/or backup file(s), and/or software-based instructions, etc. may be the same and/or different memory of the system controller. As one example, configuration information file(s) and software-based instructions may be stored in non-volatile memory while backup(s) may be stored in volatile and/or non-volatile memory.

The system controller 600 may include one or more communications circuits/network interface devices or cards 606 for transmitting and/or receiving information. The communications circuit 606 may perform wireless and/or wired communications. The system controller 600 may also, or alternatively, include one or more communications circuits/network interface devices/cards 608 for transmitting and/or receiving information. The communications circuit 606 may perform wireless and/or wired communications. Communications circuits 606 and 608 may be in communication with control circuit 602. The communications circuits 606 and/or 608 may include radio frequency (RF) transceivers or other communications components configured to perform wireless communications via an antenna(s). The communications circuit 606 and communications circuit 608 may be configured to perform communications via the same communication channels or different communication channels. For example, the communications circuit 606 may be configured to communicate (e.g., with a network device, over a network, etc.) via a wireless communication channel (e.g., BLUETOOTH®, near field communication (NFC), WIFI®, WI-MAX®, cellular, etc.) and the communications circuit 608 may be configured to communicate (e.g., with control devices and/or other devices in the load control system) via another wireless communication channel (e.g., WI-FI® or a proprietary communication channel, such as CLEAR CONNECT™).

The control circuit 602 may be in communication with an LED indicator(s) 612 for providing indications to a user. The control circuit 602 may be in communication with an actuator(s) 614 (e.g., one or more buttons) that may be actuated by a user to communicate user selections to the control circuit 602. For example, the actuator 614 may be actuated to put the control circuit 602 in an association mode and/or communicate association messages from the system controller 600.

Each of the components within the system controller 600 may be powered by a power source 610. The power source 610 may include an AC power supply or DC power supply, for example. The power source 610 may generate a supply voltage Vcc for powering the components within the system controller 600. One will recognize that system controller 600 may include other, fewer, and/or additional components.

Figure 7:
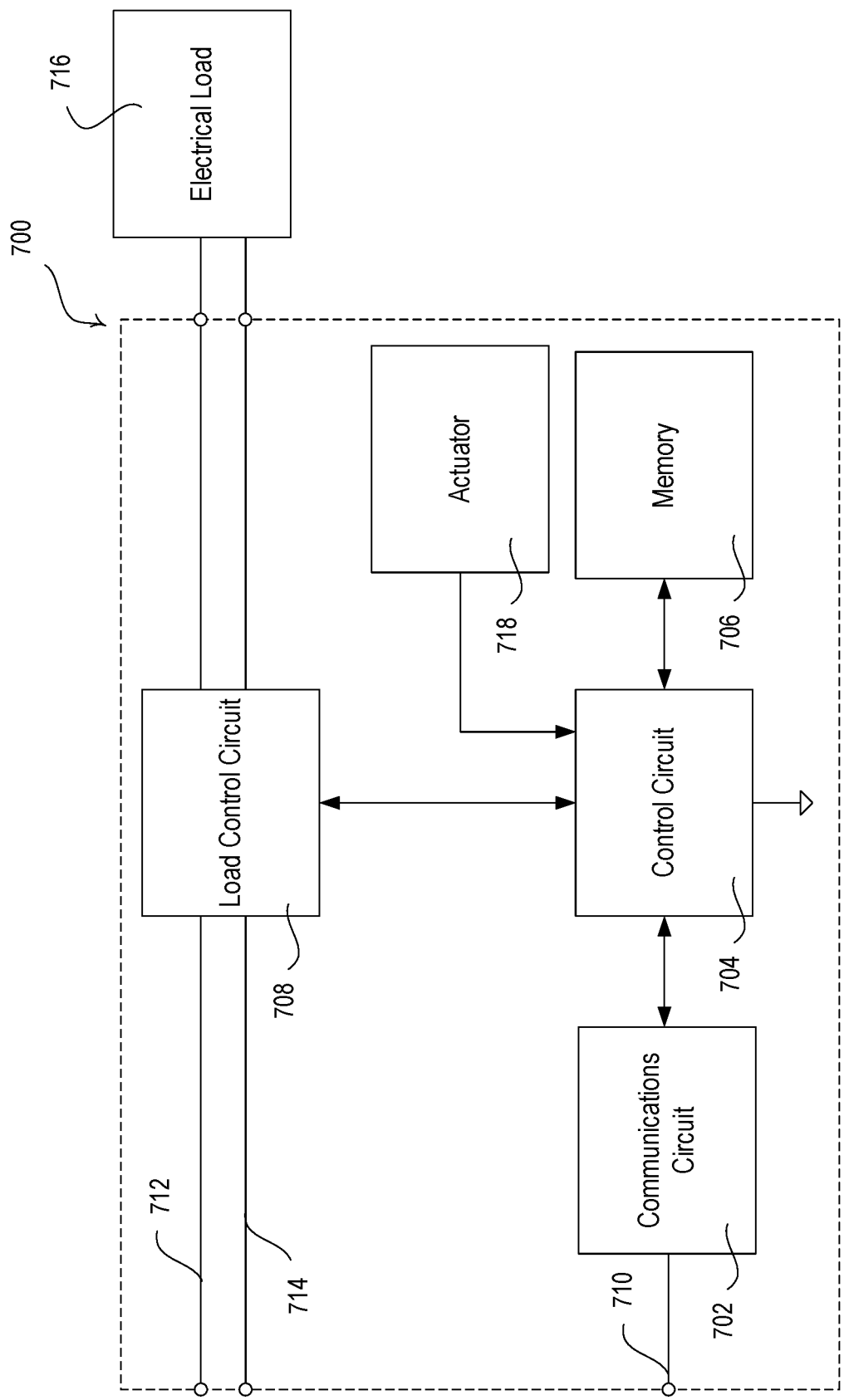
FIG. 7 is a block diagram of an example control-target device.

FIG. 7 is a block diagram illustrating an example control-target device 700, e.g., a load control device, as described herein. The control-target device 700 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The control-target device 700 may include one or more communications circuits/network interface devices or cards 702. The communications circuit 702 may include a receiver, an RF transceiver, and/or other communications component configured to perform wired and/or wireless communications via communications link 710. The control-target device 700 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 704). The control circuit 704 may be configured to execute one or more software-based applications that include instructions that when executed by the control circuit may configure the control circuit to perform signal coding, data processing, power control, input/output processing, or any other function, feature, process, and/or operation for example that enables the control-target device 700 to perform as described herein. One will recognize that functions, features, processes, and/or operations described herein for the control-target device 700 may also and/or alternatively be provided by firmware and/or hardware in addition to and/or as an alternative to software-based instructions. The control circuit 704 may store information in and/or retrieve information from the memory 706. For example, the memory 706 may maintain a registry of associated control devices and/or control configuration information. Memory 706 may also store software-based instructions for execution by the control circuit 704 and may also provide an execution space as the control circuit executes instructions. Memory 706 may be implemented as an external integrated circuit (IC) or as an internal circuit of the control circuit 704. Memory 706 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory. The control circuit 704 may also be in communication with the communications circuit 702.

The control-target device 700 may include a load control circuit 708. The load control circuit 708 may receive instructions from the control circuit 704 and may control an electrical load 716 based on the received instructions. The load control circuit 708 may send status feedback to the control circuit 704 regarding the status of the electrical load 716. The load control circuit 708 may receive power via a hot connection 712 and a neutral connection 714 and may provide an amount of power to the electrical load 716. The electrical load 716 may include any type of electrical load.

The control circuit 704 may be in communication with an actuator 718 (e.g., one or more buttons) that may be actuated by a user to communicate user selections to the control circuit 704. For example, the actuator 718 may be actuated to put the control circuit 704 in an association mode or discovery mode and may communicate association messages or discovery messages from the control-target device 700. One will recognize that control-target device 700 may include other, fewer, and/or additional components.

Figure 8:
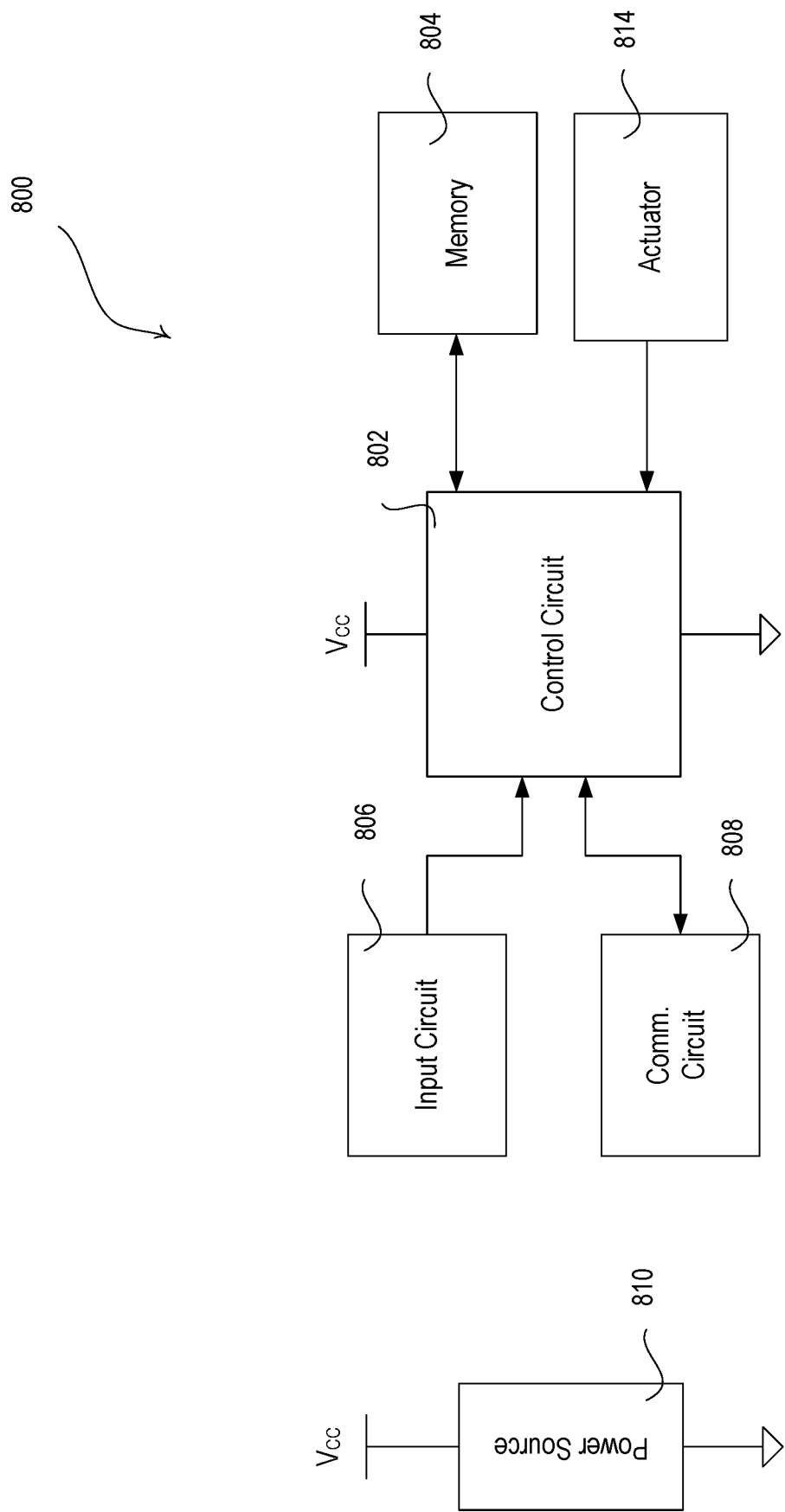
FIG. 8 is a block diagram of an example control-source device.

FIG. 8 is a block diagram illustrating an example control-source device 800 as described herein. The control-source device 800 may be a remote control device, an occupancy sensor, a daylight sensor, a window sensor, a temperature sensor, and/or the like. The control-source device 800 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (hereinafter collectively referred to as processor(s) or control circuit(s) 802). The control circuit 802 may be configured to execute one or more software-based applications that include instructions that when executed by the control circuit may configure the control circuit to perform signal coding, data processing, power control, input/output processing, or any other function, feature, process, and/or operation for example that enables the control-source device 800 to perform as described herein. One will recognize that functions, features, processes, and/or operations described herein for the control-source device 800 may also and/or alternatively be provided by firmware and/or hardware in addition to and/or as an alternative to software-based instructions. The control circuit 802 may store information in and/or retrieve information from the memory 804. Memory 804 may also store software-based instructions for execution by the control circuit 802 and may also provide an execution space as the control circuit executes instructions. Memory 804 may be implemented as an external integrated circuit (IC) or as an internal circuit of the control circuit 802. Memory 804 may include volatile and non-volatile memory and may be non-removable memory and/or a removable memory. Non-removable memory may include random-access memory (RAM), read-only memory (ROM), a hard disk, or any other type of non-removable memory storage. Removable memory may include a subscriber identity module (SIM) card, a memory stick, a memory card, or any other type of removable memory.

The control-source device 800 may include one or more communications circuits/network interface devices or cards 808 for transmitting and/or receiving information. The communications circuit 808 may transmit and/or receive information via wired and/or wireless communications via communications circuit 808. The communications circuit 808 may include a transmitter, an RF transceiver, and/or other circuit configured to perform wired and/or wireless communications. The communications circuit 808 may be in communication with control circuit 802 for transmitting and/or receiving information.

The control circuit 802 may also be in communication with an input circuit(s) 806. The input circuit 806 may include an actuator(s) (e.g., one or more buttons) and/or a sensor circuit (e.g., an occupancy sensor circuit, a daylight sensor circuit, or a temperature sensor circuit) for receiving input that may be sent to a control-target device for controlling an electrical load. For example, the control-source device may receive input from the input circuit 806 to put the control circuit 802 in an association mode and/or communicate association messages from the control-source device. The control circuit 802 may receive information from the input circuit 806 (e.g. an indication that a button has been actuated or sensed information). Each of the components within the control-source device 800 may be powered by a power source 810.

The control circuit 802 may be in communication with an actuator(s) 814 (e.g., one or more buttons) that may be actuated by a user to communicate user selections to the control circuit 802. For example, the actuator 814 may be actuated to put the control circuit 802 in an association mode and/or communicate association messages to and/or from a system controller (e.g., the system controller 150, 600). One will recognize that control-source device 800 may include other, fewer, and/or additional components.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method comprising:
   defining a scene for controlling one or more zones in an area of a building, wherein each zone comprises at least one lighting control device configured to control a corresponding lighting load;
   displaying a lighting intensity for each of the one or more zones in the scene on a graphical user interface;

receiving a change in lighting intensity via the graphical user interface;
displaying a first palette on the graphical user interface that is configured to display colors at different color temperatures at which the at least one lighting load is capable of being controlled;
displaying a second palette on the graphical user interface that is configured to separately display a full color gamut of colors at which the at least one lighting load is capable of being controlled;
receiving, via the graphical user interface, a selection of a color setting on the first palette or the second palette for controlling the at least one lighting load for each of the one or more zones in the scene; and
storing the lighting intensity and the selected color setting for each of the one or more zones in the scene.

2. The method of claim 1, further comprising:
receiving a triggering event configured to trigger the scene; and
controlling the one or more zones in the area of the building according to the lighting intensity and the selected color setting in response the triggering event.

3. The method of claim 1, wherein the one or more zones comprise a plurality of zones, the method further comprising:
determining that a first lighting intensity for a first zone of the plurality of zones is different than a second lighting intensity for a second zone of the plurality of zones;
displaying, via the user interface, one or more actuators configured to allow a relative change in the first lighting intensity and the second lighting intensity;
receiving an indication of the relative change in the first lighting intensity and the second lighting intensity;
storing the relative change in the first lighting intensity and the second lighting intensity; and
controlling the first zone according to the relative change in the first lighting intensity and the second zone according to the relative change in the second lighting intensity.

4. The method of claim 1, further comprising:
receiving the color setting for controlling a first zone via the first palette;
receiving the color setting for controlling a second zone via the second palette; and
storing the selected color setting for the first zone and the selected color setting for the second zone in the scene.

5. The method of claim 1, further comprising:
receiving, via the graphical user interface, a selection of the color setting on the first palette or the second palette for controlling a first zone and a second zone; and
storing the selected color setting for controlling the first zone and the second zone in the scene.

6. The method of claim 1, further comprising:
controlling the at least one at least one lighting control device comprised in each of the one or more zones according to the lighting intensity and the selected color settings in the scene in real time.

7. A computer-readable medium having stored thereon instructions that, when executed by a control circuit, cause the control circuit to:
define a scene for controlling one or more zones in an area of a building, wherein each zone comprises at least one lighting control device configured to control a corresponding lighting load;
display a lighting intensity for each of the one or more zones in the scene on a graphical user interface;
receive a change in lighting intensity via the graphical user interface;
display a first palette on the graphical user interface that is configured to display colors at different color temperatures at which the at least one lighting load is capable of being controlled;
display a second palette on the graphical user interface that is configured to separately display a full color gamut of colors at which the at least one lighting load is capable of being controlled;
receive, via the graphical user interface, a selection of a color setting on the first palette or the second palette for controlling the at least one lighting load for each of the one or more zones in the scene; and
store the lighting intensity and the selected color setting for each of the one or more zones in the scene.

8. The computer-readable medium of claim 7, wherein the instructions further cause the control circuit to:
receive a triggering event configured to trigger the scene; and
control the one or more zones in the area of the building according to the lighting intensity and the selected color setting in response the triggering event.

9. The computer-readable medium of claim 7, wherein the one or more zones comprise a plurality of zones, and wherein the instructions further cause the control circuit to:
determine that a first lighting intensity for a first zone of the plurality of zones is different than a second lighting intensity for a second zone of the plurality of zones;
display, via the user interface, one or more actuators configured to allow a relative change in the first lighting intensity and the second lighting intensity;
receive an indication of the relative change in the first lighting intensity and the second lighting intensity;
store the relative change in the first lighting intensity and the second lighting intensity; and
control the first zone according to the relative change in the first lighting intensity and the second zone according to the relative change in the second lighting intensity.

10. The computer-readable medium of claim 7, wherein the instructions further cause the control circuit to:
receive the color setting for controlling a first zone via the first palette;
receive the color setting for controlling a second zone via the second palette; and
store the selected color setting for the first zone and the selected color setting for the second zone in the scene.

11. The computer-readable medium of claim 7, wherein the instructions further cause the control circuit to:
receive, via the graphical user interface, a selection of the color setting on the first palette or the second palette for controlling a first zone and a second zone; and
store the selected color setting for controlling the first zone and the second zone in the scene.

12. The computer-readable medium of claim 7, wherein the instructions further cause the control circuit to:
control the at least one at least one lighting control device comprised in each of the one or more zones according to the lighting intensity and the selected color settings in the scene in real time.

13. A device comprising:
a memory;
a display; and
a control circuit, configured to:
define a scene for controlling one or more zones in an area of a building, wherein each zone comprises at least one lighting control device configured to control a corresponding lighting load;

display, via the display, a lighting intensity for each of the one or more zones in the scene on a graphical user interface;

receive a change in lighting intensity via the graphical user interface;

display, via the display, a first palette on the graphical user interface that is configured to display colors at different color temperatures at which the at least one lighting load is capable of being controlled;

display, via the display, a second palette on the graphical user interface that is configured to separately display a full color gamut of colors at which the at least one lighting load is capable of being controlled;

receive, via the graphical user interface, a selection of a color setting on the first palette or the second palette for controlling the at least one lighting load for each of the one or more zones in the scene; and store the lighting intensity and the selected color setting for each of the one or more zones in the scene in the memory.

14. The device of claim 13, wherein the control circuit is further configured to:

receive a triggering event configured to trigger the scene; and control the one or more zones in the area of the building according to the lighting intensity and the selected color setting in response the triggering event.

15. The device of claim 13, wherein the one or more zones comprise a plurality of zones, and wherein the control circuit is further configured to:

determine that a first lighting intensity for a first zone of the plurality of zones is different than a second lighting intensity for a second zone of the plurality of zones;

display, via the display, one or more actuators configured to allow a relative change in the first lighting intensity and the second lighting intensity;

receive an indication of the relative change in the first lighting intensity and the second lighting intensity;

store, in the memory, the relative change in the first lighting intensity and the second lighting intensity; and control the first zone according to the relative change in the first lighting intensity and the second zone according to the relative change in the second lighting intensity.

16. The device of claim 13, wherein the control circuit is further configured to:

receive the color setting for controlling a first zone via the first palette;

receive the color setting for controlling a second zone via the second palette; and store, in the memory, the selected color setting for the first zone and the selected color setting for the second zone in the scene.

17. The device of claim 13, wherein the control circuit is further configured to:

receive, via the graphical user interface, a selection of the color setting on the first palette or the second palette for controlling a first zone and a second zone; and store, in the memory, the selected color setting for controlling the first zone and the second zone in the scene.

18. The device of claim 13, wherein the control circuit is further configured to:

control the at least one at least one lighting control device comprised in each of the one or more zones according to the lighting intensity and the selected color settings in the scene in real time.

\* \* \* \* \*